United States Patent
Katz et al.

(10) Patent No.: US 11,687,576 B1
(45) Date of Patent: Jun. 27, 2023

(54) SUMMARIZING CONTENT OF LIVE MEDIA PROGRAMS

(71) Applicant: Amazon Technologies, Inc., Seattle, WA (US)

(72) Inventors: Noam Katz, Simi Valley, CA (US); Mohammad Naghshvar, San Diego, CA (US); Harshal Dilip Wanjari, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/466,899

(22) Filed: Sep. 3, 2021

(51) Int. Cl.
*H04N 21/488* (2011.01)
*G06F 16/34* (2019.01)

(52) U.S. Cl.
CPC ....... *G06F 16/345* (2019.01); *H04N 21/4882* (2013.01)

(58) Field of Classification Search
CPC ........ H04N 21/4882; H04N 21/44218; H04N 7/15; H04N 7/155; H04N 21/44226; H04N 21/4666; H04H 60/33; H04H 60/31; G10L 15/26; G10L 15/1815; G10L 15/1822; G06F 40/30; G06F 16/345; H04M 3/42221; G06N 20/00; G06V 20/47
See application file for complete search history.

(56) References Cited

U.S. PATENT DOCUMENTS

| | | | |
|---|---|---|---|
| 3,850,301 A | 11/1974 | Flenige | |
| 8,023,800 B2 | 9/2011 | Concotelli | |
| 8,560,683 B2 | 10/2013 | Funk et al. | |
| 8,572,243 B2 | 10/2013 | Funk et al. | |
| 8,768,782 B1 | 7/2014 | Myslinski | |
| 9,003,032 B2 | 4/2015 | Funk et al. | |

(Continued)

FOREIGN PATENT DOCUMENTS

| AU | 2013204532 B2 | 11/2014 |
|---|---|---|
| CA | 2977959 A1 | 9/2016 |

(Continued)

OTHER PUBLICATIONS

S. Arora et al., "A Practical Algorithm for Topic Modeling with Provable Guarantees," Proceedings in the 30th International Conference on Machine Learning, JMLR: W&CP vol. 28, published 2013 (Year: 2013).*

(Continued)

*Primary Examiner* — Eric J Yoon
(74) *Attorney, Agent, or Firm* — Athorus, PLLC

(57) ABSTRACT

Summaries of media programs that are in progress are generated based on content of the media programs that has already been transmitted to listeners or viewers. The content is transcribed into text, and contextual features regarding the media program such as topics, identities of speakers or interactions received from listeners are identified. The transcribed content and the contextual features are provided as multi-modal inputs to a model that is trained to generate a summary of the media program in response to such inputs. Summaries of media programs that are then in progress are transmitted to devices of listeners who may be interested in joining one of the media programs and displayed in a menu or user interface or announced to the listeners.

20 Claims, 40 Drawing Sheets

(56) References Cited

U.S. PATENT DOCUMENTS

| | | |
|---|---|---|
| 9,369,740 B1 | 6/2016 | Funk et al. |
| 9,613,636 B2 | 4/2017 | Gibbon et al. |
| 9,706,253 B1 | 7/2017 | Funk et al. |
| 9,729,596 B2 | 8/2017 | Sanghavi et al. |
| 9,781,491 B2 | 10/2017 | Wilson |
| 9,872,069 B1 | 1/2018 | Funk et al. |
| 10,083,169 B1 | 9/2018 | Ghosh et al. |
| 10,091,547 B2 | 10/2018 | Sheppard et al. |
| 10,110,952 B1 | 10/2018 | Gupta et al. |
| 10,135,887 B1 | 11/2018 | Esser et al. |
| 10,140,364 B1 | 11/2018 | Diamondstein |
| 10,178,442 B2 | 1/2019 | Shkedi |
| 10,313,726 B2 | 6/2019 | Woods et al. |
| 10,356,476 B2 | 7/2019 | Dharmaji |
| 10,432,335 B2 | 10/2019 | Bretherton |
| 10,489,395 B2 | 11/2019 | Lakkur et al. |
| 10,685,050 B2 * | 6/2020 | Krishna ............. G06F 16/3347 |
| 10,698,906 B2 | 6/2020 | Hargreaves et al. |
| 10,719,837 B2 | 7/2020 | Kolowich et al. |
| 10,769,678 B2 | 9/2020 | Li |
| 10,846,330 B2 | 11/2020 | Shilo |
| 10,985,853 B2 | 4/2021 | Bretherton |
| 10,986,064 B2 | 4/2021 | Siegel et al. |
| 10,997,240 B1 | 5/2021 | Aschner et al. |
| 11,431,660 B1 | 8/2022 | Leeds et al. |
| 11,451,863 B1 | 9/2022 | Benjamin et al. |
| 11,463,772 B1 | 10/2022 | Wanjari et al. |
| 11,521,179 B1 | 12/2022 | Shetty |
| 11,580,982 B1 | 2/2023 | Karnawat et al. |
| 11,586,344 B1 | 2/2023 | Balagurunathan et al. |
| 2002/0042920 A1 | 4/2002 | Thomas et al. |
| 2002/0056087 A1 | 5/2002 | Berezowski et al. |
| 2006/0268667 A1 | 11/2006 | Jellison et al. |
| 2007/0124756 A1 | 5/2007 | Covell et al. |
| 2007/0271518 A1 | 11/2007 | Tischer et al. |
| 2007/0271580 A1 | 11/2007 | Tischer et al. |
| 2008/0086742 A1 | 4/2008 | Aldrey et al. |
| 2009/0044217 A1 | 2/2009 | Lutterbach et al. |
| 2009/0076917 A1 | 3/2009 | Jablokov et al. |
| 2009/0100098 A1 | 4/2009 | Feher et al. |
| 2009/0254934 A1 | 10/2009 | Grammens |
| 2010/0088187 A1 | 4/2010 | Courtney et al. |
| 2010/0280641 A1 | 11/2010 | Harkness et al. |
| 2011/0067044 A1 | 3/2011 | Albo |
| 2012/0040604 A1 | 2/2012 | Amidon et al. |
| 2012/0191774 A1 | 7/2012 | Bhaskaran et al. |
| 2012/0304206 A1 | 11/2012 | Roberts et al. |
| 2012/0311618 A1 | 12/2012 | Blaxland |
| 2012/0331168 A1 | 12/2012 | Chen |
| 2013/0074109 A1 | 3/2013 | Skelton et al. |
| 2013/0247081 A1 | 9/2013 | Vinson et al. |
| 2013/0253934 A1 | 9/2013 | Parekh et al. |
| 2014/0019225 A1 | 1/2014 | Guminy et al. |
| 2014/0040494 A1 | 2/2014 | Deinhard et al. |
| 2014/0068432 A1 | 3/2014 | Kucharz et al. |
| 2014/0073236 A1 | 3/2014 | Iyer |
| 2014/0108531 A1 | 4/2014 | Klau |
| 2014/0123191 A1 | 5/2014 | Hahn et al. |
| 2014/0228010 A1 | 8/2014 | Barbulescu et al. |
| 2014/0325557 A1 | 10/2014 | Evans et al. |
| 2014/0372179 A1 | 12/2014 | Ju et al. |
| 2015/0163184 A1 | 6/2015 | Kanter et al. |
| 2015/0242068 A1 | 8/2015 | Losey et al. |
| 2015/0248798 A1 | 9/2015 | Howe et al. |
| 2015/0289021 A1 | 10/2015 | Miles |
| 2015/0319472 A1 | 11/2015 | Kotecha et al. |
| 2015/0326922 A1 | 11/2015 | Givon et al. |
| 2016/0093289 A1 | 3/2016 | Pollet |
| 2016/0188728 A1 | 6/2016 | Gill et al. |
| 2016/0217488 A1 | 7/2016 | Ward et al. |
| 2016/0266781 A1 | 9/2016 | Dandu et al. |
| 2016/0293036 A1 | 10/2016 | Niemi et al. |
| 2016/0330529 A1 | 11/2016 | Byers |
| 2017/0127136 A1 | 5/2017 | Roberts et al. |
| 2017/0164357 A1 | 6/2017 | Fan et al. |
| 2017/0213248 A1 | 7/2017 | Jing et al. |
| 2017/0289617 A1 | 10/2017 | Song et al. |
| 2017/0329466 A1 | 11/2017 | Krenkler et al. |
| 2017/0366854 A1 | 12/2017 | Puntambekar et al. |
| 2018/0025078 A1 | 1/2018 | Quennesson |
| 2018/0035142 A1 | 2/2018 | Rao et al. |
| 2018/0205797 A1 * | 7/2018 | Faulkner ................. H04L 67/14 |
| 2018/0227632 A1 | 8/2018 | Rubin et al. |
| 2018/0255114 A1 | 9/2018 | Dharmaji |
| 2018/0293221 A1 * | 10/2018 | Finkelstein ............ G06N 20/00 |
| 2018/0322411 A1 | 11/2018 | Wang et al. |
| 2018/0367229 A1 | 12/2018 | Gibson et al. |
| 2019/0065610 A1 | 2/2019 | Singh |
| 2019/0132636 A1 | 5/2019 | Gupta et al. |
| 2019/0156196 A1 | 5/2019 | Zoldi et al. |
| 2019/0171762 A1 | 6/2019 | Luke et al. |
| 2019/0273570 A1 | 9/2019 | Bretherton |
| 2019/0327103 A1 * | 10/2019 | Niekrasz ................. G10L 15/26 |
| 2019/0385600 A1 | 12/2019 | Kim |
| 2020/0021888 A1 | 1/2020 | Brandao et al. |
| 2020/0160458 A1 | 5/2020 | Bodin et al. |
| 2020/0226418 A1 | 7/2020 | Dorai-Raj et al. |
| 2020/0279553 A1 | 9/2020 | McDuff et al. |
| 2021/0104245 A1 | 4/2021 | Mas et al. |
| 2021/0105149 A1 * | 4/2021 | Roedel ................. H04L 12/1881 |
| 2021/0125054 A1 | 4/2021 | Banik et al. |
| 2021/0160588 A1 | 5/2021 | Joseph et al. |
| 2021/0210102 A1 | 7/2021 | Huh et al. |
| 2021/0217413 A1 | 7/2021 | Tushinskiy et al. |
| 2021/0232577 A1 | 7/2021 | Ogawa et al. |
| 2021/0256086 A1 | 8/2021 | Askarian et al. |
| 2021/0366462 A1 | 11/2021 | Yang et al. |
| 2022/0038783 A1 | 2/2022 | Wee |
| 2022/0159377 A1 | 5/2022 | Wilberding et al. |
| 2022/0223286 A1 | 7/2022 | Lach et al. |
| 2022/0254348 A1 * | 8/2022 | Tay .......................... G10L 15/26 |

FOREIGN PATENT DOCUMENTS

| | | |
|---|---|---|
| CN | 104813305 A | 7/2015 |
| KR | 20170079496 A | 7/2017 |
| WO | 2019089028 A1 | 5/2019 |

OTHER PUBLICATIONS

GitHub, "Spotify iOS SDK," GitHub.com, GitHub Inc. and GitHub B.V., Feb. 17, 2021, available at URL: https://github.com/spotify/ios-sdk#how-do-app-remote-calls-work, 10 pages.

Stack Overflow, "Audio mixing of Spotify tracks in IOS app," stackoverflow.com, Stack Overflow Network, Jul. 2012, available at URL: https://stackoverflow.com/questions/11396348/audio-mixing-of-spotify-tracks-in-ios-app, 2 pages.

Tengeh, R. K., & Udoakpan, N. (2021). Over-the-Top Television Services and Changes in Consumer Viewing Patterns in South Africa. Management Dynamics in the Knowledge Economy. 9(2), 257-277 DOI 10.2478/mdke-2021-0018 ISSN: 2392-8042 (online) www.managementdynamics.ro; URL: https://content.sciendo.com/view/journals/mdke/mdke-overview.XML.

Hoegen, Rens, et al. "An End-to-End Conversational Style Matching Agent." Proceedings of the 19th ACM International Conference on Intelligent Virtual Agents. 2019, pp. 1-8. (Year: 2019).

* cited by examiner

| TRANSCRIPT 110 | Welcome, thanks for coming on. 122-2 / 180-1 | Thanks! Great to be here. 122-3 | Just 50 days until the first kickoff! Can you believe it? 122-4 / 110 | Looking forward to big crowds and good tailgates! 122-5 / 180-1 | Who is going to win it all this year? 122-6 / 110 | Believe it, the champ will come from New England 122-7 / 180-1 | Really? That's amazing! It's been a long time! 122-8 / 110 |
|---|---|---|---|---|---|---|---|
| SPEAKER | CREATOR | GUEST | CREATOR | GUEST | CREATOR | GUEST | CREATOR |
| TOPIC | #introduction  145-1 | #gratitude  145-2 | #football #excitement  145-3  145-4 | #football #outdoor #crowd #stadium  145-5 145-6 145-7 | #football #prediction #champion  145-3 145-8 145-9 | #football #NewEngland #champion  145-3 145-10 145-9 | #football #champion  145-3 145-9 |
| INTERACTIONS | 😊 2  136  💬 4  138  📞 2  139 | 🤩 1  136  💬 1  138 | 😊 2  136 | 🤩 1  136  😊 1 | 😊 3  136  💬 6  138  📞 4  139 | 🤩 3  136  😋 2  136  💬 15  138  📞 3  139 | 🤤 1  136  😊 1  136  💬 11  138 |

FIG. 1D

| TRANSCRIPT 180-1 | | | | | |
|---|---|---|---|---|---|
| | 122-9 First time since 1927! Region is loaded | 122-10 Need a run game to win up north in the winter | 122-11 That's right, and a great defense and special teams too | 122-12 So who is your choice to win it all? | 122-13 My pick will surprise you, that's for sure |
| SPEAKER | GUEST | CREATOR | GUEST | CREATOR | GUEST |
| TOPIC | #football — 145-3<br>#north — 145-11 | #football — 145-3<br>#north — 145-11<br>#cold — 145-12 | #football — 145-3<br>#defense — 145-14<br>#specialteams 145-13 | #football — 145-3<br>#prediction — 145-8<br>#champion — 145-9 | #football — 145-3<br>#prediction — 145-8<br>#champion — 145-9 |
| INTERACTIONS | 136 ☺ 1<br>138 📋 7<br>139 📞 1 | 136 ☺ 1<br>138 📋 3 | 138 📋 2 | 138 📋 16<br>139 📞 4 | 136 ☺ 1<br>136 ☺ 1<br>138 📋 12<br>139 📞 8 |

FIG. 1E

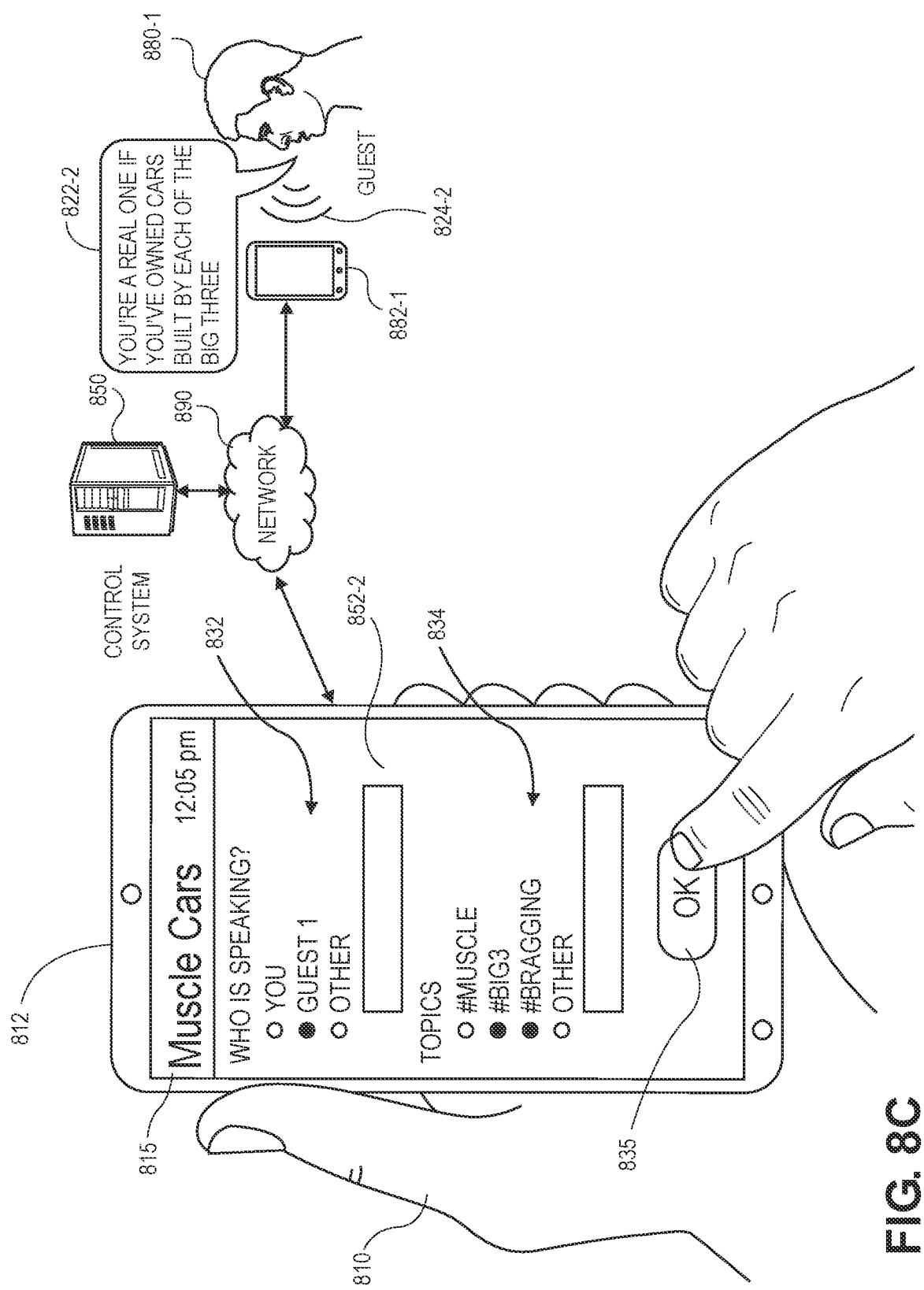

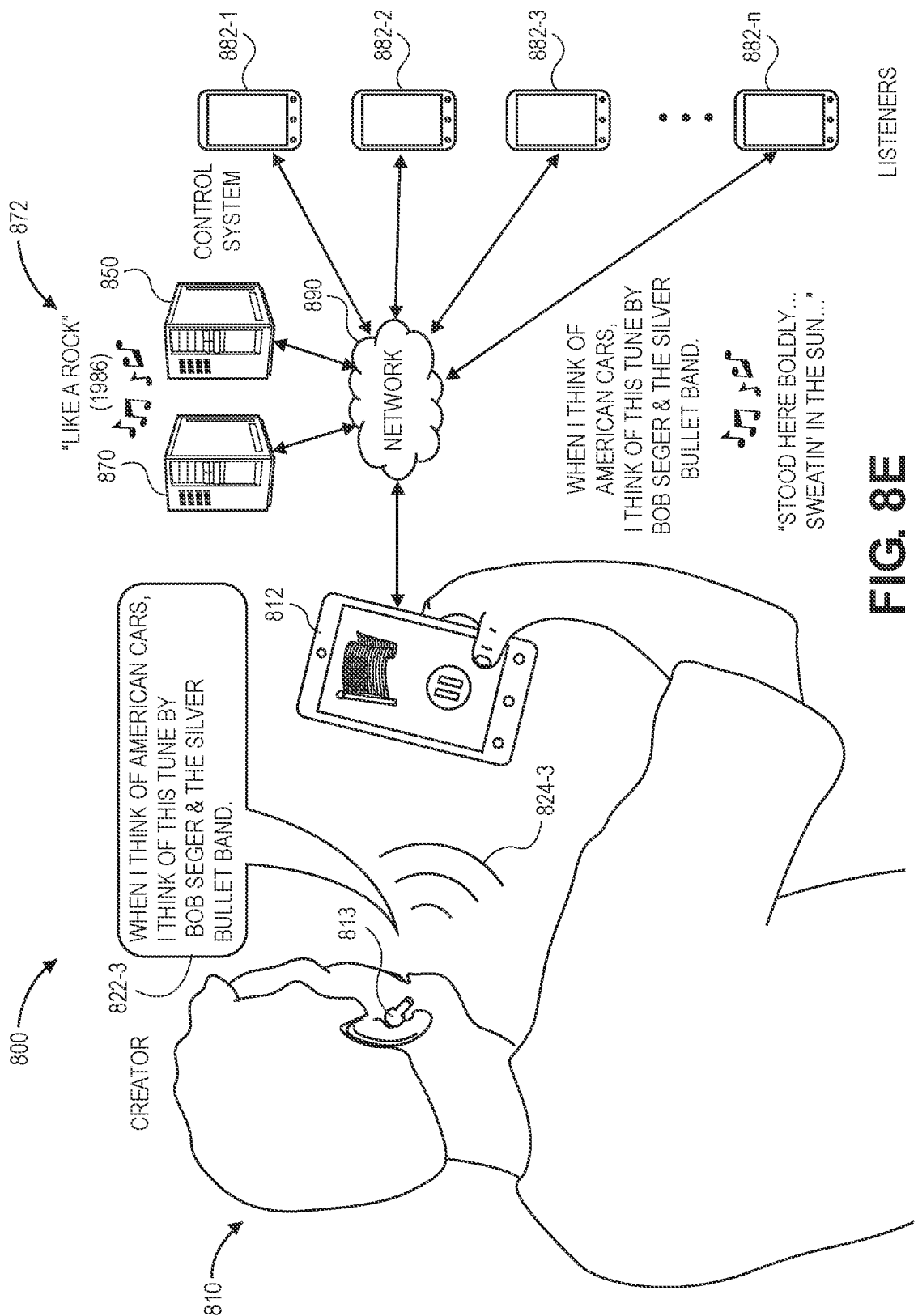

UPDATED SUMMARY: BASED ON CREATOR COMMENTARY AND MUSIC

SUMMARIZING CONTENT OF LIVE MEDIA PROGRAMS

BACKGROUND

Today, many media programs are broadcast "live" to viewers or listeners over the air, e.g., on radio or television, or streamed or otherwise transmitted to the viewers or listeners over one or more computer networks, which may include the Internet in whole or in part. The media programs may include music, comedy, "talk" radio, interviews or any other content. In some instances, where a number of live media programs are in progress, information regarding such media programs may be displayed in menus on user interfaces rendered on displays or announced by one or more speakers of network-connected devices associated with prospective viewers or listeners. A prospective viewer or listener may browse or scroll through the menus or utter one or more voice-based commands to review the information, and select one or more media programs, e.g., by one or more gestures or other interactions with the user interfaces, or with one or more subsequent voice commands.

A viewer or listener who intends to join a media program that is already in progress may be hesitant to do so, given that traditional menus or other features for reviewing and selecting media programs typically do not provide any context regarding media content that has already been presented in accordance with a media program. In the absence of context, a viewer or listener may be less interested or unwilling to join a media program that is already in progress, for the viewer or listener may be required to expend substantial investments in time and energy in order to "catch up" on discussions currently taking place upon joining a media program.

BRIEF DESCRIPTION OF THE DRAWINGS

FIGS. 1A through 1H are views of aspects of one system for summarizing media content in accordance with embodiments of the present disclosure.

FIGS. 8A through 8F are views of aspects of one system for summarizing media content in accordance with embodiments of the present disclosure.

DETAILED DESCRIPTION

As is set forth in greater detail below, the present disclosure is directed to systems and methods for summarizing content of live media programs, such as media programs that are broadcast to systems or devices over computer networks, including but not limited to the Internet. More specifically, the systems and methods of the present disclosure are directed to identifying portions of media content that have been transmitted to devices of listeners in accordance with a media program, and processing the media content to transcribe the media content into one or more sets of words. The sets of words may be analyzed to identify one or more contextual features of the media program, such as topics, which may be expressed in tags or other labels that are automatically generated based on such sets of words, or selected by a creator or a listener, and associated with the media content. Additionally, the contextual features may also include identities of one or more speakers associated with the media content, as well as one or more signals representing engagement of listeners with the media content. Portions of the media content or sets of words transcribed therefrom, as well as the contextual features (e.g., tags or other labels of topics, identities or other attributes of speakers, or listener engagement signals) may be provided as multi-modal inputs to an algorithm, a system or a technique (e.g., an artificial neural network). A summary of the media content, which may include sets of text descriptive of the media content or one or more representative portions of the media content, may be determined based on outputs received from the algorithm, system or technique. Alternatively, or additionally, one or more aspects of the summary, or representative portions of the media content, may be identified and selected by a creator or another individual or entity.

A summary of media content of an in-progress media program, or one or more representative portions of the media content, may then be transmitted to devices of prospective listeners or viewers, and presented to such listeners or viewers audibly or visually, e.g., in one or more menus or interfaces, along with one or more features for joining the media program. The summary may be modified or customized based on attributes of a device, or histories or interests of a prospective listener or viewer, who may view or listen to the summary when determining whether to join the media program.

Figure 1A:
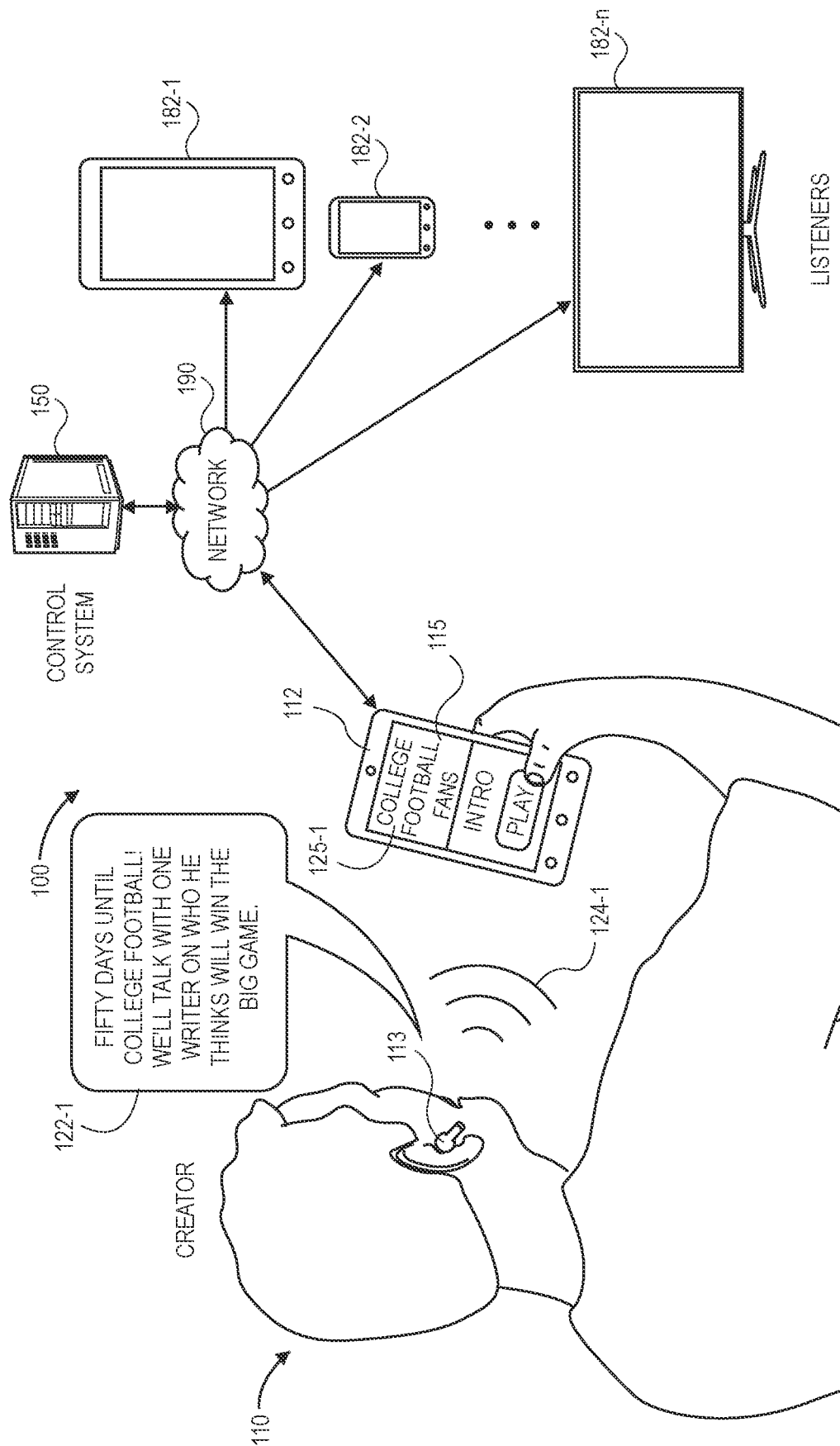

Referring to FIGS. 1A through 1H, views of aspects of one system for summarizing media content in accordance with embodiments of the present disclosure are shown. As is shown in FIG. 1A, a system 100 includes a mobile device 112 (e.g., a smartphone, a tablet computer, a laptop computer, or any other system or device) of a creator 110 (e.g., a user, or a host), a control system 150 (e.g., one or more servers or other computer systems) and a plurality of computer devices 182-1, 182-2 . . . 182-$n$ or other systems of any number of listeners (or viewers) that are connected to one another over one or more networks 190, which may include the Internet in whole or in part. The creator 110 wears one or more ear buds 113 (or ear phones, or head phones) or other communication systems or devices which may be in communication with the mobile device 112, and may exchange (e.g., transfer or receive) data relating to audio signals or any other data with the mobile device 112. The computer device 182-1 is a tablet computer or like system. The computer device 182-2 is a smartphone or like system. The computer device 182-n is a television or like system. However, the computer systems or devices that may be operated or utilized in accordance with the present disclosure are not limited by any of the devices or systems shown in FIG. 1A.

As is shown in FIG. 1A, the mobile device 112 includes a display 115 (e.g., a touchscreen) having a user interface 125-1 rendered thereon. The user interface 125-1 may include one or more interactive or selectable elements or features that enable the creator 110 to construct a media program from one or more sets of media content, or to control the transmission or receipt of media content in accordance with the media program, e.g., by the control system 150 or from any other source to the computer devices 182-1, 182-2 . . . 182-n over the networks 190. In some implementations, the control system 150 may establish a two-way or bidirectional channel or connection with the mobile device 112, and one-way or unidirectional channels or connections with the devices 182-1, 182-2 . . . 182-n. In some other implementations, the control system 150 may establish two-way or bidirectional channels with the mobile device 112, and any number of the devices 182-1, 182-2 . . . 182-n.

In some implementations, the display 115 may be a capacitive touchscreen, a resistive touchscreen, or any other system for receiving interactions by the creator 110. Alternatively, or additionally, the creator 110 may interact with the user interface 125-1 or the mobile device 112 in any other manner, such as by way of any input/output ("I/O") devices, including but not limited to a mouse, a stylus, a touchscreen, a keyboard, a trackball, or a trackpad, as well as any voice-controlled devices or software (e.g., a personal assistant), which may capture and interpret voice commands using one or more microphones or acoustic sensors provided on the mobile device 112, the ear buds 113, or any other systems (not shown). In accordance with implementations of the present disclosure, the user interface 125-1, or other user interfaces, may include any number of buttons, text boxes, checkboxes, drop-down menus, list boxes, toggles, pickers, search fields, tags, sliders, icons, carousels, or any other interactive or selectable elements or features that are configured to display information to the creator 110 or to receive interactions from the creator 110 via the display 115.

As is further shown in FIG. 1A, the creator 110 provides an utterance 122-1 of one or more words that are intended to be heard by one or more listeners using the computer devices 182-1, 182-2 . . . 182-n. In particular, the creator 110 uses the utterance 122-1 to describe a media program relating to an upcoming college football season, viz., "Fifty days until college football! We'll talk with one writer on who he thinks will win the big game," in accordance with a broadcast plan for the media program or spontaneously. The mobile device 112 and/or the ear buds 113 may capture acoustic data 124-1 representing the utterance 122-1 of the creator 110, and transmit the data 124-1 to the control system 150 over the one or more networks 190. The control system 150 may then cause data, e.g., some or all of the data 124-1, to be transmitted to one or more computer systems or devices of listeners over one or more networks 190, including but not limited to the computer devices 182-1, 182-2 . . . 182-n.

In some implementations, the user interfaces of the present disclosure (viz., the user interface 125-1, or others) may include one or more features enabling the creator 110 to exercise control over the media content being played by the devices 182-1, 182-2 . . . 182-n of the listeners. For example, such features may enable the creator 110 to manipulate a volume or another attribute or parameter (e.g., treble, bass, or others) of audio signals represented in data transmitted to the respective devices 182-1, 182-2 . . . 182-n of the listeners by one or more gestures or other interactions with a user interface rendered on the mobile device 112. In response to instructions received from the mobile device 112 by such gestures or interactions, the control system 150 may modify the data transmitted to the respective devices 182-1, 182-2 . . . 182-n of the listeners accordingly.

Alternatively, or additionally, the user interfaces of the present disclosure may include one or more elements or features for playing, pausing, stopping, rewinding or fast-forwarding media content to be represented in data transmitted to the respective devices 182-1, 182-2 . . . 182-n. For example, the user interfaces may further include one or more elements or features for initiating a playing of any type or form of media content from any source, and the control system 150 may establish or terminate channels or connections with such sources, as necessary, or modify data transmitted to the respective devices 182-1, 182-2 . . . 182-n of the listeners to adjust audio signals played by such devices, in response to gestures or other interactions with such elements or features. The user interfaces may further include any visual cues such as "on the air!" or other indicators as to media content that is currently being played, and from which source, as well as one or more clocks, timers or other representations of durations for which media content has been played, times remaining until the playing of media content is expected to end or be terminated, or times at which other media content is to be played.

Figure 1B:
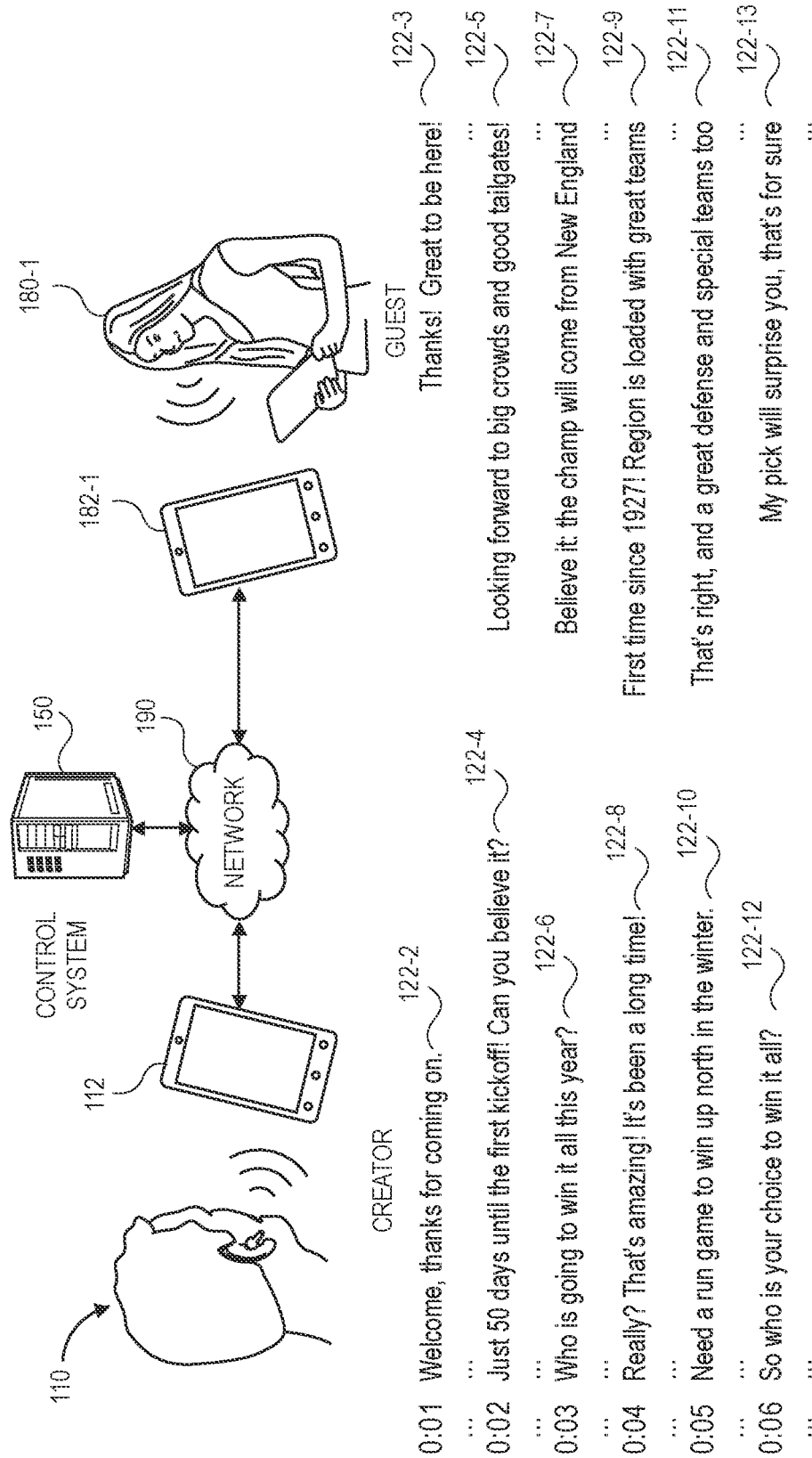

As is shown in FIG. 1B, the creator 110 engages in conversation with one of the listeners 180-1 (e.g., a guest or another participant) by way of one of the devices 182-1. Media content including data representing spoken words by the creator 110 and the listener 180-1 captured by the mobile device 112 and the device 182-1, respectively, is received by the control system 150 and transmitted to devices of listeners, e.g., the devices 182-1, 182-2 . . . 182-n shown in FIG. 1A, in accordance with the media program.

In accordance with the media program, the creator 110 and the listener 180-1 exchange questions, answers and other commentary, and media content representing such commentary is transmitted to devices 182-1, 182-2 . . . 182-n of the listeners. For example, as is shown in FIG. 1B, the creator 110 begins a conversation with the listener 180-1 with an utterance 122-2, viz., "Welcome, thanks for coming on," one minute into the media program, and the listener 180-1 replies with another utterance 122-3, viz., "Thanks! Great to be here!" Likewise, the creator 110 provides another utterance 122-4 in the context of the media program, viz., "Just 50 days until the first kickoff! Can you believe it?" two minutes into the media program, and the listener 180-1 responds with another utterance 122-5, viz., "Looking forward to big crowds and good tailgates!" The creator 110 also asks a question with an utterance 122-6, viz., "Who is going to win it all this year?" three minutes into the media program, and the listener 180-1 answers with another utterance 122-7, viz., "Believe it: the champ will come from New England."

The creator 110 then responds to the answer with an utterance 122-8, viz., "Really? That's amazing! It's been a long time!" four minutes into the media program, and the listener 180-1 responds in kind with another utterance 122-9, viz., "First time since 1927! Region is loaded with great teams." The creator 110 also comments with an utterance 122-10, viz., "Need a run game to win up north in the winter," five minutes into the media program, and the listener 180-1 responds to the comment with another utterance 122-11, viz., "That's right, and a great defense and special teams too." The creator 110 asks another question with an utterance 122-12, viz., "So who is your choice to win it all?" six minutes into the media program, and the listener 180-1 responds with another utterance 122-13, viz., "My pick will surprise you, that's for sure."

Figure 1C:
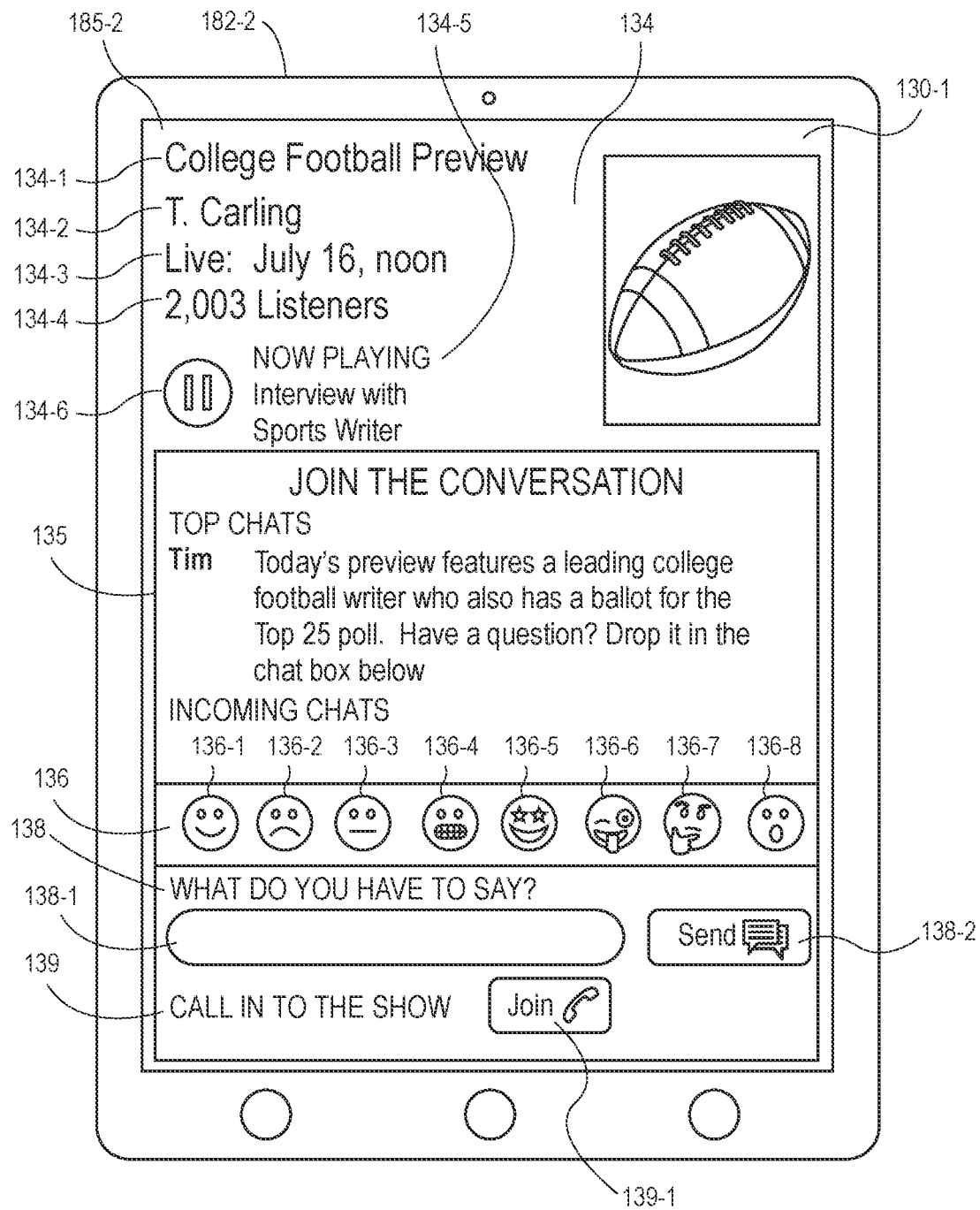

While the media content of the media program, e.g., the questions, answers and other commentary of the creator 110 and the listener 180-1 shown in FIG. 1B, is presented to listeners via their respective devices, the listeners may express their opinions on the media program by one or more gestures or other interactions with user interfaces rendered by their respective devices 182-1, 182-2 . . . 182-*n*. As is shown in FIG. 1C, during the playing of media content of the media program, including but not limited to the utterances 122-2 through 122-13 by the creator 110 and the listener 180-1 shown in FIG. 1B, the device 182-2 displays a user interface 130-1 on a display 185-2.

The user interface 130-1 includes a plurality of sections 134, 135, 136, 138, 139 rendered thereon. For example, the section 134 of the user interface 130-1 is provided at an upper edge or area of the display 185-2, and includes one or more identifiers or information regarding the media program, including but not limited to a title 134-1 of the media program, and a name 134-2 of the creator 110 of the media program. The section 134 may further include a date and time 134-3 of the media program, along with an indicator that the media program is being aired live, as well as a number of listeners 134-4 to the media program (e.g., subscribers or other guests who have requested to receive one or more episodes of the media program), a description 134-5 of any media content being played in accordance with the media program, viz., an interview between the creator 110 and the listener 180-1, and/or one or more elements (or features) 134-6 for playing, pausing, stopping, rewinding or fast-forwarding media content. In some implementations, the section 134 or any other section of the user interface 130-1 may further include a rating of the media program (e.g., a qualitative or quantitative rating that may visually express a quality of the media program as rated by listeners in numbers, stars or other visual features), or any other information regarding the media program or the creator.

The section 135 is provided in a substantially central area of the display 185-2 below the section 134, and includes portions for displaying highly ranked or relevant chat messages (viz., "Top Chats") received from the creator 110 or any listeners, as well as any number of other chat messages (viz., "Incoming Chats") received from the creator 110 or other listeners. For example, as is shown in FIG. 1C, the section 135 includes a chat message received from the creator 110, viz., "Tim," that references the theme of the media content currently being played in accordance with the media program, and states, "Today's preview features a leading college football writer who also has a ballot for the Top 25 poll. Have a question? Drop it in the chat box below."

The section 136 is provided between the section 135 and the section 138, and includes a plurality of interactive features 136-1, 136-2, 136-3, 136-4, 136-5, 136-6, 136-7, 136-8 for expressing an emotion or an opinion regarding the media program in general, or a portion of the media program in particular, by one or more interactions with the user interface 130-1. For example, as is shown in FIG. 1C, each of the interactive features 136-1, 136-2, 136-3, 136-4, 136-5, 136-6, 136-7, 136-8 is an "emoji" or a digital icon, image or symbol representative of an emotion or an opinion, and may be selected in association with the media program or any portion of the media program in order to associate the representative emotion or opinion with the media program or portion thereof. The interactive feature 136-1 is a smiling face, and may be selected to express a generally pleasant, cheery or humorous emotion or opinion with the media program or a portion thereof. The interactive feature 136-2 is a frowning face, and may be selected to express a generally concerned, disappointed or sad emotion or opinion with the media program or a portion thereof. The interactive feature 136-3 is face with a closed and substantially horizontally aligned mouth, and may be selected to express a mildly concerned, disappointed or sad emotion or opinion, or an emotion or opinion that is neutral (e.g., neither positive nor negative), regarding the media program or a portion thereof.

The interactive feature 136-4 is a face having a full-toothed grin, which may be selected to express a radiant or glowing emotion or opinion, e.g., an outwardly positive emotion or opinion, with the media program or a portion thereof. The interactive feature 136-5 is a face with a broad, open smile, and with stars in lieu of eyes, which may be selected in order to express an emotion or opinion of amazement, fascination or excitement with the media program or a portion thereof. The interactive feature 136-6 is a face with raised or furrowed eyebrows and a single monocle over one of the eyes, which may be selected in order to imply that the media program or a portion thereof may be worthy of further evaluation or consideration. The interactive feature 136-7 is a face with raised or furrowed eyebrows and portions of a hand, such as a thumb and index finger, contacting the chin or a cheek of the face. The interactive feature 136-7 may be selected to express an emotion or opinion of inspection or skepticism regarding the media program or a portion thereof. The interactive feature 136-8 is a face having an open or agape mouth, which may be selected in order to express an emotion or opinion of awe, disbelief, shock or surprise with the media program or a portion thereof. The section 136 may further include a selectable feature that enables a listener to view any number of other emoji (not shown), and such emoji may be selected in order express any emotion or opinion associated therewith with the media program or a portion thereof.

The section 138 is provided between the section 136 and the section 139, and includes a text box 138-1 or a like feature that enables a listener or any other user of the device 182-2 to provide a chat message to the creator 110 or other listeners, e.g., by executing one or more gestures or other interactions with a virtual keyboard rendered on the display 185-2, and a button 138-2 or another selectable feature for transmitting the chat message provided within the text box to the control system 150 or the creator 110. Alternatively, a listener may provide a chat message or other information to the device 182-2 for transmission to the creator 110 or the control system 150 in any other manner, e.g., by one or more voice commands or utterances, or by gestures or interactions with a drop-down menu.

The section 139 is provided at a lower edge or area of the display 185-2, and includes a button 139-1 or another selectable feature for establishing a communications channel (e.g., a two-way communications channel) between the device 182-2 and the control system 150 or any other system. Once the communication channel is established between the device 182-2 and the control system 150 (or another system), a listener operating the device 182-2 may participate in the media program, such as by providing one or more spoken utterances via the device 182-2.

The user interface 130-1 may be rendered by the device 182-2 in any manner. For example, code for rendering the user interface 130-1 may be transmitted to the device 182-2 by the control system 150 or from any other source, and the device 182-2 may render the user interface 130-1 and any of the sections 134, 135, 136, 138, 139 within the user interface 130-1 or on the display 185-2 accordingly. The code may be programmed in HTML or any other language, e.g., Java or JavaScript, and may be executed by a widget, an application programming interface (or "API"), or any other application or feature of the device 182-2. Moreover, the user interface 130-1 may include the features of the sections 134, 135, 136, 138, 139 in any locations on the user interface 130-1, and may be aligned in any orientation (e.g., portrait or landscape) with respect to the display 185-2.

In accordance with implementations of the present disclosure, data representing utterances or other voice samples of creators, listeners or others expressed in the media content may be processed to transcribe such utterances or voice samples. For example, data representing the utterances 122-2 through 122-13 may be provided as inputs to a machine learning algorithm, system or technique that is trained to identify any words represented in the data, and to store such utterances in association with the media content.

Additionally, as is shown in FIGS. 1D and 1E, data representing the utterances 122-2 through 122-13 or any sets of words identified based on the data may be further processed to identify contextual features associated with any of such words, such as topics (or themes) 145-1 through 145-14 of portions of the media program, or of the media program as a whole, or identities of one or more speakers, viz., the creator 110 and the listener 180-1, during the media program. For example, as is shown in FIG. 1D, a topic 145-1 of "#introduction" may be identified and associated with the utterance 122-2, in which the creator 110 welcomed the listener 180-1 to the media program, and a topic 145-2 of "#gratitude" may be identified and associated with the utterance 122-3, by which the listener 180-1 acknowledged the welcome. Additionally, topics 145-3, 145-4 of "#football" and "#excitement," respectively, may be identified and associated with the utterance 122-4, in which the creator 110 expressed his interest in an upcoming college football season, in the context of the media program. Topics 145-3, 145-5, 145-6, 145-7 of "#football," "#outdoor," "#crowd" and "#stadium" may be identified and associated with the utterance 122-5, in which the listener 180-1 expressed her interest in returning to football games in person during the upcoming college football season.

As is also shown in FIG. 1D, topics 145-3, 145-8, 145-9 of "#football," "#prediction" and "#champion" may be identified and associated with the utterance 122-6, in which the creator 110 asks the listener 180-1 for a prediction as to who will be a champion in the upcoming college football season. Topics 145-3, 145-9, 145-10 of "#football," "#champion" and "#NewEngland" may be identified and associated with the utterance 122-7, in which the listener 180-1 predicts that the champion will be located in one of the New England states. Topics 145-3, 145-9 of "#football" and "#champion" may be identified and associated with the utterance 122-8, in which the creator 110 expresses surprise at the prediction of the listener 180-1, and notes that a champion has not been located in one of the New England states for a long time.

As is shown in FIG. 1E, topics 145-3, 145-11 of "#football" and "#north" may be identified and associated with the utterance 122-9, in which the listener 180-1 explains her reasoning for her prediction. Topics 145-3, 145-11, 145-12 of "#football," "#north" and "#cold" may be identified and associated with the utterance 122-10, in which the creator 110 expresses his opinion that a championship football team in a cold environment must be competent at running the football.

As is further shown in FIG. 1E, topics 145-3, 145-13, 145-14 of "#football," "#defense" and "#specialteams" may be identified and associated with the utterance 122-11, in which the listener 180-1 confirms her agreement with the opinion of the creator 110 and also stresses the importance of sound defense and special teams play in cold environments. Topics 145-3, 145-8, 145-9 of "#football," "#prediction" and "#champion" are also identified and associated with both the utterance 122-12, in which the creator 110 asks the creator to specifically identify a team that the listener 180-1 believes will be the champion in the upcoming college football season, and the utterance 122-13, in which the listener 180-1 provides a general reply.

The topics 145-1 through 145-14 may be identified from sets of words (e.g., transcripts) identified from utterances received from creators, listeners or other participants in conversations in any manner, e.g., by one or more topic modeling algorithms or methods such as one or more latent Dirichlet allocations, matrix factorizations, latent semantic analyses, pachinko allocation models, transformers (e.g., a bidirectional encoder representation from transformers) or others. In some implementations, one or more tags or descriptions of the topics may be automatically generated, or selected or designated by a creator or another participant identified during the media content. Alternatively, in some implementations, a creator or another individual may identify or specify any topics associated with a set of words of a media program, e.g., by manually selecting such words and designating a topic, or a tag In some implementations, where media content includes signals generated by any number of speakers, portions of the media content generated by each of such speakers may be identified accordingly. For example, the data representing the utterances 122-2 through 122-13 or any sets of words identified based on the data may be further processed to identify portions of the media program uttered by one or more speakers, viz., the creator 110 and the listener 180-1. For example, in some implementations, data representing the utterances 122-2 through 122-13 or any sets of words identified based on the data may be partitioned into segments corresponding to different speakers, e.g., by speaker diarization, which may determine that one or more words or phrases of the transcript are in a number of different, individual voices, or spoken by a number of different, individual speakers. The transcript or the portion of the media content may be processed to identify or predict a number of different speakers expressed therein, to identify boundaries of segments of the transcript or the portion of the media content associated with each of the different speakers, or to assign each of such segments with one or more discrete speakers. Alternatively, in some implementations, a creator, a listener or another individual may identify individual speakers based on the data representing the utterances 122-2 through 122-13 or any sets of words identified based on the data.

Moreover, signals representative of interactions received from listeners to the media content, e.g., numbers of listeners to the media content, as well as reactions or expressions of interest or disinterest by such listeners, or chat messages received from such listeners during the media content, which may be received via one or more user interfaces such as the user interface 130-1 shown in FIG. 1C, may also be identified as contextual features and stored in association with the media content. As is shown in FIGS. 1D and 1E, numbers of interactions 136, 138, 139 received from listeners via the user interface 130-1, or similar interfaces, including selections of interactive features 136-1, 136-2, 136-3, 136-4, 136-5, 136-6, 136-7, 136-8, transmissions of chat messages 138 or requests 139 to participate in the media program are received and identified during the transmission of the media program to listeners.

For example, as is shown in FIGS. 1D and 1E, interactions 136 with the interactive feature 136-1 representing generally pleasant, cheery or humorous emotions or opinions were received from listeners during the utterances 122-2, 122-4, 122-5, 122-6, while an interaction 136 with the interactive feature 136-3 representing a mildly concerned, disappointed or sad emotion or opinion, or an emotion or opinion that is neutral, was received from a listener during the utterance 122-8, and interactions 136 with the interactive feature 136-4 representing radiant or glowing emotions or opinions, or outwardly positive emotions or opinions, were received during the utterances 122-10, 122-13. Interactions 136 with the interactive feature 136-5 representing emotions or opinions of amazement, fascination or excitement were received during the utterances 122-3, 122-5, 122-7, 122-9, while an interaction 136 with the interactive feature 136-6 implying that further evaluation or consideration may be required was received during the utterance 122-8, and interactions 136 with the interactive feature 136-7 representing emotions or opinions of inspection or skepticism were received during the utterances 122-7, 122-13. Alternatively, or additionally, any other type of interaction received from listeners may be identified and associated with portions of the media program, including but not limited to one or more utterances during which such interactions were received.

Likewise, as is also shown in FIG. 1D, four chat messages 138 were received from listeners during the utterance 122-2, while one chat message 138 was received during the utterance 122-3, six chat messages 138 were received during the utterance 122-6, fifteen chat messages 138 were received during the utterance 122-7, and eleven chat messages 138 were received during the utterance 122-8. As is shown in FIG. 1E, seven chat messages 138 were received from listeners during the utterance 122-9, while three chat messages 138 were received during the utterance 122-10, two chat messages 138 were received during the utterance 122-11, sixteen chat messages 138 were received during the utterance 122-12 and twelve chat messages 138 were received during the utterance 122-13.

As is further shown in FIG. 1D, two requests 139 to participate in the media program were received during the utterance 122-2, while four such requests 139 were received during the utterance 122-6, and three such requests 139 were received during the utterance 122-7. As is shown in FIG. 1E, one request 139 to participate in the media program was received during the utterance 122-9, while four such requests 139 were received during the utterance 122-12, and eight requests 139 were received during the utterance 122-13.

Figure 1F:
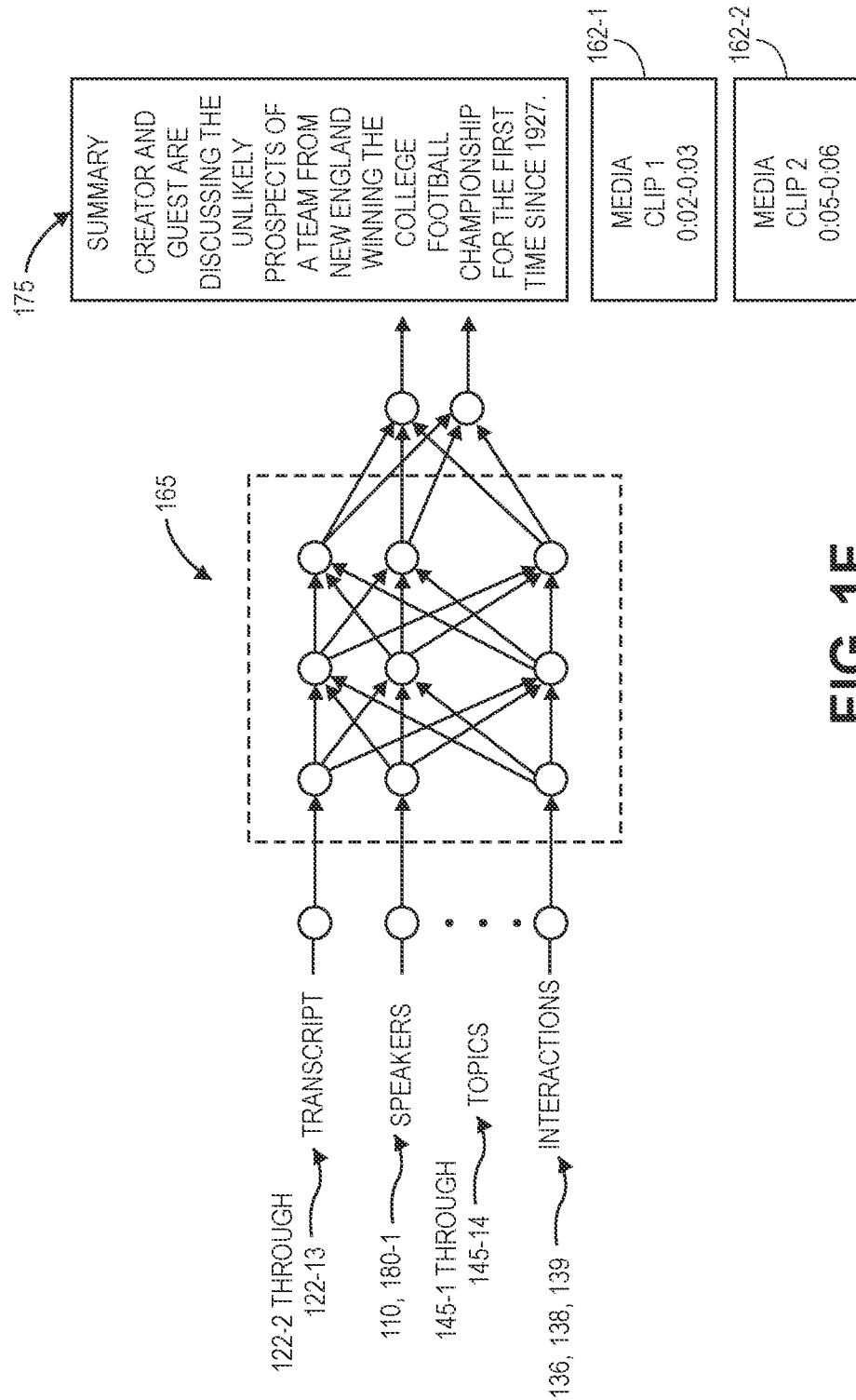

In accordance with implementations of the present disclosure, and as is shown in FIG. 1F, a transcript of media content of a media program, e.g., the utterances 122-2 through 122-13, may be provided along with contextual features regarding the media program, e.g., the topics 145-1 through 145-14 of the media content, identities of the speakers (viz., the creator 110 and the listener 180-1) of the media content, or the interactions 136, 138, 139 received from listeners during the playing of the media program, as inputs to a model 165 that is trained to output a summary based on such inputs. The model 165 may be any type or form of machine learning algorithm, system or technique, such as an artificial neural network, e.g., a recurrent neural network, or a convolutional neural network, transformers such as a bidirectional encoder representation from transformers, or any other machine learning algorithm, system or technique. Alternatively, or additionally, the inputs to the model may include one or more portions of the media content of the media program that have been transmitted to the devices of the listeners, or any other attributes of the creator 110, the listener 180-1, or any other participants in the media program, such as their respective names, locations, or any other identifiers of such participants.

As is shown in FIG. 1F, based on one or more outputs received from the model 165 in response to the inputs, a summary 175 of the media program, e.g., the utterances 122-2 through 122-13, may be generated. For example, as is shown in FIG. 1F, the summary 175 states that the "Creator and Guest are discussing the unlikely prospects of a team from New England winning the college football championship for the first time since 1927." The summary 175 may be stored in association with one or more portions of the media program, e.g., data representing the utterances 122-2 through 122-13, and displayed or announced to any prospective listeners who are interested in joining the media program in progress, or updated as necessary as additional media content is transmitted in accordance with the media program.

Additionally, one or more representative portions, e.g., media clips, of the media program may be identified or generated based on the outputs received from the model 165. For example, as is also shown in FIG. 1F, a pair of media clips 162-1, 162-2 including actual portions of the media program that were previously transmitted to listeners of the media program and have been identified as particularly relevant or noteworthy based on such outputs, may be stored in association with one or more portions of the media program, e.g., the utterances 122-2 through 122-13. In addition to viewing or hearing one or more portions of the summary 175, a prospective listener may request to play either or both of the media clips 162-1, 162-2 when determining whether to join the media program in progress. In some implementations, the media clips 162-1, 162-2 may be identified based on the summary 175. For example, where the summary 175 was derived from portions of one or more of the utterances 122-2 through 122-13, the media clips 162-1, 162-2 may include media content representing the portions of the utterances 122-2 through 122-13 from which the summary 175 was derived. Alternatively, the media clips 162-1, 162-2 may be identified in any other manner.

Figure 1G:
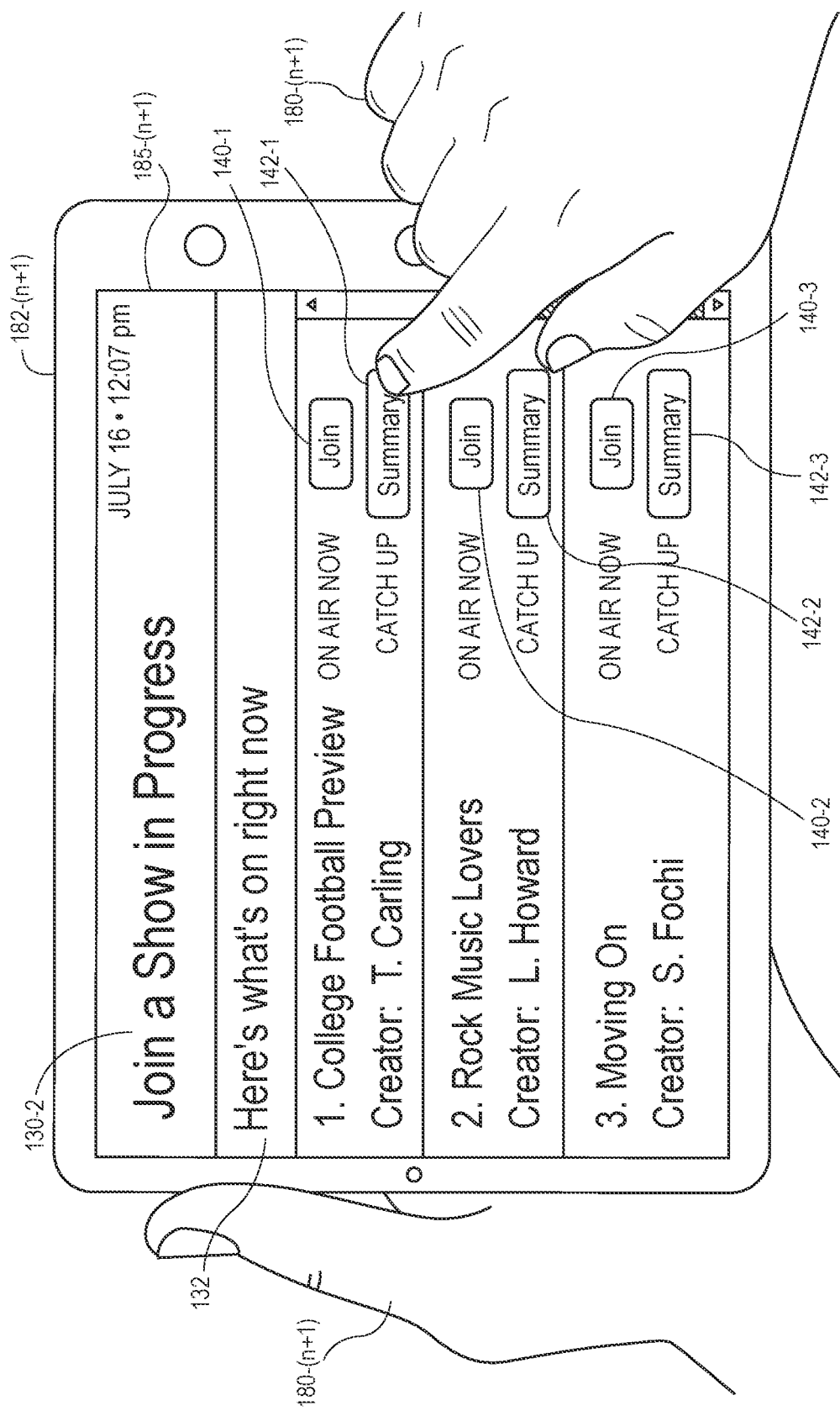

As is shown in FIG. 1G, a mobile device 182-($n$+1) of a prospective listener 180-($n$+1) includes a user interface 130-2 rendered on a display 185-($n$+1). The user interface 130-2 includes a section 132 having information regarding any number of media programs rendered thereon, including text-based descriptions of the media programs, as well as buttons 140-1, 140-2, 140-3 or other selectable features for joining the media programs, and buttons 142-1, 142-2, 142-3 or other selectable features for accessing summaries of the media programs. In some implementations, one or more portions of the summary 175 may be initially rendered on the display 185-($n$+1), or announced by one or more speakers of the mobile device 182-($n$+1), and need not be requested by the prospective listener 180-($n$+1). As is further shown in FIG. 1G, the prospective listener 180-(*n*+1) may execute a gesture or another interaction with a selectable feature for causing a display of the summary 175 of the media program. Alternatively, or additionally, the prospective listener 180-(*n*+1) may utter one or more voice commands that may be captured by microphones or other sensors of the mobile device 182-(*n*+1), and interpreted by the mobile device 182-(*n*+1), to indicate his or her interest in learning more about media programs, or to request a summary or other information regarding the media programs.

Figure 1H:
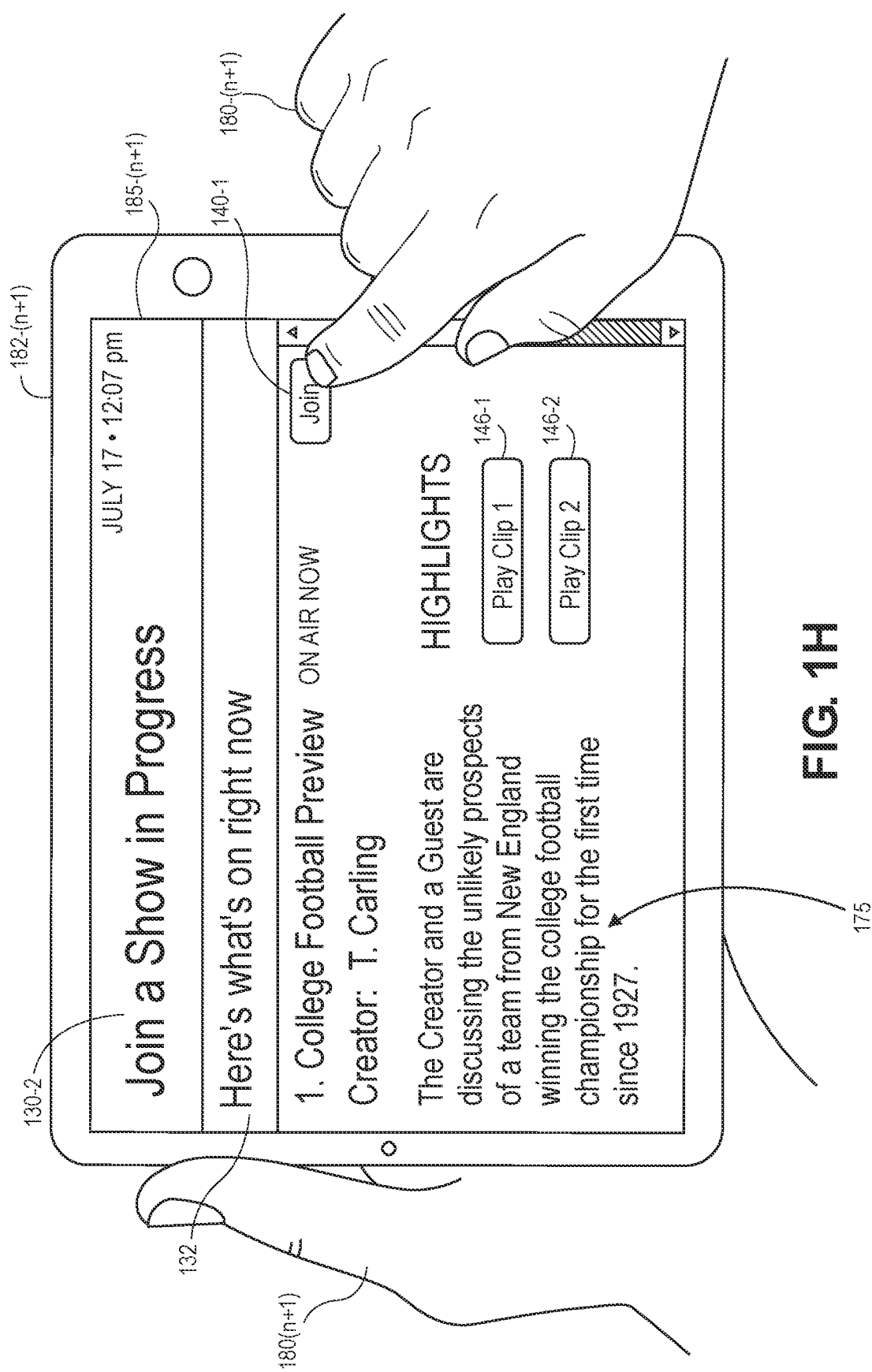

As is shown in FIG. 1H, after selecting the button 142-1 shown in FIG. 1G, the summary 175 is displayed within a first portion of the section 132, and buttons 146-1, 146-2 or other selectable features for receiving the media clips 162-1, 162-2 associated with the media program are displayed within a second portion of the section 132, beneath a header of "Highlights." The listener 180-(*n*+1) may read the summary 175 and/or request one or both of the media clips 162-1, 162-2, and decide whether to join the media program, e.g., by selecting the button 140-1, as is shown in FIG. 1H, which causes a communications channel to be established with the control system 150, and causes media content in accordance with the media program to be transmitted to the mobile device 182-(*n*+1) from the control system 150.

Accordingly, the systems and methods of the present disclosure are directed to summarizing media content of "live" media programs that are in progress, and presenting summaries of the media content of such media programs to prospective listeners or viewers. For example, information or data regarding media content of a media program may be processed to transcribe the media content, e.g., in real time or in near-real time, by automated speech recognition or any other techniques. The media content may be processed to identify or recognize any known media content (e.g., music "tracks") being played during the media program, e.g., through records of the media content then being played or other analyses, and to determine whether the media content is the focus of the media program, or is being played in the background of the media program, as well as to extract any words that are spoken, sung or otherwise uttered in the foreground as the media content is being played. A transcript or any sets of words recognized within the media content may also be processed to identify one or more topics of discussion during the media content, as well as any number of speakers (e.g., creators, guests, listeners, artists or others). One or more tags or descriptions of the topics of discussion may be automatically generated, or selected by a creator or another speaker identified during the media content. Moreover, signals representative of engagement with listeners to the media content, e.g., numbers of listeners to the media content, as well as reactions or expressions of interest or disinterest by such listeners, chat messages or requests to provide media content that are received from such listeners, or others, may also be stored in association with the media content.

From such information or data, summaries of media programs or representative portions of such media programs may be generated and stored, and presented to prospective listeners or viewers of the media programs, e.g., in one or more menus or other user interfaces, or in one or more audible signals. For example, where a media program includes or describes one or more concerts, a summary may list media entities (e.g., songs or music tracks) that have been played or are in progress, and include descriptions of any information regarding artists performing in the concerts, along with media content, such as sound or videos, that include preferred or representative portions of such concerts (e.g., preferred or popular music tracks), or any other information or data. Where a media program includes or describes a comedic performance (e.g., stand-up comedy), one or more jokes having strong audience reactions may be shown or described, along with media (e.g., sounds or videos) of any of such jokes, or any other information or data. Where a media program is a radio show, e.g., a "talk" radio program, topics of discussion that have already been discussed may be shown or described in text, or made available for listening or viewing in sounds or videos, along with any other information or data. Where a media program includes or describes a sporting event, a score and a summary of key events that have occurred during the sporting event may be shown or described, along with media (e.g., sounds or videos) of one or more of such key events, or any other information or data. Where a media program is a sequel to a previously aired media program, a summary of the previously aired media program may be shown or described, and sounds or videos of important parts of the previously aired media program may be made available for listening or viewing, along with any other information or data. Moreover, in some implementations, a summary of a media program or relevant portions of the media program may be personalized for a prospective listener or viewer, e.g., based on his or her listening or viewing histories, activities or engagement, in an effort to reflect his or her evolving tastes, or customized based on one or more attributes of a device or system of the prospective listener or viewer.

Media content received from listeners may be processed according to any algorithms, systems or techniques, including but not limited to one or more machine learning algorithms, systems or techniques, to transcribe or otherwise identify words uttered by a listener within such media content, to determine a sentiment associated with the media content, or to determine whether the sentiment or the words of a voice sample or an utterance are objectionable (e.g., obscene, indecent, profane or divisive). As used herein, the term "media entity" may refer to media content of any type or form (e.g., audio and/or video) that may be recorded, stored, maintained or transmitted in one or more files, such as a movie, podcast, a song (or title), a television show, or any other audio and/or video programs. The term "media entity" may also refer to a descriptor of media content, e.g., an era, a genre, or a mood, or any other descriptor of one or more audio and/or video programs. The term "media entity" may further include a file including information, data or metadata regarding one or more sets of media content, or a physical or virtual representation of the one or more sets of media content, such as an album, a playlist, a soundtrack, or any other information, data, metadata, or representations. The term "media entity" may also include one or more persons or entities associated with such media content, e.g., an artist, a group, a label, a producer, a service, a station, or any other persons or entities.

In some implementations, audio data including or representing media content may be processed by one or more natural language understanding (or "NLU") processing module, a speech recognition engine or module, or another processing module, to identify words represented in the audio data. For example, one or more computer devices or systems may transform audio data for processing by a speech recognition engine or module, which may compare the data to one or more acoustic models, language models or other data models to recognize any words incorporated in the audio data. In some implementations, data captured by a device of the listener may be processed, e.g., by an acoustic front end, to reduce noise or divided into frames representing one or more intervals of time for which values or features representing qualities of the data, along with a vector of such values or features, may be determined, e.g., by one or more mel-frequency cepstral coefficients (or "MFCCs"), perceptual linear predictive (or "PLP") techniques, neural network feature vector techniques, linear discriminant analysis, semi-tied covariance matrices, or any other approaches known to those of skill in the art.

In some implementations, a speech recognition engine or module may further process outputs of an acoustic front end by reference to information or data stored in a speech model storage. In some other implementations, a speech recognition engine may attempt to match features, or feature vectors, to phonemes or words identified by or stored in association with one or more acoustic models, language models, or other models. In some implementations, a speech recognition engine may also compute one or more values or scores for such feature vectors based on any information, data or metadata regarding the audio data, such an acoustic score representing a likelihood that a sound represented by a group of feature vectors matches a language phoneme. An acoustic score may be further adjusted based on an extent to which sounds and/or words are heard or used in context with each other, thereby enhancing a likelihood that an output of a speech recognition module or engine will make sense grammatically. Such models may be general, e.g., with respect to a language, or specific with respect to a particular domain. Additionally, a speech recognition engine or module may use any number of techniques to match feature vectors to phonemes, e.g., Hidden Markov Models (or "HMM") to determine probabilities of matches between feature vectors and one or more phonemes. Speech recognition modules or engines may operate on any number of devices, including but not limited to a device that captured the audio data of a voice sample, one or more computer devices associated with a broadcast system, or a device associated with a creator. Results identified by a speech recognition module or engine may be provided to one or more other components, in the form of a single textual representation of speech included in a voice sample, a list of any number of hypotheses and respective scores, or any other representation.

Moreover, whether one or more words of a voice sample is objectionable may be determined in any manner, such as by comparison with a table or set of words previously designated as objectionable, or in any other manner.

In some implementations, media content, or a transcript or other written account of the media content, may be processed to determine a sentiment of the media content, or one or more evaluations, attitudes, appraisals, emotions, moods or judgments represented within the media content. For example, a sentiment or opinion may be identified or classified with respect to a transcript of media content as a whole, or with respect to one or more individual portions (e.g., passages, paragraphs or sentences) of the media content. When analyzing media content or a portion thereof in order to identify a sentiment or opinion expressed therein, the media content may be bifurcated or otherwise divided into sections containing objective, fact-based statements or components, and sections containing subjective, opinion-based statements or components, the latter of which is considered or emphasized in a sentiment analysis context. Subjective, opinion-based statements or components may further be subdivided into groups of express opinions (e.g., "I like Siberian Huskies") or opinions of a comparative nature (e.g., "I prefer the colors blue and white over the colors burgundy and gold").

Additionally, a sentiment or opinion of media content may be identified broadly in terms of polarity, i.e., whether the media content is generally positive, negative or neutral, or in terms of grades or degrees. For example, media content may be classified as "happy" or "sad," "inspirational" or "depressing," "peaceful" or "disturbed," "angry" or "content," or with any other identifier or pair of identifiers, and to any extent or degree thereof, which may be expressed in one or more qualitative or quantitative terms. Moreover, sentiment analyses may be trained or restricted to a specific topic or category, or otherwise directed to obtaining a sentiment of a focused nature, such as a sentiment regarding the economy, sports or politics.

In order to identify and obtain a sentiment from media content, a transcript or other set of text or any data or information included in the media content may be analyzed in any manner. For example, one or more machine learning algorithms or techniques may be provided to determine a sentiment from a transcript of the media content, or the media content itself, e.g., by one or more nearest neighbor methods or analyses, artificial neural networks, factorization methods or techniques, K-means clustering analyses or techniques, similarity measures such as log likelihood similarities or cosine similarities, Bayesian classifiers, singular value decomposition methods, latent Dirichlet allocations or other topic models, linear or non-linear models, or latent semantic analyses, which may be used to review and assess the media content, and to identify any pertinent keywords maintained therein, which may be analyzed and associated with one or more sentiments thereof.

A topic (or a theme) may be identified from a set of words identified from utterances received from creators, listeners or other participants in a media program in any manner, e.g., by one or more topic modeling algorithms or methods such as one or more latent Dirichlet allocations, matrix factorizations, latent semantic analyses, pachinko allocation models, transformers (e.g., a bidirectional encoder representation from transformers) or others. In some implementations, a topic (or a theme) may be identified by counting words (including any known synonyms) appearing within a set of words, or defining groups of the words that best represent the set. In some implementations, a topic (or a theme) may be identified based on an extent to which words are repeated within the set of words, or a frequency with which such words appear, as well as how such words are used within individual chat messages or the set of words as a whole. A topic (or a theme) may also be identified by comparing and contrasting different portions of a set of words, e.g., portions spoken by different speakers (e.g., creators, listeners or other participants), or based on text not actually included within the set of words. A topic (or a theme) may also be identified based on any metaphors or analogies included within a set of words as a whole, as well as based on any transitions or connections between any portions of the set of words.

Additionally, in some implementations, a topic (or a theme) may be identified or designated by a creator, a listener or another individual, who may be prompted or encouraged to apply one or more tags or other labels indicative of a topic, or to identify a point in time during which a topic of the portion of the media content has changed. Records of such tags or labels, or times at which such tags or labels were received, may be stored and utilized to identify one or more topics associated with the portion of the media content. Alternatively, a topic (or a theme) may be identified from a set of words, on any other basis. Furthermore, a topic (or a theme) may be identified at any point in time and from any portion of media content. Topics (or themes) may be identified based on any words spoken by any participants (e.g., creators or listeners) in a media program, or based on words spoken by all of the participants in the media program. Tags or descriptions of the topics of discussion may be automatically generated, or selected by a creator or another speaker identified during the media content.

One or more of the embodiments disclosed herein may overcome limitations of existing systems and methods for presenting media programs or other content, e.g., radio programs, to listeners. Unbounded by traditional frequency bands or broadcast protocols, the systems and methods of the present disclosure may receive designations of media content from a creator of a media program, e.g., in a broadcast plan, and the media program may be transmitted over one or more networks to any number of listeners in any locations and by way of any devices. Creators of media programs may designate one or more types or files of media content to be broadcast to listeners via a user interface rendered on a display or by any type or form of computer device, in accordance with a broadcast plan or other schedule. A control system, or a mixing system, a conference system or a broadcast system, may retrieve the designated media content from any number of sources, or initiate or control the designated media content to any number of listeners, by opening one or more connections between computer devices or systems of the creator and computer devices or systems of the sources or listeners.

In some implementations of the present disclosure, one-way communication channels, or unidirectional channels, may be established between a broadcast system (or a control system) and any number of other computer devices or systems. For example, broadcast channels may be established between a broadcast system (or a control system) and sources of media or other content, or between a broadcast system (or a control system) and devices of any number of listeners, for providing media content. Two-way communication channels, or bidirectional channels, may also be established between a conference system (or a control system) and any number of other computer devices or systems. For example, a conference channel may be established between a computer device or system of a creator or another source of media and a conference system (or a control system). Furthermore, one-way or two-day communication channels may be established between a conference system and a mixing system, or between a mixing system and a broadcast system, as appropriate.

Communication channels may be established in any manner, in accordance with implementations of the present disclosure. Those of ordinary skill in the pertinent arts will recognize that computer networks, such as the Internet, may operate based on a series of protocols that are layered on top of one another. Such protocols may be collectively referred to as an Internet Protocol suite (or IP suite). One underlying layer of the IP suite is sometimes referred to in the abstract as a link layer, e.g., physical infrastructure, or wired or wireless connections between one or more networked computers or hosts. A second layer atop the link layer is a network layer, which is sometimes called an Internet Protocol layer, and is a means by which data is routed and delivered between two disparate physical locations.

A third layer in an IP suite is a transport layer, which may be analogized to a recipient's mailbox. The transport layer may divide a host's network interface into one or more channels, or ports, with each host having as many ports available for establishing simultaneous network connections. A socket is a combination of an IP address describing a host for which data is intended and a port number indicating a channel on the host to which data is directed. A socket is used by applications running on a host to listen for incoming data and send outgoing data. One standard transport layer protocol is the Transmission Control Protocol, or TCP, which is full-duplex, such that connected hosts can concurrently send and receive data. A fourth and uppermost layer in the IP suite is referred to as an application layer. Within the application layer, familiar protocols such as Hypertext Transfer Protocol (or "HTTP"), are found. HTTP is built on a request/response model in which a client sends a request to a server, which may be listening for such requests, and the server parses the request and issues an appropriate response, which may contain a network resource.

One application-layer protocol for communicating between servers and clients is called Web Socket, which provides TCP-like functionality at the application layer. Like TCP, WebSocket is full-duplex, such that once an underlying connection is established, a server may, of its own volition, push data to client devices with which the server is connected, and clients may continue to send messages to the server over the same channel. Additionally, a pure server-push technology is also built into HTML5, one version of Hypertext Markup Language. This technology, which is known as Server-Sent Events (or SSE), or operates over standard HTTP, and is one use of an existing application-layer protocol. Server-Sent Events works by essentially sending partial responses to an initial HTTP request, such that a connection remains open, enabling further data to be sent at a later time. In view of its unidirectional nature, Server-Sent Events is useful in situations in which a server will be generating a steady stream of updates without requiring anything further from a client.

Communications channels of the present disclosure may be associated with any type of content and established computer devices and systems associated with any type of entity, and in accordance with a broadcast plan or sequence of media content, or at the control or discretion of one or more creators. One or more user interfaces rendered by or on a computer system or device may permit a creator to control the synchronization or mixing of media content by the broadcast system or the mixing system. Gestures or other interactions with the user interfaces may be translated into commands to be processed by the broadcast system or the mixing system, e.g., to play a specific song or other media entity, to insert a specific advertisement, or to take any other relevant actions, such as to adjust a volume or another attribute or parameter of media content. Moreover, a broadcast system or the mixing system may provide any relevant information to a creator via such user interfaces, including information regarding attributes or parameters of media content that was previously played, that is being played, or that is scheduled to be played in accordance with a broadcast plan or during a media program. The broadcast system or the mixing system may further execute one or more instructions in response to rules, which may define or control media content that is to be played at select times during a media program, e.g., to automatically increase or decrease volumes or other attributes or parameters of a voice of a creator, or of other media content from other sources, on any basis. Any rules governing the playing of media content of a media program by the broadcast system or the mixing system may be overridden by a creator, e.g., by one or more gestures or other interactions with a user interface of an application in communication with the broadcast system or the mixing system that may be associated with the playing of the media content or the media program.

Figure 2A:
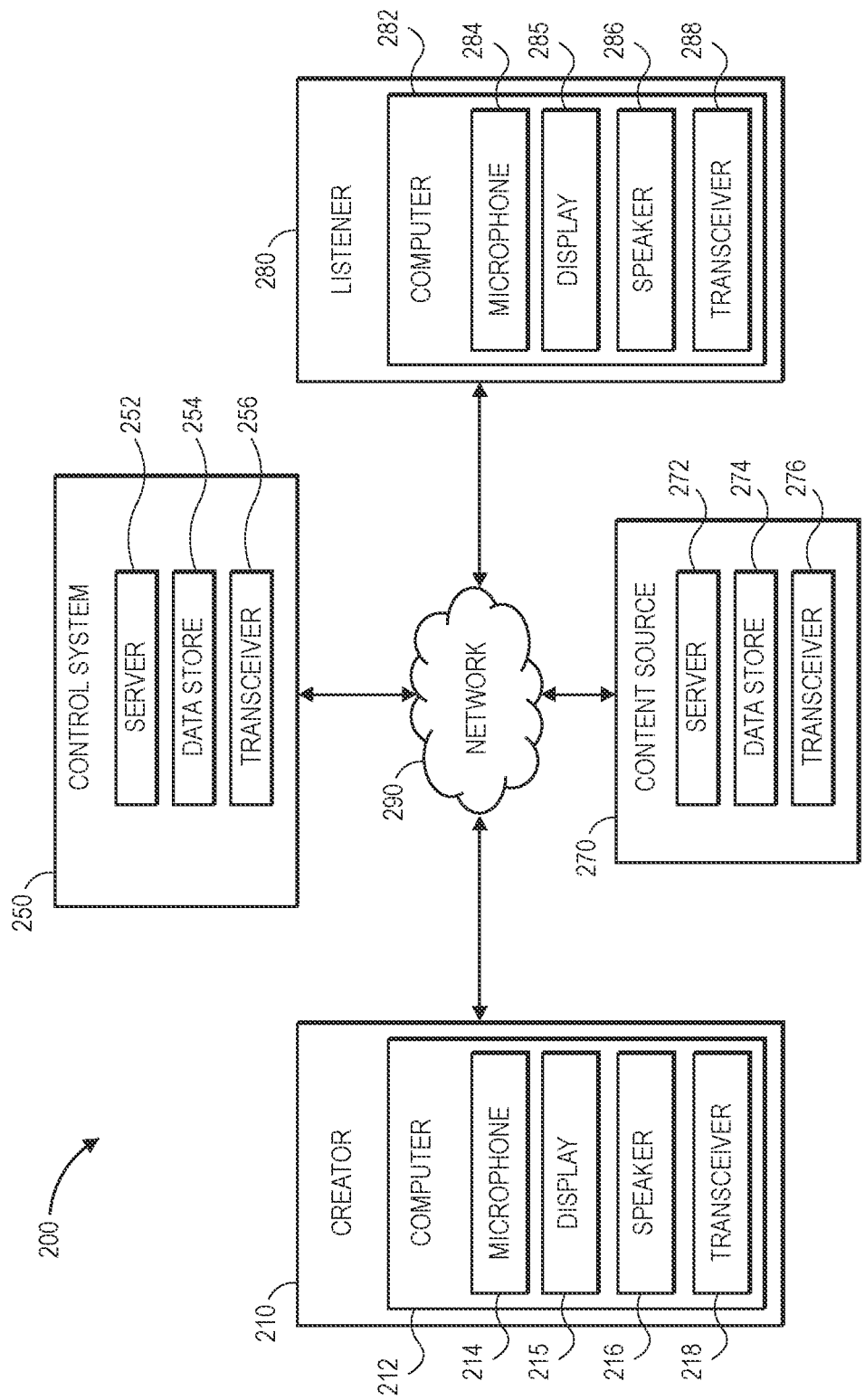
FIGS. 2A and 2B are block diagrams of components of one system for summarizing media content in accordance with embodiments of the present disclosure.
Figure 2B:
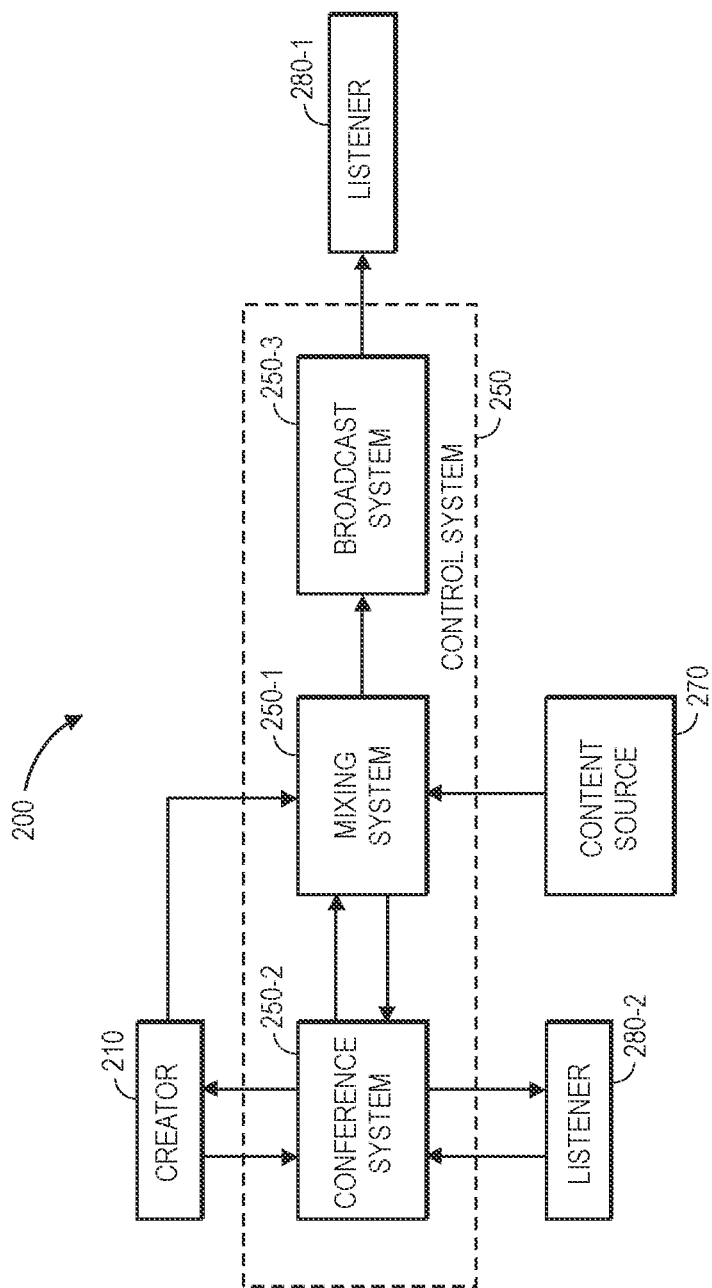

Referring to FIGS. 2A and 2B, block diagrams of components of one system 200 for presenting chat messages to listeners in accordance with embodiments of the present disclosure is shown. Except where otherwise noted, reference numerals preceded by the number "2" shown in FIG. 2A or FIG. 2B indicate components or features that are similar to components or features having reference numerals preceded by the number "1" shown in FIGS. 1A through 1F.

As is shown in FIG. 2A, the system 200 shown in FIG. 2A includes a creator 210, a control system 250, a content source 270, and a listener 280 that are connected to one another over one or more networks 290.

The creator 210 may be any individual or entity that expresses an interest or an intent in constructing a media program including media content, and providing the media program to the listener 280 over the network 290. As is shown in FIG. 2A, the creator 210 is associated with or operates a computer system 212 having a microphone 214, a display 215, a speaker 216 and a transceiver 218, and any other components.

In some implementations, the computer system 212 may be a mobile device, such as a smartphone, a tablet computer, a wristwatch, or others. In some other implementations, the computer system 212 may be a laptop computer or a desktop computer, or any other type or form of computer. In still other implementations, the computer system 212 may be, or may be a part of, a smart speaker, a television, an automobile, a media player, or any other type or form of system having one or more processors, memory or storage components (e.g., databases or other data stores), or other components.

The microphone 214 may be any sensor or system for capturing acoustic energy, including but not limited to piezoelectric sensors, vibration sensors, or other transducers for detecting acoustic energy, and for converting the acoustic energy into electrical energy or one or more electrical signals. The display 215 may be a television system, a monitor or any other like machine having a screen for viewing rendered video content, and may incorporate any number of active or passive display technologies or systems, including but not limited to electronic ink, liquid crystal displays (or "LCD"), light-emitting diode (or "LED") or organic light-emitting diode (or "OLED") displays, cathode ray tubes (or "CRT"), plasma displays, electrophoretic displays, image projectors, or other display mechanisms including but not limited to micro-electromechanical systems (or "MEMS"), spatial light modulators, electroluminescent displays, quantum dot displays, liquid crystal on silicon (or "LCOS") displays, cholesteric displays, interferometric displays or others. The display 215 may be configured to receive content from any number of sources via one or more wired or wireless connections, e.g., the control system 250, the content source 270 or the listener 280, over the networks 290.

In some implementations, the display 215 may be an interactive touchscreen that may not only display information or data but also receive interactions with the information or data by contact with a viewing surface. For example, the display 215 may be a capacitive touchscreen that operates by detecting bioelectricity from a user, or a resistive touchscreen including a touch-sensitive computer display composed of multiple flexible sheets that are coated with a resistive material and separated by an air gap, such that when a user contacts a surface of a resistive touchscreen, at least two flexible sheets are placed in contact with one another.

The speaker 216 may be any physical components that are configured to convert electrical signals into acoustic energy such as electrodynamic speakers, electrostatic speakers, flat-diaphragm speakers, magnetostatic speakers, magnetostrictive speakers, ribbon-driven speakers, planar speakers, plasma arc speakers, or any other sound or vibration emitters.

The transceiver 218 may be configured to enable the computer system 212 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 218 may further include or be in communication with one or more input/output (or "I/O") interfaces, network interfaces and/or input/output devices, and may be configured to allow information or data to be exchanged between one or more of the components of the computer system 212, or to one or more other computer devices or systems (not shown) via the network 290. The transceiver 218 may perform any necessary protocol, timing or other data transformations in order to convert data signals from a first format suitable for use by one component into a second format suitable for use by another component. In some embodiments, the transceiver 218 may include support for devices attached through various types of peripheral buses, e.g., variants of the Peripheral Component Interconnect (PCI) bus standard or the Universal Serial Bus (USB) standard. In some other embodiments, functions of the transceiver 218 may be split into two or more separate components.

In some implementations, the computer system 212 may include a common frame or housing that accommodates the microphone 214, the display 215, the speaker 216 and/or the transceiver 218. In some implementations, applications or functions or features described as being associated with the computer system 212 may be performed by a single system. In some other implementations, however, such applications, functions or features may be split among multiple systems. For example, an auxiliary system, such as the ear buds 113 of FIG. 1A, may perform one or more of such applications or functions, or include one or more features, of the computer system 212 or other computer systems or devices described herein, and may exchange any information or data that may be associated with such applications, functions or features with the computer system 212, as necessary. Alternatively, or additionally, the computer system 212 may include one or more power supplies, sensors (e.g., visual cameras or depth cameras), feedback devices (e.g., haptic feedback systems), chips, electrodes, clocks, boards, timers or other relevant features (not shown).

In some implementations, the computer system 212 may be programmed or configured to render one or more user interfaces on the display 215 or in any other manner, e.g., by a browser or another application. The computer system 212 may receive one or more gestures or other interactions with such user interfaces, and such gestures or other interactions may be interpreted to generate one or more instructions or commands that may be provided to one or more of the control system 250, the content source 270 or the listener 280. Alternatively, or additionally, the computer system 212 may be configured to present one or more messages or information to the creator 210 in any other manner, e.g., by voice, and to receive one or more instructions or commands from the creator 210, e.g., by voice.

The control system 250 may be any single system, or two or more of such systems, that is configured to establish or terminate channels or connections with or between the creator 210, the content source 270 or the listener 280, to initiate a media program, or to control the receipt and transmission of media content from one or more of the creator 210, the content source 270 or the listener 280 to the creator 210, the content source 270 or the listener 280. The control system 250 may operate or include a networked computer infrastructure, including one or more physical computer servers 252 and data stores 254 (e.g., databases) and one or more transceivers 256, that may be associated with the receipt or transmission of media or other information or data over the network 290. The control system 250 may also be provided in connection with one or more physical or virtual services configured to manage or monitor such files, as well as one or more other functions. The servers 252 may be connected to or otherwise communicate with the data stores 254 and may include one or more processors. The data stores 254 may store any type of information or data, including media files or any like files containing multimedia (e.g., audio and/or video content), for any purpose. The servers 252 and/or the data stores 254 may also connect to or otherwise communicate with the networks 290, through the sending and receiving of digital data.

In some implementations, the control system 250 may be independently provided for the exclusive purpose of managing the monitoring and distribution of media content. Alternatively, the control system 250 may be operated in connection with one or more physical or virtual services configured to manage the monitoring or distribution of media files, as well as one or more other functions. Additionally, the control system 250 may include any type or form of systems or components for receiving media files and associated information, data or metadata, e.g., over the networks 290. For example, the control system 250 may receive one or more media files via any wired or wireless means and store such media files in the one or more data stores 254 for subsequent processing, analysis and distribution. In some embodiments, the control system 250 may process and/or analyze media files, such as to add or assign metadata, e.g., one or more tags, to media files.

The control system 250 may further broadcast, air, stream or otherwise distribute media files maintained in the data stores 254 to one or more listeners, such as the listener 280 or the creator 210, over the networks 290. Accordingly, in addition to the server 252, the data stores 254, and the transceivers 256, the control system 250 may also include any number of components associated with the broadcasting, airing, streaming or distribution of media files, including but not limited to transmitters, receivers, antennas, cabling, satellites, or communications systems of any type or form. Processes for broadcasting, airing, streaming and distribution of media files over various networks are well known to those skilled in the art of communications and thus, need not be described in more detail herein.

The content source 270 may be a source, repository, bank, or other facility for receiving, storing or distributing media content, e.g., in response to one or more instructions or commands from the control system 250. The content source 270 may receive, store or distribute media content of any type or form, including but not limited to advertisements, music, news, sports, weather, or other programming. The content source 270 may include, but need not be limited to, one or more servers 272, data stores 274 or transceivers 276, which may have any of the same attributes or features of the servers 252, data stores 254 or transceivers 256, or one or more different attributes or features.

In some embodiments, the content source 270 may be an Internet-based streaming content and/or media service provider that is configured to distribute media over the network 290 to one or more general purpose computers or computers that are dedicated to a specific purpose.

For example, in some embodiments, the content source 270 may be associated with a television channel, network or provider of any type or form that is configured to transmit media files over the airwaves, via wired cable television systems, by satellite, over the Internet, or in any other manner. The content source 270 may be configured to generate or transmit media content live, e.g., as the media content is captured in real time or in near-real time, such as following a brief or predetermined lag or delay, or in a pre-recorded format, such as where the media content is captured or stored prior to its transmission to one or more other systems. For example, the content source 270 may include or otherwise have access to any number of microphones, cameras or other systems for capturing audio, video or other media content or signals. In some embodiments, the content source 270 may also be configured to broadcast or stream one or more media files for free or for a one-time or recurring fee. In some embodiments, the content source 270 may be associated with any type or form of network site (e.g., a web site), including but not limited to news sites, sports sites, cultural sites, social networks or other sites, that streams one or more media files over a network. In essence, the content source 270 may be any individual or entity that makes media files of any type or form available to any other individuals or entities over one or more networks 290.

The listener 280 may be any individual or entity having access to one or more computer devices 282, e.g., general purpose or special purpose devices, who has requested (e.g., subscribed to) media content associated with one or more media programs over the network 290. For example, the computer devices 282 may be at least a portion of an automobile, a desktop computer, a laptop computer, a media player, a smartphone, a smart speaker, a tablet computer, a television, or a wristwatch, or any other like machine that may operate or access one or more software applications, and may be configured to receive media content, and present the media content to the listener 280 by one or more speakers, displays or other feedback devices. The computer device 282 may include a microphone 284, a display 285, a speaker 286, a transceiver 288, or any other components described herein, which may have any of the same attributes or features of the computer device 212, the microphone 214, the display 215, the speaker 216 or the transceiver 218 described herein, or one or more different attributes or features. In accordance with the present disclosure, a listener 280 that requests to receive media content associated with one or more media programs may also be referred to as a "subscriber" to such media programs or media content.

Those of ordinary skill in the pertinent arts will recognize that the computer devices 212, 282 may include any number of hardware components or operate any number of software applications for playing media content received from the control system 250 and/or the media sources 270, or from any other systems or devices (not shown) connected to the network 290.

Moreover, those of ordinary skill in the pertinent arts will further recognize that, alternatively, in some implementations, the computer device 282 need not be associated with a specific listener 280. For example, the computer device 282 may be provided in a public place, beyond the control of the listener 280, e.g., in a bar, a restaurant, a transit station, a shopping center, or elsewhere, where any individuals may receive one or more media programs.

The networks 290 may be or include any wired network, wireless network, or combination thereof, and may comprise the Internet, intranets, broadcast networks, cellular television networks, cellular telephone networks, satellite networks, or any other networks, for exchanging information or data between and among the computer systems or devices of the creator 210, the control system 250, the media source 270 or the listener 280, or others (not shown). In addition, the network 290 may be or include a personal area network, local area network, wide area network, cable network, satellite network, cellular telephone network, or combination thereof, in whole or in part. The network 290 may also be or include a publicly accessible network of linked networks, possibly operated by various distinct parties, such as the Internet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

Although the system 200 shown in FIG. 2A shows boxes for one creator 210, one control system 250, one media source 270, one listener 280, and one network 290, those of ordinary skill in the pertinent arts will recognize that any number of creators 210, broadcast systems 250, media sources 270, listeners 280 or networks 290 may be utilized to transmit, receive, access, hear, or view media content provided in accordance with implementations of the present disclosure. Moreover, the computer devices 212, 252, 272, 282 may include all or fewer of the components shown in FIG. 2A or perform all or fewer of the tasks or functions described herein. Tasks or functions described as being executed or performed by a single system or device associated with the creator 210, the control system 250, the media source 270 or the listener 280 may be executed or performed by multiple systems or devices associated with each of the creator 210, the control system 250, the media source 270 or the listener 280. For example, the tasks or functions described herein as being executed or performed by the control system 250 may be performed by a single system, or by separate systems for establishing two-way connections with the creator 210 or any number of media sources 270, or any other systems, e.g., a mixing system, or for establishing one-way connections with any number of media sources 270 or any number of listeners 280 and transmitting data representing media content, e.g., a broadcast system, from such media sources 270 to such listeners 280. Moreover, two or more creators 210 may collaborate on the construction of a media program.

In some implementations, one or more of the tasks or functions described as being executed or performed by the control system 250 may be performed by multiple systems. For example, as is shown in FIG. 2B, the system 200 may include a mixing system 250-1, a conference system 250-2 and a broadcast system 250-3 that may perform one or more of the tasks or functions described herein as being executed or performed by the control system 250.

As is further shown in FIG. 2B, the mixing system 250-1 may be configured to receive data from the conference system 250-2, as well as from one or more content sources 270. For example, in some implementations, the conference system 250-2 may also be configured to establish two-way communications channels with computer devices or systems associated with the creator 210 (or any number of creators) as well as a listener 280-2 (or any number of listeners) or other authorized hosts, guests, or contributors to a media program associated with one or more of the creators 210, and form a "conference" including each of such devices or systems. The conference system 250-2 may receive data representing media content such as audio signals in the form of words spoken or sung by one or more of the creator 210, the listener 280-2, or other entities connected to the conference system 250-2, or music or other media content played by the one or more of the creator 210, the listener 280-2, or such other entities, and transmit data representing the media content or audio signals to each of the other devices or systems connected to the conference system 250-2.

In some implementations, the mixing system 250-1 may also be configured to establish a two-way communications channel with the conference system 250-2, thereby enabling the mixing system 250-1 to receive data representing audio signals from the conference system 250-2, or transmit data representing audio signals to the conference system 250-2. For example, in some implementations, the mixing system 250-1 may act as a virtual participant in a conference including the creator 210 and any listeners 280-2, and may receive data representing audio signals associated with any participants in the conference, or provide data representing audio signals associated with media content of the media program, e.g., media content received from any of the content sources 270, to such participants.

The mixing system 250-1 may also be configured to establish a one-way communications channel with the content source 270 (or with any number of content sources), thereby enabling the mixing system 250-1 to receive data representing audio signals corresponding to advertisements, songs or media files, news programs, sports programs, weather reports or any other media files, which may be live or previously recorded, from the content source 270. The mixing system 250-1 may be further configured to establish a one-way communications channel with the broadcast system 250-3, and to transmit data representing media content received from the creator 210 or the listener 280-2 by way of the conference channel 250-2, or from any content sources 270, to the broadcast system 250-3 for transmission to any number of listeners 280-1.

The mixing system 250-1 may be further configured to receive information or data from one or more devices or systems associated with the creator 210, e.g., one or more instructions for operating the mixing system 250-1. For example, in some implementations, the mixing system 250-1 may be configured to cause any number of connections to be established between devices or systems and one or more of the conference system 250-2 or the broadcast system 250-3, or for causing data representing media content of any type or form to be transmitted to one or more of such devices or systems in response to such instructions. In some implementations, the mixing system 250-1 may also be configured to initiate or modify the playing of media content, such as by playing, pausing or stopping the media content, advancing (e.g., "fast-forwarding") or rewinding the media content, increasing or decreasing levels of volume of the media content, or setting or adjusting any other attributes or parameters (e.g., treble, bass, or others) of the media content, in response to such instructions or automatically.

The broadcast system 250-3 may be configured to establish one-way communications channels with any number of listeners 280-1, and to transmit data representing media content received from the mixing system 250-1 to each of such listeners 280-1.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The computer devices 212, 282 or the servers 252, 272, and any associated components, may use any web-enabled or Internet applications or features, or any other client-server applications or features including E-mail or other messaging techniques, to connect to the networks 290, or to communicate with one another, such as through short or multimedia messaging service (SMS or MMS) text messages. For example, the computer devices 212, 282 or the servers 252, 272 may be configured to transmit information or data in the form of synchronous or asynchronous messages to one another in real time or in near-real time, or in one or more offline processes, via the networks 290. Those of ordinary skill in the pertinent art would recognize that the creator 210, the control system 250 (or the mixing system 250-1, the conference system 250-2, or the broadcast system 250-3), the media source 270 or the listener 280 (or the listeners 280-1, 280-2) may include or operate any of a number of computing devices that are capable of communicating over the networks 290. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as computer devices 212, 282 or the servers 252, 272, or to any other computers or control systems utilized by the creator 210, the control system 250 (or the mixing system 250-1, the conference system 250-2, or the broadcast system 250-3), the media source 270 or the listener 280 (or the listeners 280-1, 280-2), and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks, e.g., the network 290.

Figure 3:
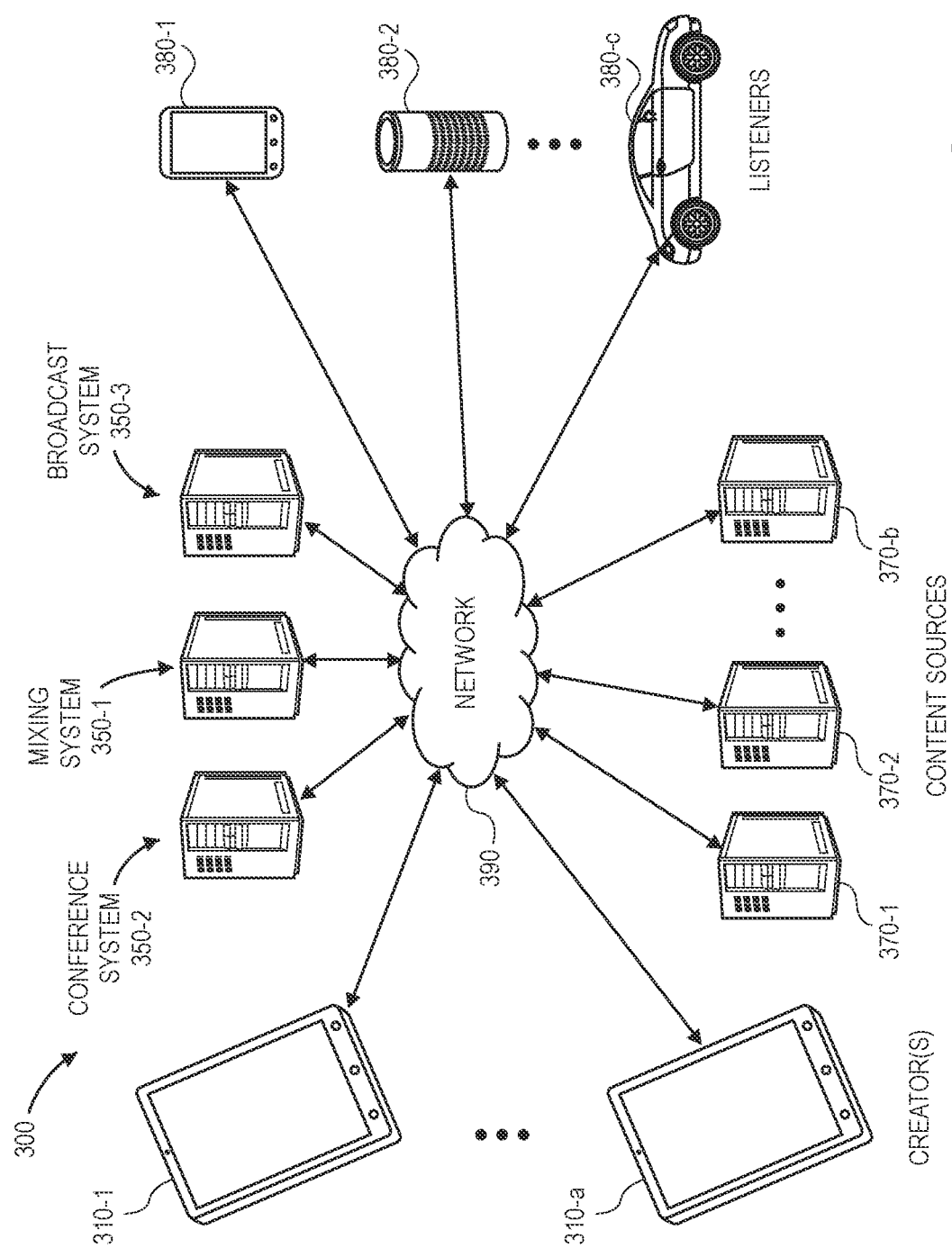
FIG. 3 is a view of aspects of one system for summarizing media content in accordance with embodiments of the present disclosure.

Referring to FIG. 3, a view of aspects of one system for presenting chat messages to listeners in accordance with embodiments of the present disclosure is shown. Except where otherwise noted, reference numerals preceded by the number "3" shown in FIG. 3 indicate components or features that are similar to components or features having reference numerals preceded by the number "2" shown in FIG. 2A or FIG. 2B or by the number "1" shown in FIGS. 1A through 1H. As is shown in FIG. 3, the system 300 includes computer systems or devices of a plurality of creators 310-1 . . . 310-a, a mixing system 350-1, a conference system 350-2, a broadcast system 350-3, a plurality of content sources 370-1, 370-2 . . . 370-b and a plurality of listeners 380-1, 380-2 . . . 380-c that are connected to one another over a network 390, which may include the Internet in whole or in part.

The creators 310-1 . . . 310-a may operate a computer system or device having one or more microphones, an interactive display, one or more speakers, one or more processors and one or more transceivers configured to enable communication with one or more other computer systems or devices. In some implementations, the creators 310-1 . . . 310-a may operate a smartphone, a tablet computer or another mobile device, and may execute interactions with one or more user interfaces rendered thereon, e.g., by a mouse, a stylus, a touchscreen, a keyboard, a trackball, or a trackpad, as well as any voice-controlled devices or software (e.g., a personal assistant). Interactions with the user interfaces may be interpreted and transmitted in the form of instructions or commands to the mixing system 350-1, the conference system 350-2 or the broadcast system 350-3. Alternatively, the creators 310-1 . . . 310-a may operate any other computer system or device, e.g., a laptop computer, a desktop computer, a smart speaker, a media player, a wristwatch, a television, an automobile, or any other type or form of system having one or more processors, memory or storage components (e.g., databases or other data stores), or other components.

Additionally, the mixing system 350-1 may be any server or other computer system or device configured to receive information or data from the creators 310-1 . . . 310-a, or any of the listeners 380-1, 380-2 . . . 380-c, e.g., by way of the conference system 350-2, or from any of the media sources 370-1, 370-2 . . . 370-b over the network 390. The mixing system 350-1 may be further configured to transmit any information or data to the broadcast system 350-3 over the network 390, and to cause the broadcast system 350-3 to transmit any of the information or data to any of the listeners 380-1, 380-2 . . . 380-c, in accordance with a broadcast plan (or a sequence of media content, or another schedule), or at the direction of the creators 310-1 . . . 310-a. The mixing system 350-1 may also transmit or receive information or data along such communication channels, or in any other manner. The operation of the mixing system 350-1, e.g., the establishment of connections, or the transmission and receipt of data via such connections, may be subject to the control or discretion of any of the creators 310-1 . . . 310-a.

In some implementations, the mixing system 350-1 may receive media content from one or more of the media sources 370-1, 370-2 . . . 370-b, and cause the media content to be transmitted to one or more of the creators 310-1 . . . 310-a or the listeners 380-1, 380-2 . . . 380-c by the broadcast system 350-3. In some other implementations, the mixing system 350-1 may receive media content from one or more of the media sources 370-1, 370-2 . . . 370-b, and mix, or combine, the media content with any media content received from the creators 310-1 . . . 310-a or any of the listeners 380-1, 380-2 . . . 380-c, before causing the media content to be transmitted to one or more of the creators 310-1 . . . 310-a or the listeners 380-1, 380-2 . . . 380-c by the conference system 350-2 or the broadcast system 350-3. For example, in some implementations, the mixing system 350-1 may receive media content (e.g., audio content and/or video content) captured live by one or more sensors of one or more of the media sources 370-1, 370-2 . . . 370-b, e.g., cameras and/or microphones provided at a location of a sporting event, or any other event, and mix that media content with any media content received from any of the creators 310-1 . . . 310-a or any of the listeners 380-1, 380-2 . . . 380-c. In such embodiments, the creators 310-1 . . . 310-a may act as sportscasters, news anchors, weathermen, reporters or others, and may generate a media program that combines audio or video content captured from a sporting event or other event of interest, along with audio or video content received from one or more of the creators 310-1 . . . 310-a or any of the listeners 380-1, 380-2 . . . 380-c before causing the media program to be transmitted to the listeners 380-1, 380-2 . . . 380-c by the conference system 350-2 or the broadcast system 350-3.

In some implementations, the conference system 350-2 may establish two-way communications channels between any of the creators 310-1 . . . 310-a and, alternatively, any of the listeners 380-1, 380-2 . . . 380-c, who may be invited or authorized to participate in a media program, e.g., by providing media content in the form of spoken or sung words, music, or any media content, subject to the control or discretion of the creators 310-1 . . . 310-a. Devices or systems connected to the conference system 350-2 may form a "conference" by transmitting or receiving information or data along such communication channels, or in any other manner. The operation of the mixing system 350-1, e.g., the establishment of connections, or the transmission and receipt of data via such connections, may be subject to the control or discretion of the creators 310-1 . . . 310-a. In some implementations, the mixing system 350-1 may effectively act as a virtual participant in such a conference, by transmitting media content received from any of the media sources 370-1, 370-2 . . . 370-b to the conference system 350-2 for transmission to any devices or systems connected thereto, and by receiving media content from any of such devices or systems by way of the conference system 350-2 and transmitting the media content to the broadcast system 350-3 for transmission to any of the listeners 380-1, 380-2 . . . 380-c.

Likewise, the broadcast system 350-3 may be any server or other computer system or device configured to receive information or data from the mixing system 350-1, or transmit any information or data to any of the listeners 380-1, 380-2 . . . 380-c over the network 390. In some implementations, the broadcast system 350-3 may establish one-way communications channels with the mixing system 350-1 or any of the listeners 380-1, 380-2 . . . 380-c in accordance with a broadcast plan (or a sequence of media content, or another schedule), or at the direction of the creators 310-1 . . . 310-a. The broadcast system 350-3 may also transmit or receive information or data along such communication channels, or in any other manner. The operation of the broadcast system 350-3, e.g., the establishment of connections, or the transmission of data via such connections, may be subject to the control or discretion of the creators 310-1 . . . 310-a.

The content sources 370-1, 370-2 . . . 370-b may be servers or other computer systems having media content stored thereon, or access to media content, that are configured to transmit media content to the creators 310-1 . . . 310-a or any of the listeners 380-1, 380-2 . . . 380-c in response to one or more instructions or commands from the creators 310-1 . . . 310-a or the mixing system 350-1. The media content stored on or accessible to the content sources 370-1, 370-2 . . . 370-b may include one or more advertisements, songs or media files, news programs, sports programs, weather reports or any other media files, which may be live or previously recorded. The number of content sources 370-1, 370-2 . . . 370-b that may be accessed by the mixing system 350-1, or the types of media content stored thereon or accessible thereto, is not limited.

The listeners 380-1, 380-2 . . . 380-c may also operate any type or form of computer system or device configured to receive and present media content, e.g., at least a portion of an automobile, a desktop computer, a laptop computer, a media player, a smartphone, a smart speaker, a tablet computer, a television, or a wristwatch, or others.

The mixing system 350-1, the conference system 350-2 or the broadcast system 350-3 may establish or terminate connections with the creators 310-1 . . . 310-a, with any of the content sources 370-1, 370-2 . . . 370-b, or with any of the listeners 380-1, 380-2 . . . 380-c, as necessary, to compile and seamlessly transmit media programs over digital channels (e.g., web-based or application-based), to devices of the creators 310-1 . . . 310-a or the listeners 380-1, 380-2 . . . 380-c in accordance with a broadcast plan, or subject to the control of the creators 310-1 . . . 310-a. Furthermore, in some implementations, one or more of the listeners 380-1, 380-2 . . . 380-c, e.g., musicians, celebrities, personalities, athletes, politicians, or artists, may also be content sources. For example, where the broadcast system 350-3 has established one-way channels, e.g., broadcast channels, with any of the listeners 380-1, 380-2 . . . 380-c, the mixing system 350-1 may terminate one of the one-way channels with one of the listeners 380-1, 380-2 . . . 380-c, and cause the conference system 350-2 to establish a two-directional channel with that listener, thereby enabling that listener to not only receive but also transmit media content to the creators 310-1 . . . 310-a or any of the other listeners.

Those of ordinary skill in the pertinent arts will recognize that any of the tasks or functions described above with respect to the mixing system 350-1, the conference system 350-2 or the broadcast system 350-3 may be performed by a single device or system, e.g., a control system, or by any number of devices or systems.

Figure 4:
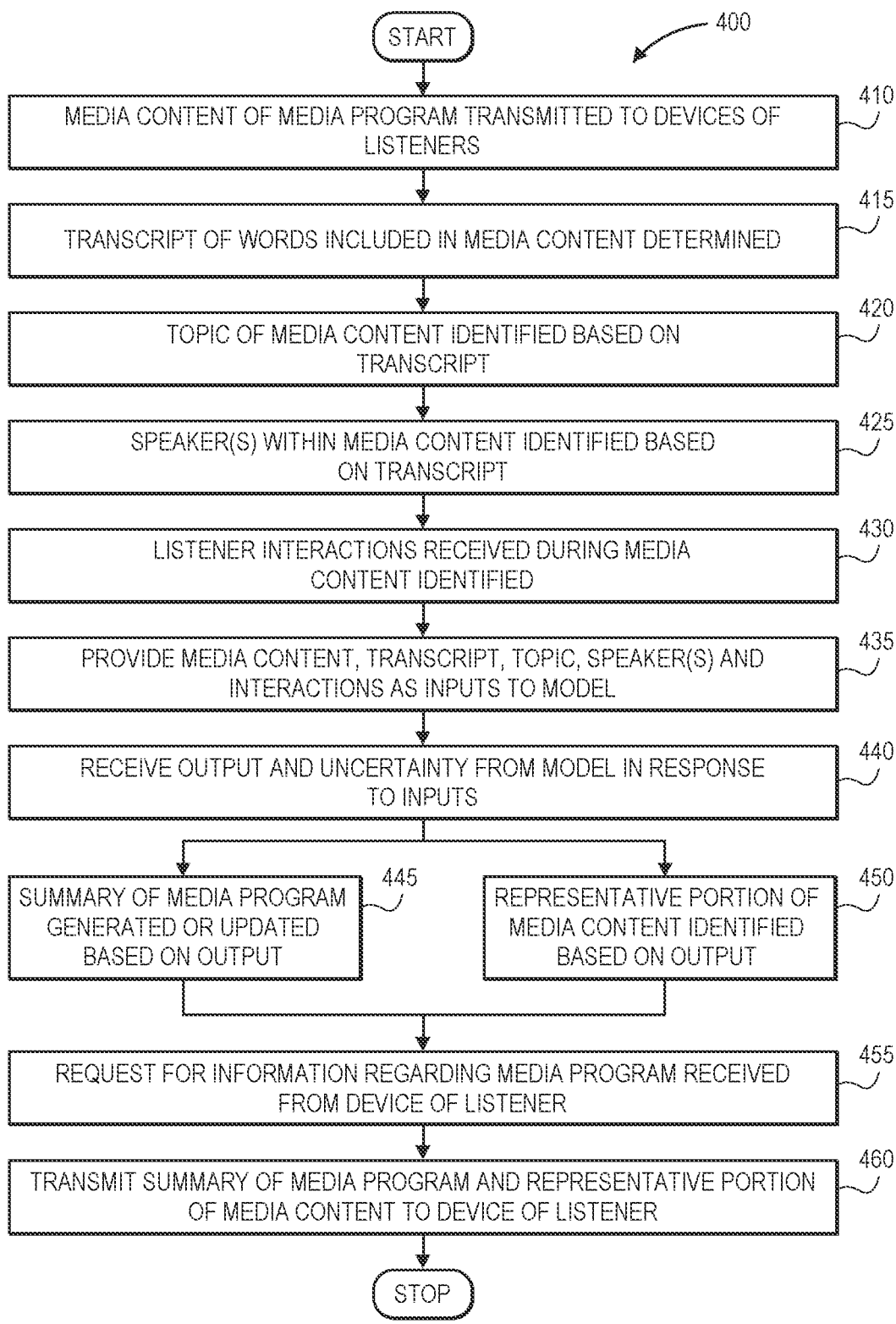
FIG. 4 is a flow chart of one process for summarizing media content in accordance with embodiments of the present disclosure.

Referring to FIG. 4, a flow chart of one process for summarizing media content in accordance with embodiments of the present disclosure is shown. At box 410, media content of a media program is transmitted to one or more devices of listeners. For example, each of the listeners may be associated with a computer device or system, such as a portion of an automobile, a desktop computer, a laptop computer, a media player, a smartphone, a smart speaker, a tablet computer, a television, or a wristwatch. The listeners may have requested to receive the media program by executing one or more gestures or other interactions with a user interface or other input/output device, by providing one or more voice commands, or by taking any other relevant action to communicate an intent to receive the media program to a control system (or a mixing system, a conference system or a broadcast system) associated with the media program. In order to transmit the media content to the devices of the listeners, one or more communications channels may be established between a control system, a conference system or a broadcast system and each of such devices. Media content associated with the media program may include one or more voice samples or other speech of a creator, as well as any other type or form of media content such as advertisements, music, news, sports, weather, or other programming, and be transmitted to such devices by way of such systems. In some implementations, media content of a media program transmitted to the devices of the listeners may include audio files (e.g., music, podcasts, news, or others) of any form or format, such as one or more Advanced Audio Coding ("AAC"), Audio Interchange File Format ("AIFF"), lossless audio codec, lossless encoder, Moving Picture Experts Group (or "MPEG") Audio Layer III (e.g., "MP3"), Vorbis (e.g., Ogg Vorbis), Waveform Audio File ("WAV"), Windows Media Audio ("WMA"), or other forms or formats, and at any bit rate or level of compression (e.g., 128, 192, 256 or 320 kilobits per second).

At box 415, a transcript of words included in at least a portion of the media content transmitted to the devices of listeners is determined. In some implementations, a control system (or a mixing system, a conference system or a broadcast system) may interpret data representing the media content to transcribe such content into text. For example, the control system may operate one or more machine learning algorithms, systems or techniques that are trained to recognize speech, or other algorithms, systems or techniques that are so configured, in order to recognize and interpret any spoken words represented within the data representing the media content. In some implementations, data may be compared with portions of sounds (e.g., sub-word units or phonemes) or sequences of such sounds to identify any words represented in the data, including but not limited to a wake word, as well as any context features represented within the data.

At box 420, a topic (or a theme) of the media content is identified based on the transcript. In some implementations, the topic may be identified by one or more natural language processing ("NLP") or NLU techniques, which may be used to evaluate the transcript or the media content and to mine text, words, phrases or phonemes therefrom.

For example, in some implementations, the transcript or a portion of the media content may be provided to one or more machine learning algorithms, systems or techniques that may detect patterns of words or phrases, cluster groups of words or phrases, and one or more of the words or phrases that best represent the portion of the media content may be selected as the topic. Such algorithms, systems or techniques may include, but need not be limited to, latent semantic analyses, latent Dirichlet allocations, singular value decompositions, or any other algorithms, systems or techniques. Moreover, in some implementations, a transcript or a portion of the media content may be interpreted to determine any sentiments, opinions, evaluations, attitudes, appraisals, emotions, moods or judgments in the portion of the media program at a given time, and a topic may be determined based on any of such sentiments, opinions, evaluations, attitudes, appraisals, emotions, moods or judgments.

Alternatively, in some implementations, the topic may be identified or designated by a creator, a listener or another individual, who may be prompted or encouraged to apply one or more tags or other labels indicative of a topic, or to identify a point in time during which a topic of a portion of the media content has changed. Records of such tags or labels, or times at which such tags or labels were received, may be stored and utilized to identify one or more topics associated with the portion of the media content.

At box 425, one or more speakers within the media content are identified. For example, in some implementations, the transcript or the portion of the media content may be partitioned into segments corresponding to different speakers, e.g., by speaker diarization, which may determine that one or more words or phrases of the transcript are in a number of different, individual voices, or spoken by a number of different, individual speakers. Alternatively, or additionally, speakers of media content may be identified based on information regarding statuses or configurations of devices of respective participants at various times during the transmission of media content, such as times at which microphones or other acoustic sensors are muted or are operational, or times at which communications channels have been established between such equipment. Likewise, speakers of media content may be identified based on relative intensities or energies of acoustic signals received from devices of the respective participants.

A transcript or a portion of the media content may be processed to identify or predict a number of different speakers expressed therein, to identify boundaries of segments of the transcript or the portion of the media content associated with each of the different speakers, or to assign each of such segments with one or more discrete speakers. Furthermore, in some implementations, a transcript or a portion of the media content may be processed to recognize any known music or other media, and to determine whether the music or other media is a focus of the media content, or is being played in the background of the media content.

Alternatively, in some implementations, a creator, a listener or another individual may identify individual speakers based on a transcript or a portion of the media content. For example, in some implementations, some or all of a transcript of a portion of media content may be presented on a display or in another user interface to a creator or another individual, who may designate which of a plurality of speakers uttered different words or phrases of the transcript, or otherwise designate portions of the media content that were uttered by different speakers.

In some implementations, speakers of portions of media content may be identified in the same processes that transcribed the portions of the media content or identified the topic or theme of the media content. In some other implementations, however, speakers of portions of media content may be identified in discrete or separate processes. Moreover, in some implementations, speakers may be identified based on a transcript alone, based on a portion of media content alone, or based on both the transcript and the portion of the media content.

At box 430, interactions received from listeners during the transmission of the media content are identified. For example, in some implementations, one or more devices of the listeners may be configured to display user interfaces that are configured to receive feedback. Such user interfaces may include one or more of the same features as the user interface 130-1 shown in FIG. 1C, or one or more other features, and may be displayed on such devices prior to the playing of the media program, or as the media program is played by such devices.

User interfaces rendered by devices of listeners may include one or more interactive features that enable listeners to express an opinion or other emotion regarding a media program. Such interactive features may be represented by any number of icons, characters, symbols or other visual indicators, each of which may correspond to one of a plurality of emotions, opinions or characterizations, and may be selected or otherwise interacted by listeners to indicate their emotions, opinions or characterizations at any given time. For example, in some implementations, the user interfaces may include one or more "widgets," application programming interfaces (e.g., "API"), or other features that are configured to receive interactions in the form of entries of text, characters or symbols, as well as selections or other interactions indicating an emotion or an opinion regarding the media program. The interactions received from the listeners may include, but need not be limited to, selections of one or more icons, characters, symbols or other visual indicators provided on the user interfaces, e.g., in response to gestures or other interactions with an input/output device, or one or more spoken commands or utterances, may be processed to confirm that a listener approves of media content then being played, disapproves of the media content, or has some emotion or opinion other than approval or disapproval of the media content.

Furthermore, any type or form of interaction received from a listener during a playing of a media program may be received and interpreted. For example, referring again to FIG. 1C, when a listener plays or pauses the media program, e.g., by interactions with the element 134-6, or fast-forwards or rewinds the media program, e.g., by interactions with other elements (not shown), such interactions may be processed or interpreted to determine whether the listener has a positive emotion or opinion, a negative emotion or opinion, or an emotion or an opinion that is neither positive nor negative at any given time with respect to the media program. Likewise, when a listener enters a chat message into the text box 138-1 or sends the chat message to the creator 110 or other listeners by a selection of the button 138-2, such interactions may be processed or interpreted to determine an emotion or an opinion of the listener at any given time with respect to the media program. When a listener attempts to join a media program, such as by selecting the button 139-1, the selection may be processed or interpreted to determine that the listener is interested in media content of the media program then being played.

Alternatively, when a listener elects to stop the media program, search for another media program, or end the playing of media altogether either permanently or for a period of time, such interactions may also be processed or interpreted to determine an emotion or an opinion of the listener at any given time with respect to the media program. The systems and methods of the present disclosure are not limited to receiving interactions with interactive features having symbols representative of emotions or opinions, such as the interactive features 136-1, 136-2, 136-3, 136-4, 136-5, 136-6, 136-7, 136-8, or like interactive features, receiving chat messages or requests to join a media program, in accordance with implementations of the present disclosure. Furthermore, in some implementations, an interaction may be received from a listener by any voice-controlled devices or software (e.g., a personal assistant). For example, one or more devices of listeners may be configured to receive voice commands that may be processed to identify feedback represented therein.

At box 435, one or more portions of the media content, as well as the transcript, the topic, the speakers and the interactions are provided as inputs to a model, e.g., a machine learning algorithm, system or technique that is trained to generate outputs representative of a summary of media content, or outputs identifying representative portions of the media content. In some implementations, the model may be an artificial neural network, such as a recurrent neural network, a convolutional neural network, or transformers such as a bidirectional encoder representation from transformers. In some other implementations, however, the model may be any other type or form of machine learning algorithm, system or technique. Furthermore, the model may be trained to generate such outputs based on inputs other than media content, or one or more of the transcript, the topic, the speakers or the interactions, or based on inputs in addition to media content, the transcript, the topic, the speaker or the interactions.

At box 440, an output and a measure of uncertainty are received from the model in response to the inputs. The measure of uncertainty may be a confidence score or factor representative of a likelihood that the output accurately describes the portion of the media content based on one or more levels of confidence in the transcription of the media content, the identification of the topic or the speakers, or any interpretations of the feedback received.

At box 445, a summary of the media program is generated or updated based on the output. In parallel, at box 450, a representative portion of the media content is identified based on the output. For example, portions of the transcript or media content that are most closely associated with topics identified from media content, speakers identified within the media content, interactions received during the media content or types or categories of such interactions, may be identified based on the output. In some implementations, the outputs may identify portions of the media program based on timestamps or other identifiers of times of the media program, and the summary of the media program may be generated or updated based on sets of words uttered in accordance with the media program between such times. Alternatively, or additionally, the representative portion of the media content may include content transmitted in accordance with the media program between such times. Alternatively, or additionally, one or more aspects of the summary, or one or more representative portions of the media content, may be identified or selected by a creator or any other individual associated with the media program, or identified or selected in any other manner.

At box 455, a request for information regarding the media program is received from a device of a listener. For example, the listener may activate an application (e.g., a general-purpose application such as a browser, or a special-purpose application dedicated to the identification, selection or playing of media programs) via the device, or otherwise request to receive information regarding the media program in any other manner.

At box 460, the summary of the media program and the representative portion of the media content are transmitted to the device of the listener from which the request was received at box 455, and the process ends. For example, in some implementations, such as where the device of the listener includes a display, executable code for causing one or more user interfaces, windows or other features to be rendered on the display, as well as data representing all or a portion of the summary or the representative portion of the media content, along with any relevant images, text or other interactive features, may be transmitted to the device over one or more networks. Alternatively, or additionally, such user interfaces, windows or other features may further include one or more selectable features for playing the representative portion of the media content, joining the media program, e.g., initiating a playing of the media program in progress, or taking any other action with regard to the representative portion of the media content. In some implementations, such as where the device of the listener includes a speaker, executable code for causing audio signals representing some or all of the summary or the representative portion of the media content to be emitted by the speaker, along with any other relevant words or other audible signals, may also be transmitted to the device over one or more networks.

Alternatively, or additionally, all or a portion of the summary, or any representative portion of the media content, may be transmitted to devices of listeners prior to or without receiving a request for the summary or for the representative portion from such devices or such listeners. For example, a portion of the summary, a representative portion of the media content, or links or other features by which the portion of the summary or the representative portion of the media content may be accessed, may be provided to devices of listeners in any other manner, such as by one or more electronic messages (e.g., E-mail or text messages), one or more social media postings, or one or more audible signals, and displayed in or played by a recommendation engine or user interface.

Once the summary or the representative portion have been transmitted to the device of the listener, the listener may then elect to join the media program in progress, to evaluate another media program, or to take any other relevant action.

As is discussed above, summaries or representative portions of media content included in media programs that are currently in progress may be presented to a listener or another user who is interested in joining one or more of the media programs. The summaries may include one or more sets of words that are styled or selected based on a type of the media program, the media content of the media program, or on any other basis, and the representative portions of the media programs may be made accessible to the listener or the other user in any manner. In some implementations, summaries or representative portions of media programs may be presented to a listener (or a viewer) in a menu rendered in a user interface on a display, along with one or more features that may be selected to receive media content of the media program. Upon a selection of a request for media content of the media program from a device of a listener, one or more communication channels may be established between the device and a control system (or a mixing system, a conference system or a broadcast system) associated with the media program, and the media content of the media program may be transmitted to the device via such channels.

Referring to FIGS. 5A through 5F, views of aspects of one system for summarizing media content in accordance with embodiments of the present disclosure are shown. Except where otherwise noted, reference numerals preceded by the number "5" shown in FIGS. 5A through 5F indicate components or features that are similar to components or features having reference numerals preceded by the number "3" shown in FIG. 3, by the number "2" shown in FIG. 2A or 2B, or by the number "1" shown in FIGS. 1A through 1H.

Figure 5A:
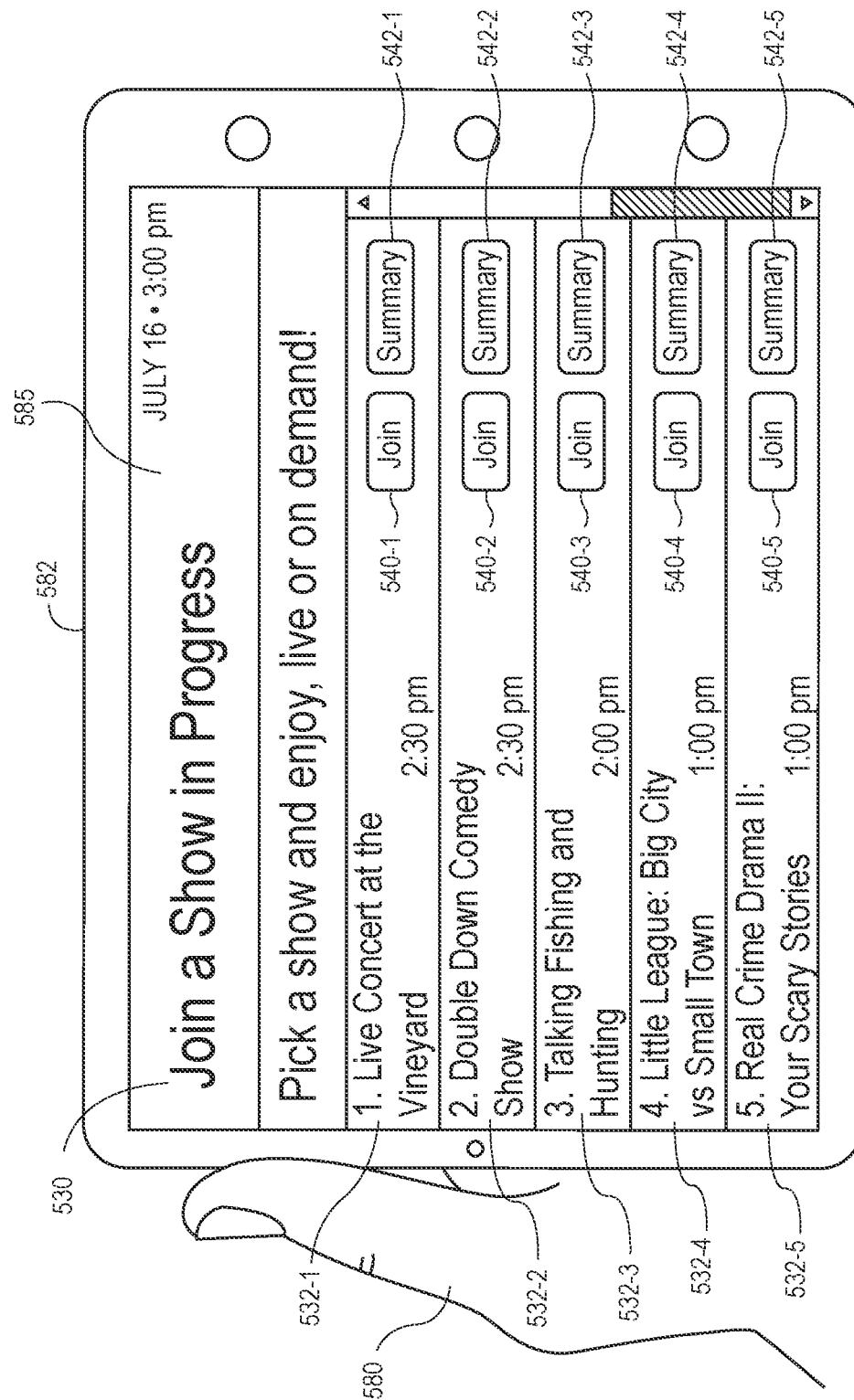
FIGS. 5A through 5F are views of aspects of one system for summarizing media content in accordance with embodiments of the present disclosure.

As is shown in FIG. 5A, a listener 580 operates a mobile device 582 (e.g., a tablet computer or smartphone, or any other computer device or system) to select one of a plurality of media programs. The mobile device 582 includes a display 585 having a user interface 530 rendered thereon. In some implementations, the display 585 may be a capacitive touchscreen, a resistive touchscreen, or any other system for receiving interactions by the listener 580. Alternatively, or additionally, the listener 580 may interact with the user interface 530 or the mobile device 582 in any other manner, e.g., by way of any I/O devices, or any voice-controlled devices or software.

The user interface 530 includes a plurality of sections 532-1, 532-2, 532-3, 532-4, 532-5, each of which may be associated with a media program that may be requested by one or more listeners, e.g., the listener 580 via the mobile device 582. For example, each of the sections 532-1, 532-2, 532-3, 532-4, 532-5 may include one or more selectable elements or features that, when selected, permit the listener 580 to select one of the media programs, e.g., in a "live" format, or an initial broadcast or streaming. For example, as is shown in FIG. 5A, each of the sections 532-1, 532-2, 532-3, 532-4, 532-5 may identify one or more attributes of a media program, including a name or title of the media program, viz., a concert, "Live Concert at the Vineyard," a comedy show, "Double Down Comedy Show," a talk radio show, "Talking Fishing and Hunting," a live sporting event, "Little League: Big City vs. Small Town," and a sequel to a prior episode of a media program, "Real Crime Drama II: Your Scary Stories." Each of the sections 532-1, 532-2, 532-3, 532-4, 532-5 also includes a time at which the media program began, and may, alternatively, include any other descriptors or characteristics of the media program. In some implementations, the user interface 530 may also include any number of buttons, text boxes, checkboxes, drop-down menus, list boxes, toggles, pickers, search fields, tags, sliders, icons, carousels, or any other elements or features (not shown) that are configured to display information to the listener 580 or to receive interactions from the listener 580.

As is further shown in FIG. 5A, each of the sections 532-1, 532-2, 532-3, 532-4, 532-5 further includes a selectable feature 540-1, 540-2, 540-3, 540-4, 540-5 that, upon being selected, establishes one or more communication channels between the mobile device 582 and a control system (or a mixing system, a conference system or a broadcast system), and causes one of the media programs to be transmitted to the mobile device 582. Each of the sections 532-1, 532-2, 532-3, 532-4, 532-5 also includes a selectable feature 542-1, 542-2, 542-3, 542-4, 542-5 that, upon being selected, causes a display of a summary of information regarding one of the media programs to be shown on the display 585.

Figure 5B:
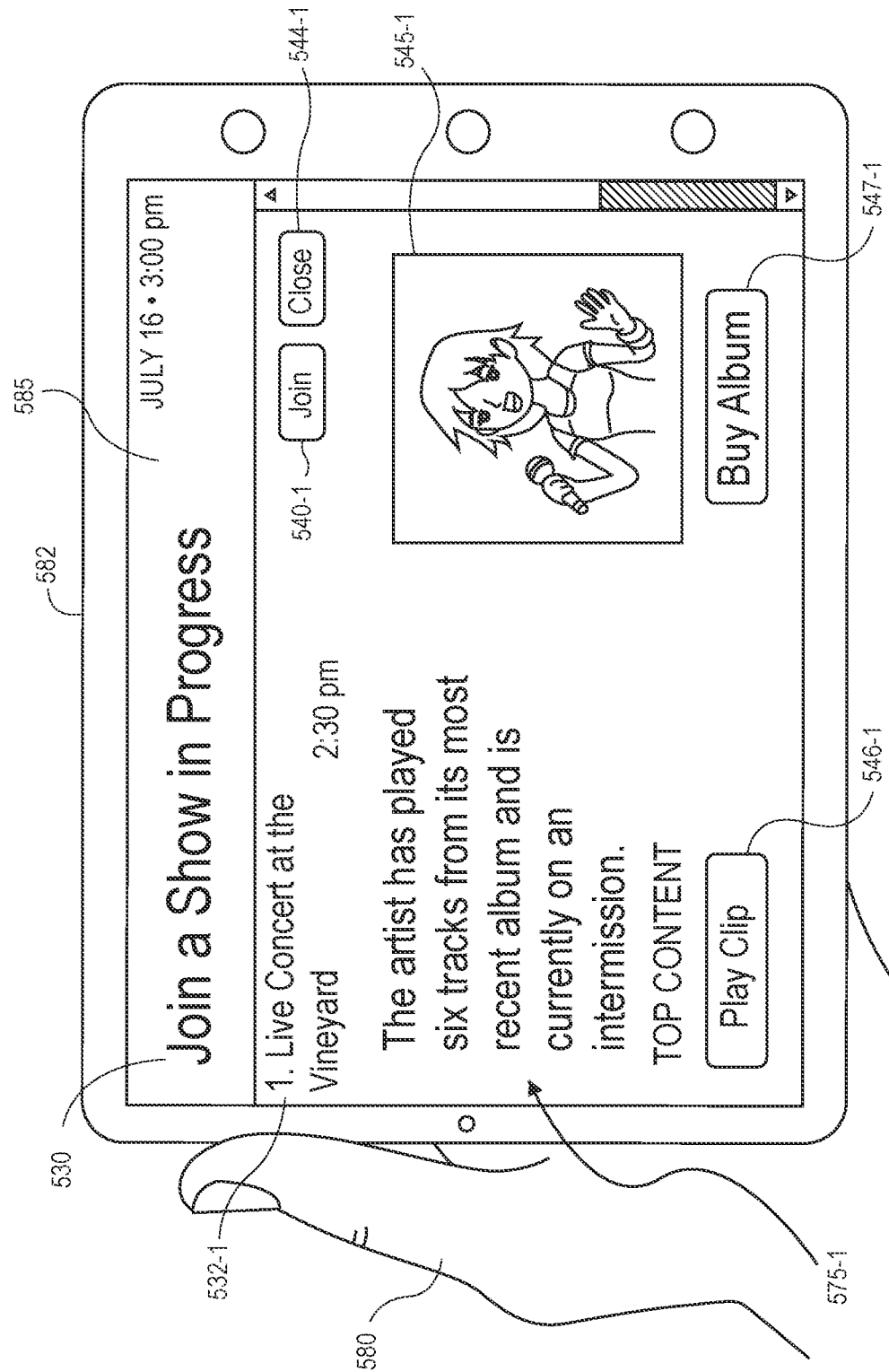

For example, as is shown in FIG. 5B, upon receiving a selection of the feature 542-1, the section 532-1 expands to include a summary 575-1 of one of the media programs, e.g., the concert, "Live Concert at the Vineyard," as well as a button 546-1 or another selectable feature for playing a representative or selected portion of the concert, such as one or more media entities (e.g., songs) or portions of media entities that were played at the concert. Additionally, the feature 542-1 that was selected to expand the section 532-1 to include the summary 575-1 is replaced by a selectable feature 544-1 that, upon being selected, causes the section 532-1 to close and returns the user interface 530 to the state shown in FIG. 5A. The section 532-1 further includes an image 545-1 associated with the media program, e.g., an image of one or more artists performing at the concert, which may have been captured during the media program or previously, and may be selected based on a transcript of the media program or on any other basis. The section 532-1 also includes a selectable feature 547-1 that, upon being selected, enables a listener or another user to purchase an album by the artists performing at the concert.

The summary 575-1 may have been derived based on any portion of the media content of the media program transmitted to devices of listeners, such as by providing a transcript of the media content and any contextual features (e.g., a topic, identities of speakers, or interactions received from the listeners) to a model (e.g., a recurrent neural network, a convolutional neural network or a transformer) as inputs, and generating the summary 575-1 based on any outputs received from the model, or in any other manner. As is shown in FIG. 5B, the summary 575-1 describes music (e.g., tracks) that has been played during the concert, and indicates that the concert is currently under an intermission. Alternatively, the summary 575-1 may include any other information regarding the media program. The representative or selected portion of the media program that is accessible via the button 546-1 may also have been identified based on the outputs received from the model, or in any other manner. For example, in some implementations, the summary 575-1 or the representative or selected portion may have been selected by a creator of the media program, or any other individual or entity, and need not be identified based on the outputs.

Figure 5C:
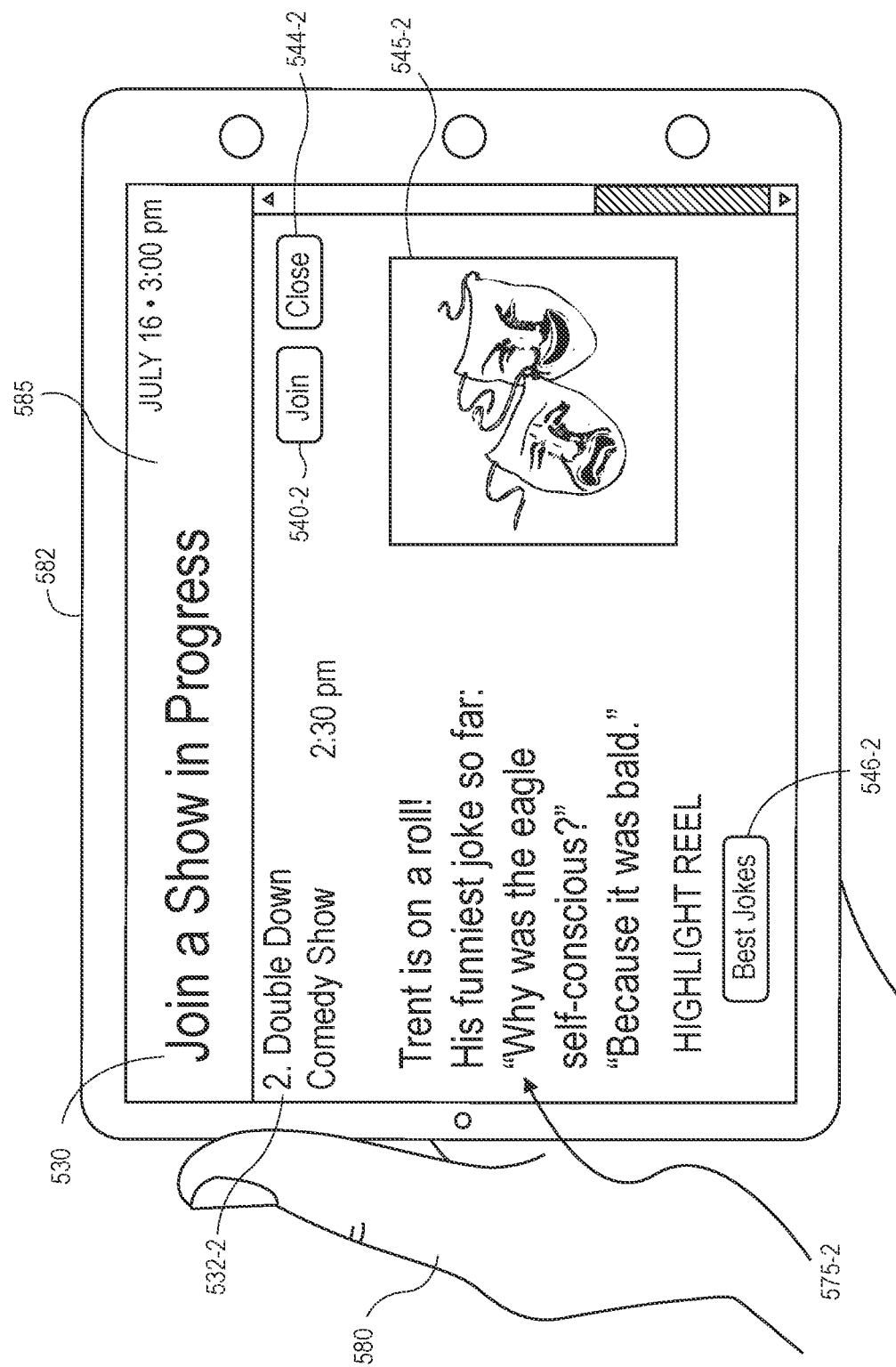

Similarly, as is shown in FIG. 5C, upon receiving a selection of the feature 542-2, the section 532-2 expands to include a summary 575-2 of one of the media programs, e.g., the comedy show, "Double Down Comedy Show," as well as a button 546-2 or another selectable feature for playing a representative or selected portion of the comedy show, e.g., one or more jokes, skits or portions of a routine that were favorably received by listeners to the comedy show. Additionally, the feature 542-2 that was selected to expand the section 532-2 to include the summary 575-2 is replaced by a selectable feature 544-2 that, upon being selected, causes the section 532-2 to close and returns the user interface 530 to the state shown in FIG. 5A. The section 532-2 further includes an image 545-2 associated with the media program, e.g., an image associated with comedy, which may be selected based on a transcript of the media program or on any other basis.

The summary 575-2 may have been derived based on any portion of the media content of the media program transmitted to devices of listeners, such as by providing a transcript of the media content and any contextual features to a model as inputs, and generating the summary 575-2 based on any outputs received from the model, or in any other manner. As is shown in FIG. 5C, the summary 575-2 describes the comedy show and a comedian performing during the comedy show, and includes a joke having a strong reaction from listeners to the comedy show. The representative or selected portion of the media program that is accessible via the button 546-2 may also have been identified based on the outputs received from the model, or in any other manner.

Figure 5D:
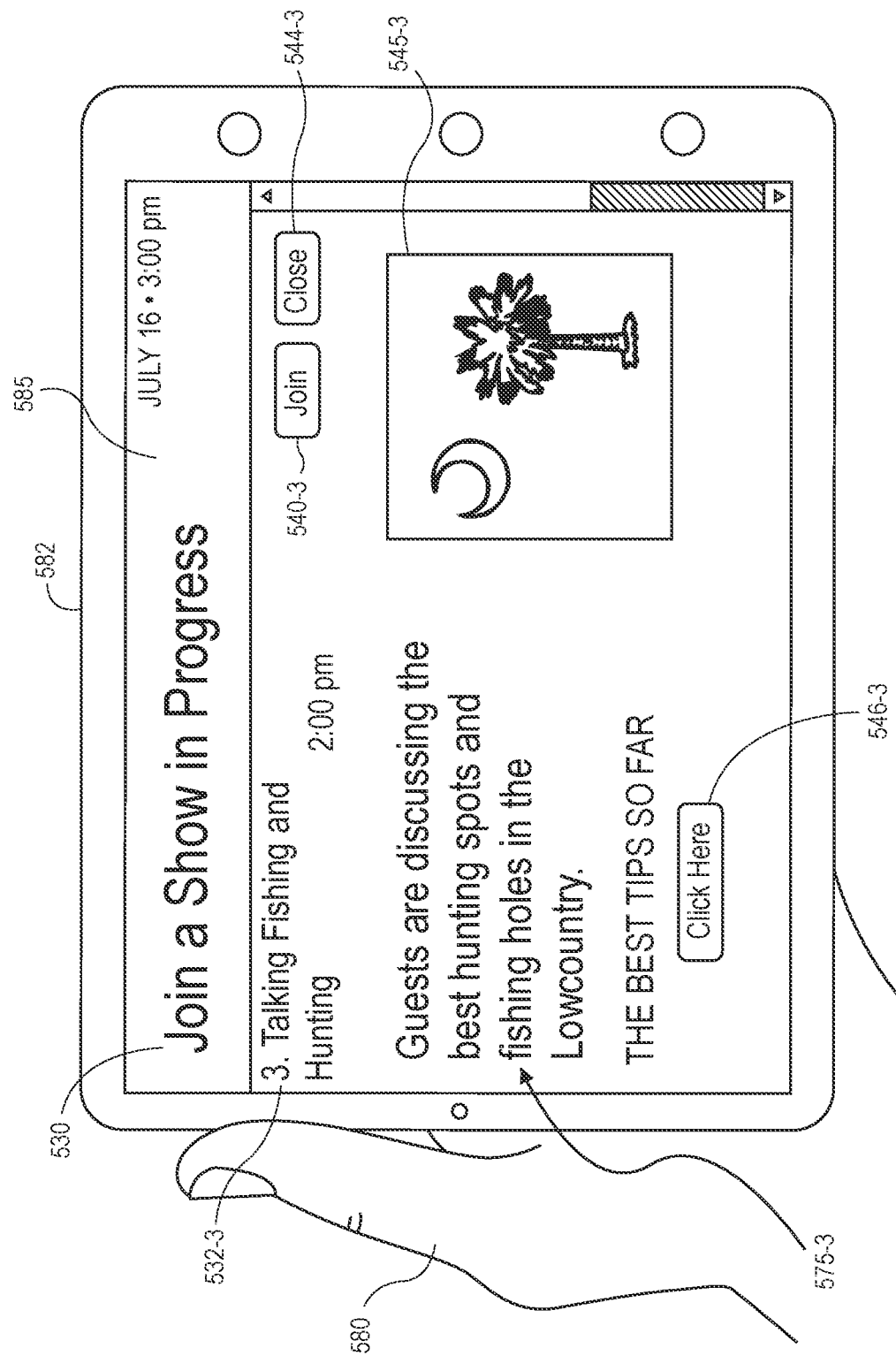

As is shown in FIG. 5D, upon receiving a selection of the feature 542-3, the section 532-3 expands to include a summary 575-3 of one of the media programs, e.g., the talk radio show, "Talking Fishing and Hunting," as well as a button 546-3 or another selectable feature for playing a representative or selected portion of the talk radio show, e.g., noteworthy points made by the creator or guests during the talk radio show. Additionally, the feature 542-3 that was selected to expand the section 532-3 to include the summary 575-3 is replaced by a selectable feature 544-3 that, upon being selected, causes the section 532-3 to close and returns the user interface 530 to the state shown in FIG. 5A. The section 532-3 further includes an image 545-3 associated with the media program, e.g., an image associated with South Carolina, which relates to a topic of the talk radio show. The image 545-3 may be selected based on a transcript of the media program or on any other basis.

The summary 575-3 may have been derived based on any portion of the media content of the media program transmitted to devices of listeners, such as by providing a transcript of the media content and any contextual features to a model as inputs, and generating the summary 575-3 based on any outputs received from the model, or in any other manner. As is shown in FIG. 5D, the summary 575-3 describes the talk radio show and conversations taking place during the comedy show, indicating that guests are discussing locations for hunting and fishing in the Lowcountry, a coastal region in the State of South Carolina. The representative or selected portion of the media program that is accessible via the button 546-3 may also have been identified based on the outputs received from the model, or in any other manner.

Figure 5E:
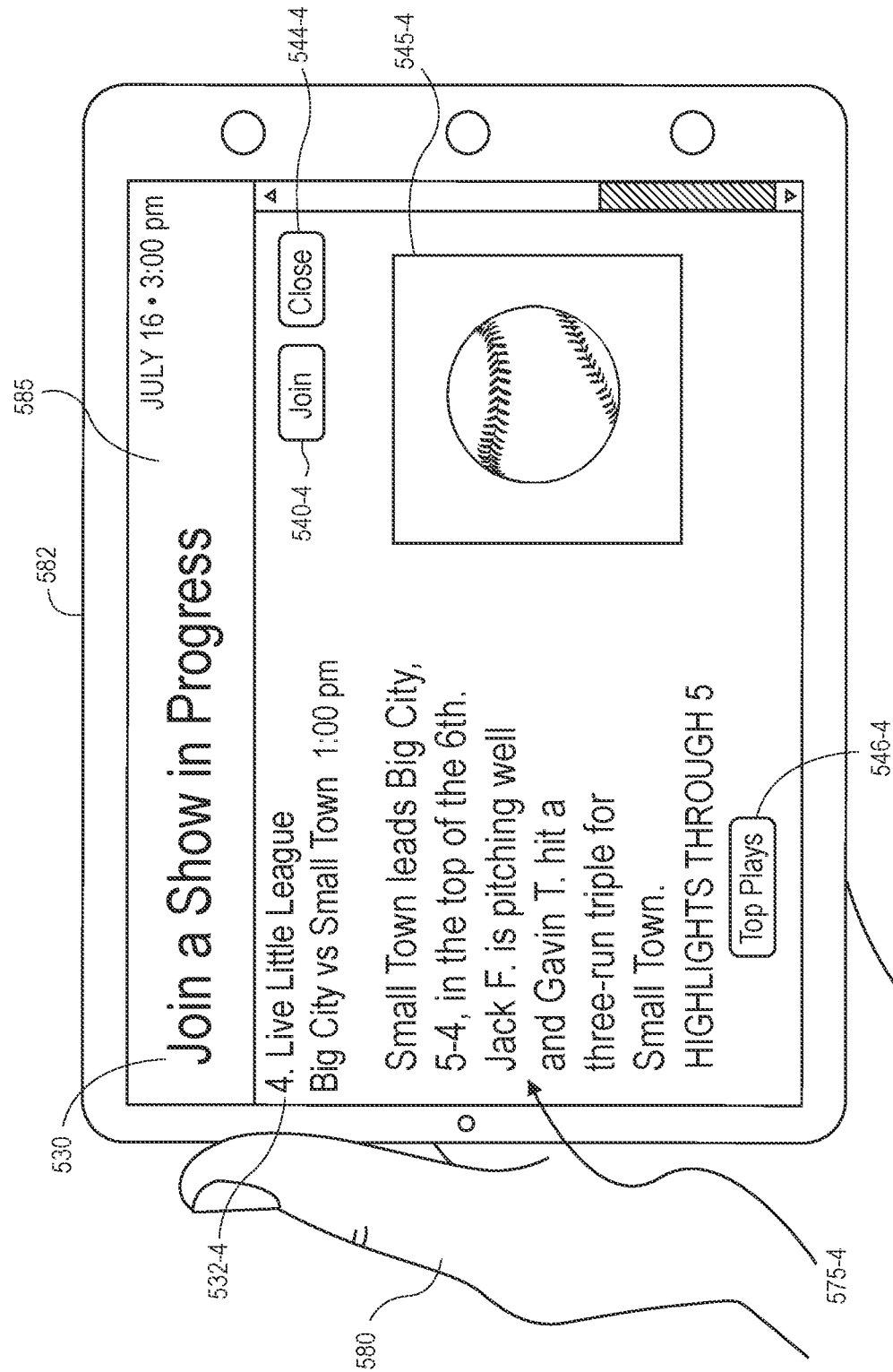

As is shown in FIG. 5E, upon receiving a selection of the feature 542-4, the section 532-4 expands to include a summary 575-4 of one of the media programs, e.g., the sporting event, "Live Little League: Big City vs. Small Town," as well as a button 546-4 or another selectable feature for playing a representative or selected portion of the sporting event, e.g., one or more highlights or top plays during the portion of the sporting event that has already occurred. Additionally, the feature 542-4 that was selected to expand the section 532-4 to include the summary 575-4 is replaced by a selectable feature 544-4 that, upon being selected, causes the section 532-4 to close and returns the user interface 530 to the state shown in FIG. 5A. The section 532-4 further includes an image 545-4 associated with the media program, e.g., an image of a baseball, which relates to a topic of the talk radio show. The image 545-4 may be selected based on a transcript of the media program or on any other basis.

The summary 575-4 may have been derived based on any portion of the media content of the media program transmitted to devices of listeners, such as by providing a transcript of the media content and any contextual features to a model as inputs, and generating the summary 575-4 based on any outputs received from the model, or in any other manner. As is shown in FIG. 5E, the summary 575-4 describes the sporting event, including a score of the sporting event, and a status or a condition of the sporting event, along with descriptions of notable moments that occurred during the sporting event. The representative or selected portion of the media program that is accessible via the button 546-4 may also have been identified based on the outputs received from the model, or in any other manner.

Figure 5F:
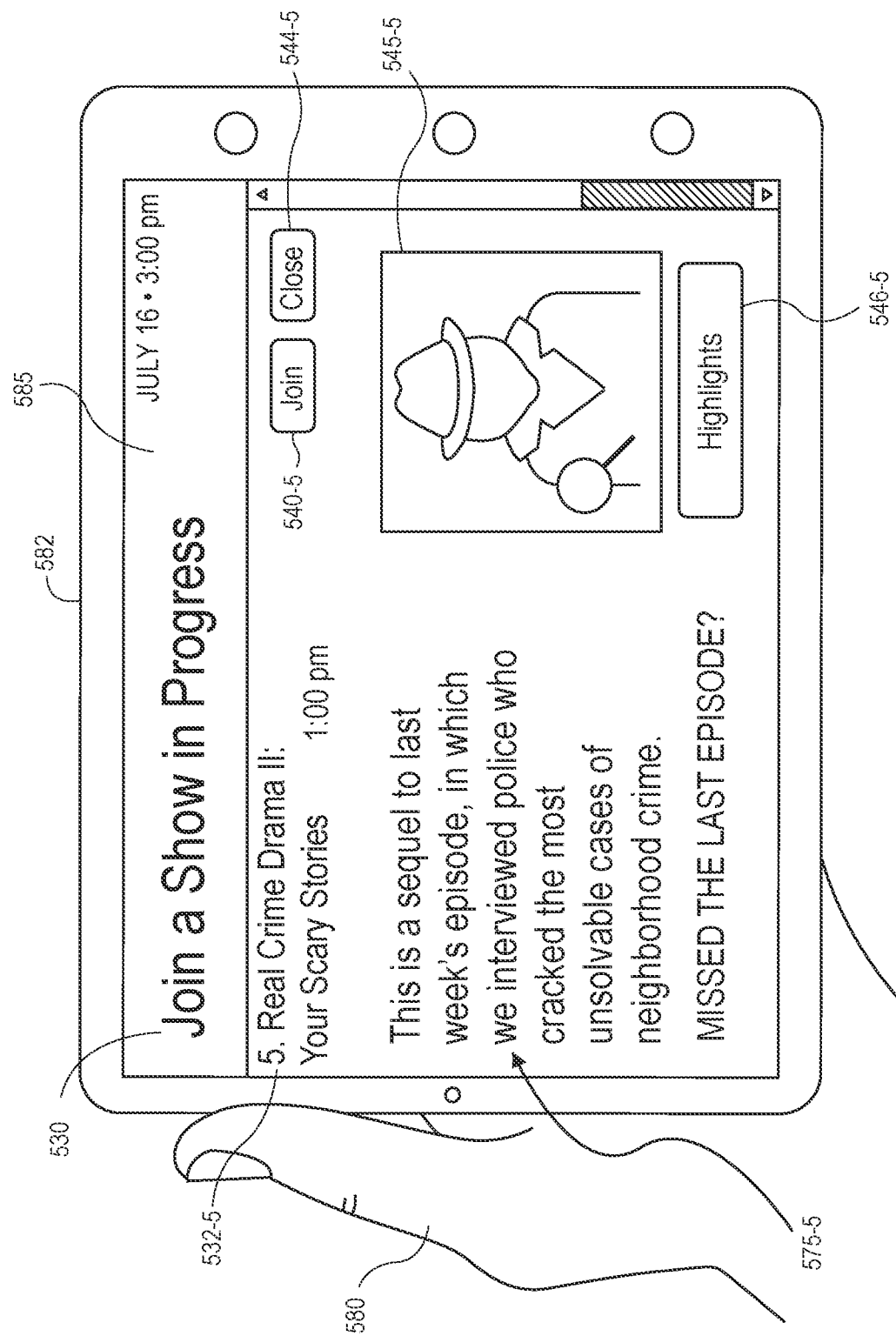

As is shown in FIG. 5F, upon receiving a selection of the feature 542-5, the section 532-5 expands to include a summary 575-5 of one of the media programs, e.g., the sequel, "Real Crime Drama II: Your Scary Stories," as well as a button 546-5 or another selectable feature for playing a representative or selected portion of a prior episode of the media program. Additionally, the feature 542-5 that was selected to expand the section 532-5 to include the summary 575-5 is replaced by a selectable feature 544-5 that, upon being selected, causes the section 532-5 to close and returns the user interface 530 to the state shown in FIG. 5A. The section 532-5 further includes an image 545-5 associated with the media program, e.g., an image of a criminal investigator, which relates to a topic of the media program. The image 545-5 may be selected based on a transcript of the media program or on any other basis.

The summary 575-5 may have been derived based on any portion of the media content of the media program transmitted to devices of listeners, such as by providing a transcript of the media content and any contextual features to a model as inputs, and generating the summary 575-5 based on any outputs received from the model, or in any other manner. As is shown in FIG. 5F, the summary 575-5 describes a prior episode of the media program. The representative or selected portion of the media program that is accessible via the button 546-5 may also have been identified based on the outputs received from the model, or in any other manner.

Figure 6A:
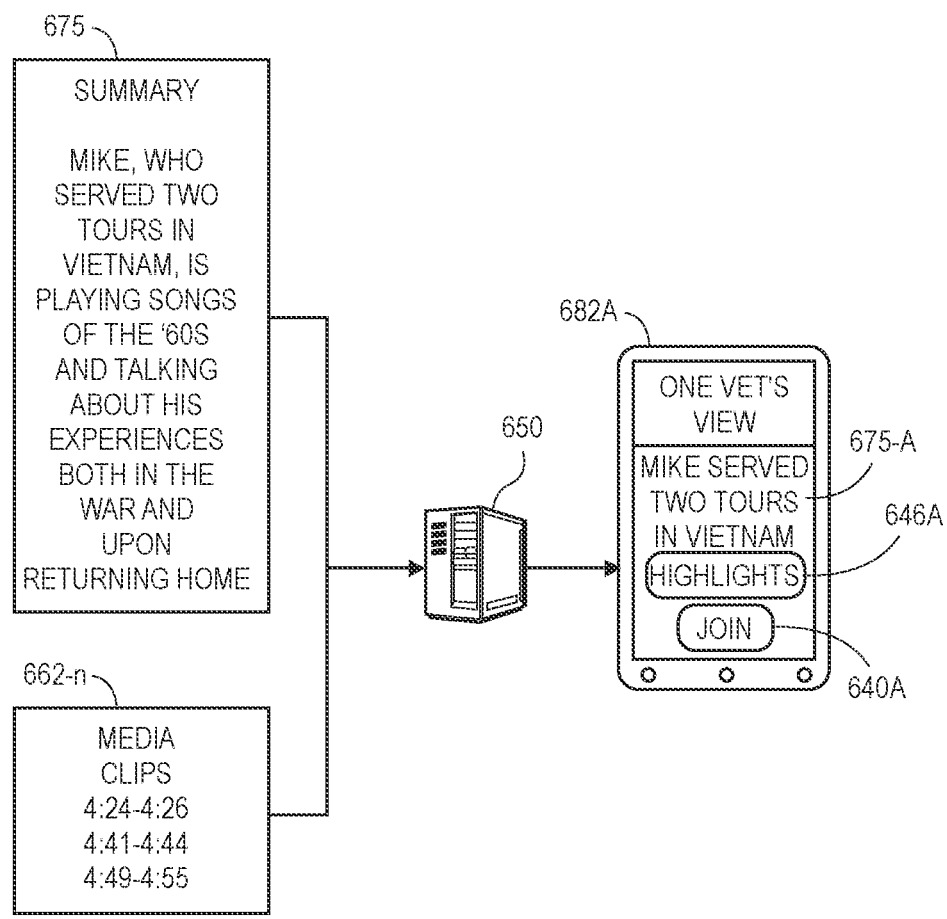
FIGS. 6A through 6C are views of aspects of one system for summarizing media content in accordance with embodiments of the present disclosure.
Figure 6B:
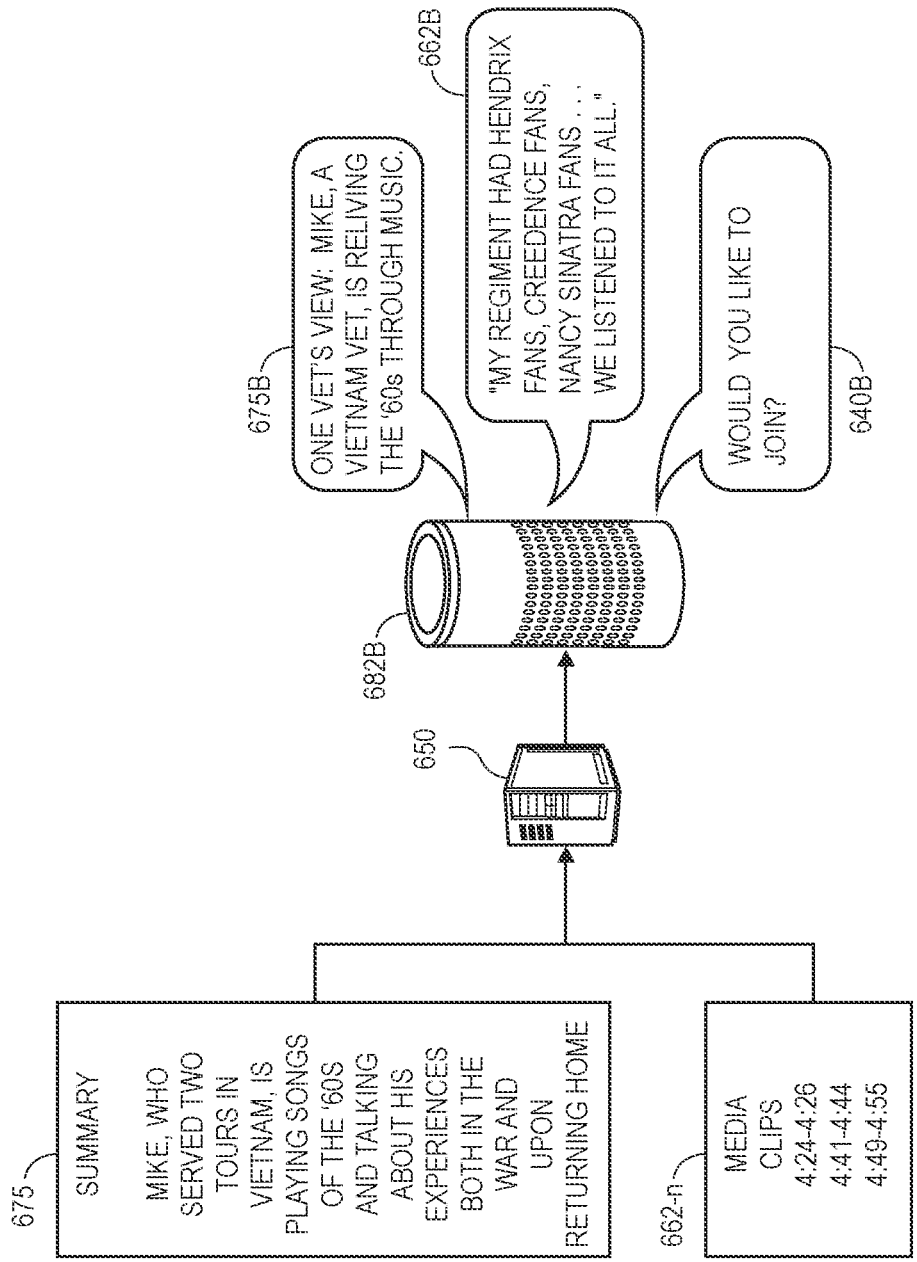
Figure 6C:
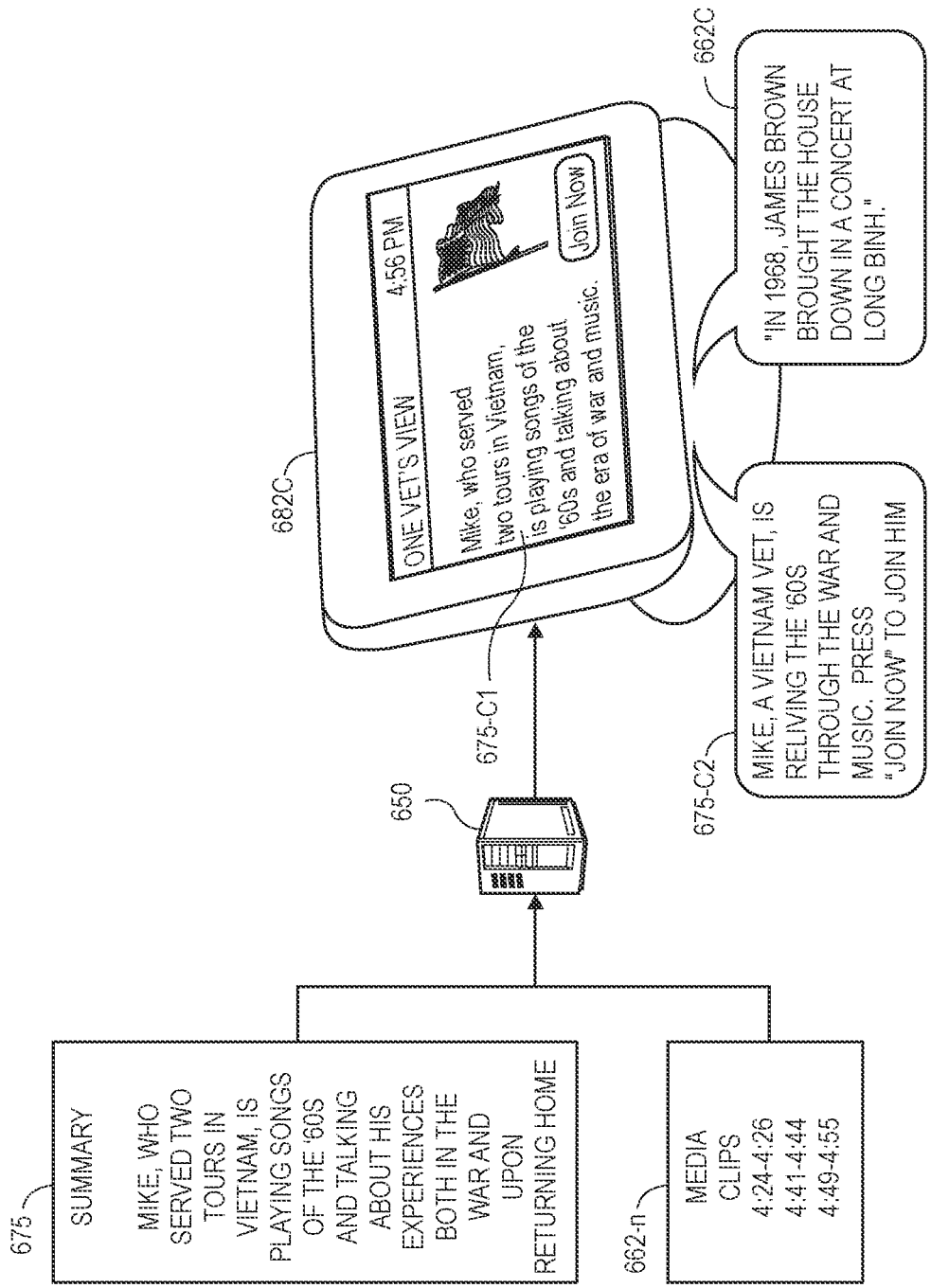

Summaries of media programs that are currently in progress may be presented to a listener or viewer in any manner, and may be modified, tailored or selected based on one or more attributes of a listener or viewer, or of a device associated with the listener or viewer. Referring to FIGS. 6A through 6C, views of aspects of one system for summarizing media content in accordance with embodiments of the present disclosure are shown. Except where otherwise noted, reference numerals preceded by the number "6" shown in FIGS. 6A through 6C indicate components or features that are similar to components or features having reference numerals preceded by the number "5" shown in FIGS. 5A through 5F, by the number "3" shown in FIG. 3, by the number "2" shown in FIG. 2A or 2B, or by the number "1" shown in FIGS. 1A through 1H.

As is shown in FIG. 6A, a summary 675 of a media program includes a set of words, viz., "Mike, who served two tours in Vietnam, is playing songs of the '60s and talking about his experiences in the war and upon returning home." In some implementations, the summary 675 may have been derived based on an output received from a model, e.g., a machine learning algorithm, system or technique such as an artificial neural network or a transformer that is trained to generate a set of words in response to inputs including media content, a transcript of the media content and any contextual features (e.g., a topic, identities of speakers, or interactions received from the listeners). A plurality of media clips 662-n include representative or selected portions of the media program. In some implementations, the media clips 662-n may have been derived based on the same output from which the summary 675 was derived, or a different output received from the same model or a different model that is trained to identify portions of media content in response to inputs including media content, the transcript or any contextual features.

Alternatively, in some other implementations, one or more portions of the summary 675 or the media clips 662-n may have been selected by a creator or any other individual or entity.

As is discussed above, the summary 675 or the media clips 662-n may be presented to listeners in any manner, which may be selected or determined based on attributes of devices, attributes of listeners, or on any other basis. For example, as is shown in FIG. 6A, the summary 675 may be shortened, abridged or condensed into a text-based summary 675A, viz., "One Vet's View: Mike served two tours in Vietnam," that includes a title of the media program and is specifically designed for a device 682A having a limited display area or screen size. The device 682A also displays a selectable feature 646A that may be selected to receive one or more of the media clips 662-n, and a selectable feature 640A that may be selected to enable a listener or another user to begin receiving media content of the media program.

As is shown in FIG. 6B, the summary 675 may be converted into audio data that is transmitted to a device 682B that includes an audio speaker but does not include a display. Upon interpreting the audio data, the device 682B emits signals representing an audible summary 675B, viz., "One Vet's View: Mike, a Vietnam vet, is reliving the '60s through music. Would you like to join?" The summary 675B identifies the media program and invites a listener or any users within a vicinity of the device 682B to join the media program by one or more spoken commands, which may but need not include a wake word. Additionally, the device 682B further emits a media clip 662B of the media clips 662-n, including words spoken by a creator of the media program, viz., "My regiment had Hendrix fans, Creedence fans, Nancy Sinatra fans . . . we listened to it all." The device 682B also emits signals representing an invitation 640B to join the media program, e.g., by providing one or more voice commands to the device 682B.

As is further shown in FIG. 6C, the summary 675 of the media program may be shortened, abridged or condensed into a text-based summary 675-C1, viz., "One Vet's View: Mike, who served two tours in Vietnam, is playing songs of the '60s and talking about the era of war and music." The summary 675-C1 also includes a title of the media program and is specifically designed based on a display area or screen size of a device 682C. Additionally, the summary 675 may be converted into audio data that is transmitted to the device 682C and may be interpreted to cause the device 682C to emit an audible summary 675-C2, viz., "Mike, a Vietnam vet, is reliving the '60s through the war and music. Press 'Join Now" to join him." Additionally, the device 682C also emits signals representing a media clip 662C of the media clips 662-n, including words spoken by a creator of the media program, viz., "In 1968, James Brown brought the house down in a concert at Long Binh." The device 682C further displays a selectable feature enabling a listener or another user to join the media program, as well as an image or a graphic representative of the media program that may be selected based on the summary 675 or on any other basis.

Alternatively, those of ordinary skill in the pertinent arts will recognize that a summary of a media program or a representative portion of the media program generated in response to inputs of media content, a transcript and any contextual features may be customized based on any attributes or features of a device, other than displays or speakers. Moreover, a summary or a representative portion may be customized based on any information or data regarding a listener or viewer for which the summary is intended, which may include references to media content previously listened to or viewed by the listener or viewer, any items previously purchased by the listener or viewer, or any items in which the listener or viewer is believed to have an interest.

As is discussed above, summaries of media content of in-progress media programs may be generated and updated based on outputs received from models in response to inputs including media content, a transcript of at least some of the media content and any contextual features, particularly where the transcript or one or more of the contextual features are determined with sufficiently low latency and sufficiently low uncertainty. Where latency or uncertainty are unacceptably high, however, a summary may be generated based on a portion of a transcript alone, e.g., a transcript of a portion of the media content, such as a set of words that was most recently spoken, sung or otherwise uttered by one or more participants in the media program.

Figure 7A:
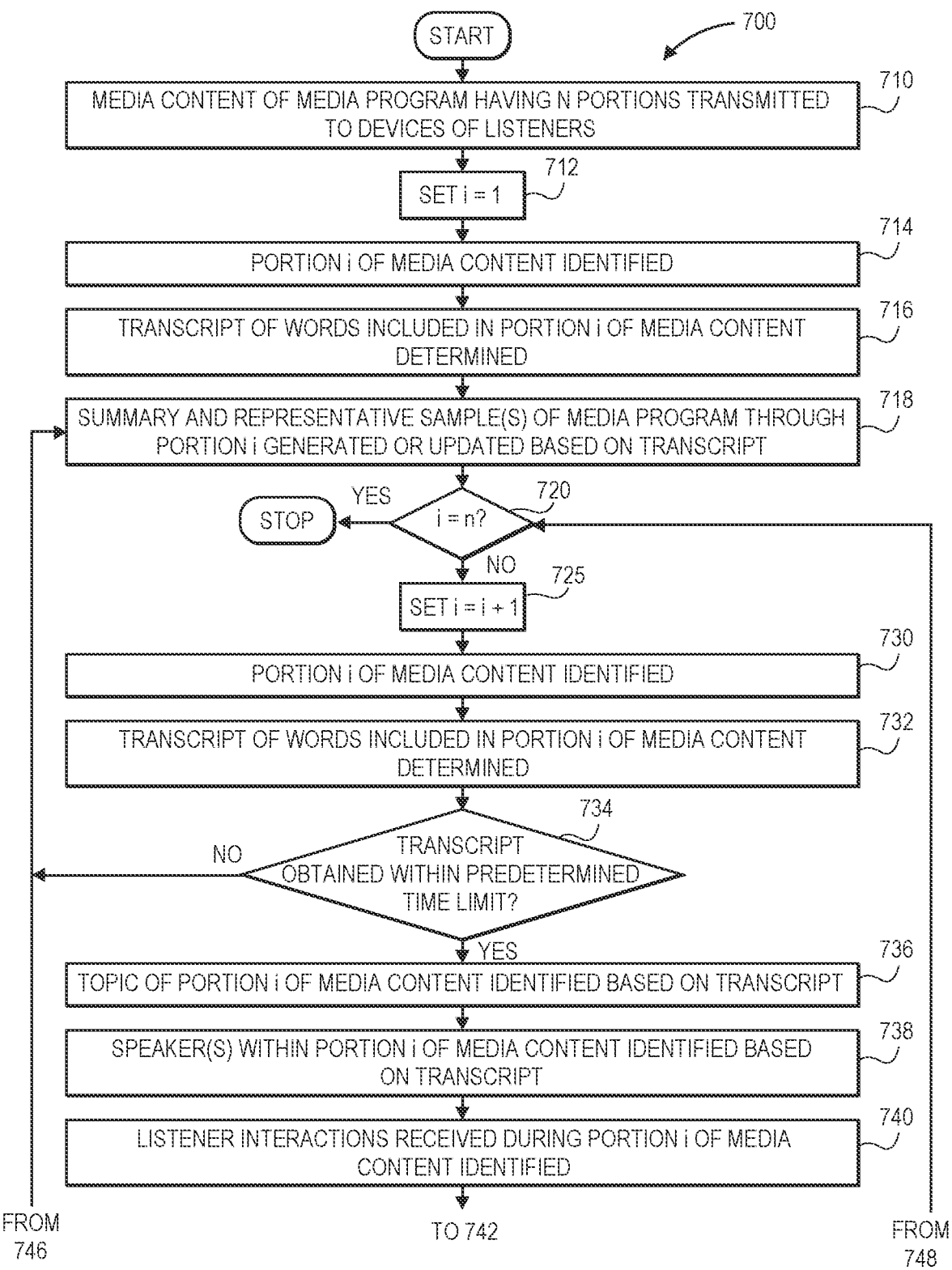
FIGS. 7A and 7B are a flow chart of one process for summarizing media content in accordance with embodiments of the present disclosure.
Figure 7B:
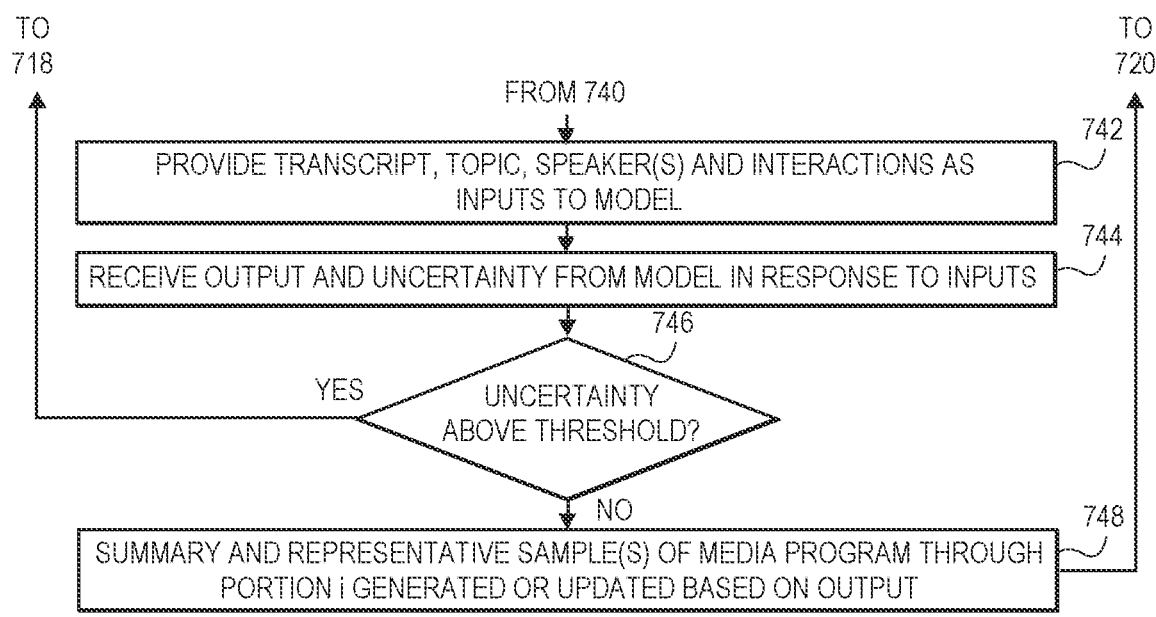

Referring to FIGS. 7A and 7B, a flow chart 700 of one process for summarizing media content in accordance with embodiments of the present disclosure is shown. At box 710, media content of a media program having n portions is transmitted to devices of listeners. In some implementations, each of the n portions may have the same duration or be an interval of the same length of time. In some other implementations, however, two or more of the n portions may have different durations or be intervals of different lengths of time. In some implementations, each of then portions may include media content of a common type or form, advertisements, music, news, sports, weather, or other programming. In some other implementations, however, one or more of the n portions may include media content of multiple types or forms.

At box 712, a value of a step variable i is set to equal one, or i=1, and at box 714, a portion i of media content is identified.

At box 716, a transcript of words included in the portion i of media content is determined. For example, in some implementations, the portion i may be processed by one or more machine learning algorithms, systems or techniques to recognize and interpret any spoken words represented within the data representing the media content. At box 718, a summary of the media program and a representative portion of the media program through portion i is generated or updated based on the transcript. For example, the summary may include, or be updated to include, words uttered (e.g., spoken or sung) during a predetermined period of time of the portion i, e.g., a most recent number of seconds, as reflected within the transcript determined at box 716. Alternatively, the summary may include, or be updated to include, any number or all of the words uttered (e.g., spoken or sung) during the portion i of the media program. The representative portion of the media program may include all of the portion i, a subset of the portion i, or one or more other portions.

At box 720, whether a value of the step variable i is equal to the number n of portions of the media program, or whether i=n, is determined. For example, if the portion i is the nth portion of the media program, the media program is complete, and the process ends.

If the value of the step variable i is not equal to the number n of portions of the media program, or if i≠n, then the process advances to box 725, where a value of the step variable i is incremented by one, or i=i+1, and at box 730, another portion i of media content is identified.

At box 732, another transcript of words included in the portion i of media content is determined. For example, the transcript of words included in the portion i may be determined using the same algorithm, system or technique as in box 716, or by another algorithm, system or technique.

At box 734, whether the transcript is determined within a predetermined time limit is determined. For example, the determination of the transcript at box 732 may be delayed due to server errors, insufficient memory, low bandwidth or throughput, or for any other reason.

If the transcript is not determined within the predetermined time limit, then the process returns to box 718, where the summary of the media program through portion i is generated or updated based on the transcript. For example, as is discussed above with regard to box 718, the summary may include, or be updated to include, words uttered (e.g., spoken or sung) during a predetermined period of time of the portion i, e.g., a most recent number of seconds, as reflected within the transcript determined at box 732.

If the transcript is determined within the predetermined time limit, however, then the process advances to box 736, where a topic of the portion i of media content is identified based on the transcript determined at box 732. For example, a topic (or a theme) of the portion i may be identified by one or more NLP or NLU techniques, or by providing the transcript to one or more machine learning algorithms, systems or techniques to identify one or more of the words or phrases that best represent the portion i of the media content. In some implementations, the topic of the portion i may be identified or designated by a creator, a listener or another individual, who may be prompted or encouraged to apply one or more tags or other labels indicative of the topic of the portion i, or to identify a point in time during which the topic of the portion i has changed. Records of such tags or labels, or times at which such tags or labels were received, may be stored and utilized to identify the topic of the portion i.

At box 738, one or more speakers within the portion i of media content are identified based on the transcript. For example, the transcript or the portion i of the media content may be partitioned into segments corresponding to different speakers, e.g., by speaker diarization, based on information regarding statuses or configurations of devices of participants at various times during the transmission of media content, or in any other manner, and processed to identify or predict a number of different speakers expressed therein, to identify boundaries of segments of the transcript or the portion of the media content associated with each of the different speakers, or to assign each of such segments with one or more discrete speakers. Alternatively, or additionally, in some implementations, the transcript or the portion i of the media content may be processed to recognize any known music or other media, and to determine whether the music or other media is a focus of the media content, or is being played in the background of the media content. Moreover, in some implementations, a creator, a listener or another individual may identify individual speakers based on the transcript or the portion of the media content.

At box 740, any interactions received from listeners during the portion i of media content are identified. For example, one or more of the listeners may execute gestures or other interactions with user interfaces including interactive features for expressing an opinion or other emotion regarding a media program. Any type or form of interaction received from a listener during a playing of a media program may be received and interpreted. Such interactions may include, but need not be limited to, selections of one or more icons, characters, symbols or other visual indicators provided on the user interfaces, chat messages received from listeners, requests to participate in the media program received from listeners, or one or more voice commands or utterances, as well as instances in which a listener plays or pauses the media program, stops the media program, searches for another media program, or takes any other action regarding the media program.

At box 742, the transcript determined at box 732, the topic determined at box 734, the speakers identified at box 738 and the interactions received at box 740 are provided as inputs to a model trained to generate a summary of media content. The model may be an artificial neural network, such as a recurrent neural network or a convolutional neural network, as well as a transformer, such as a bidirectional encoder representation from transformers, or any other type or form of machine learning algorithm, system or technique.

Alternatively, or additionally, the inputs may further include some or all of the portion i of the media content.

At box 744, an output and a measure of uncertainty are received from the model in response to the inputs.

At box 746, whether the uncertainty exceeds a predetermined threshold is determined. If the uncertainty exceeds a threshold, then the process returns to box 718, where the summary of the media program and one or more representative portions of the media program through portion i are generated or updated based on the transcript. For example, if a level of confidence or accuracy associated with the output received at box 744 is insufficiently high, then the summary of the media program through portion i is generated or updated based on the transcript determined at box 732, rather than the output.

If the uncertainty does not exceed the threshold, however, then the process advances to box 748, where a summary or one or more representative portions of the media program through the portion i of media content is generated or updated based on the output received at box 744, before returning to box 720, where whether the value of the step variable i is equal to the number n of portions of the media program, or whether i=n, is determined. For example, if the portion i is the nth portion of the media program, the media program is complete.

A summary of a media program or a set of representative portions of the media program may be generated or updated in stages or iterations, as long as the media program remains in progress. Referring to FIGS. 8A through 8F, views of aspects of one system for summarizing media content in accordance with embodiments of the present disclosure are shown. Except where otherwise noted, reference numerals preceded by the number "8" shown in FIGS. 8A through 8F indicate components or features that are similar to components or features having reference numerals preceded by the number "6" shown in FIGS. 6A through 6C, by the number "5" shown in FIGS. 5A through 5F, by the number "3" shown in FIG. 3, by the number "2" shown in FIG. 2A or 2B, or by the number "1" shown in FIGS. 1A through 1H.

Figure 8A:
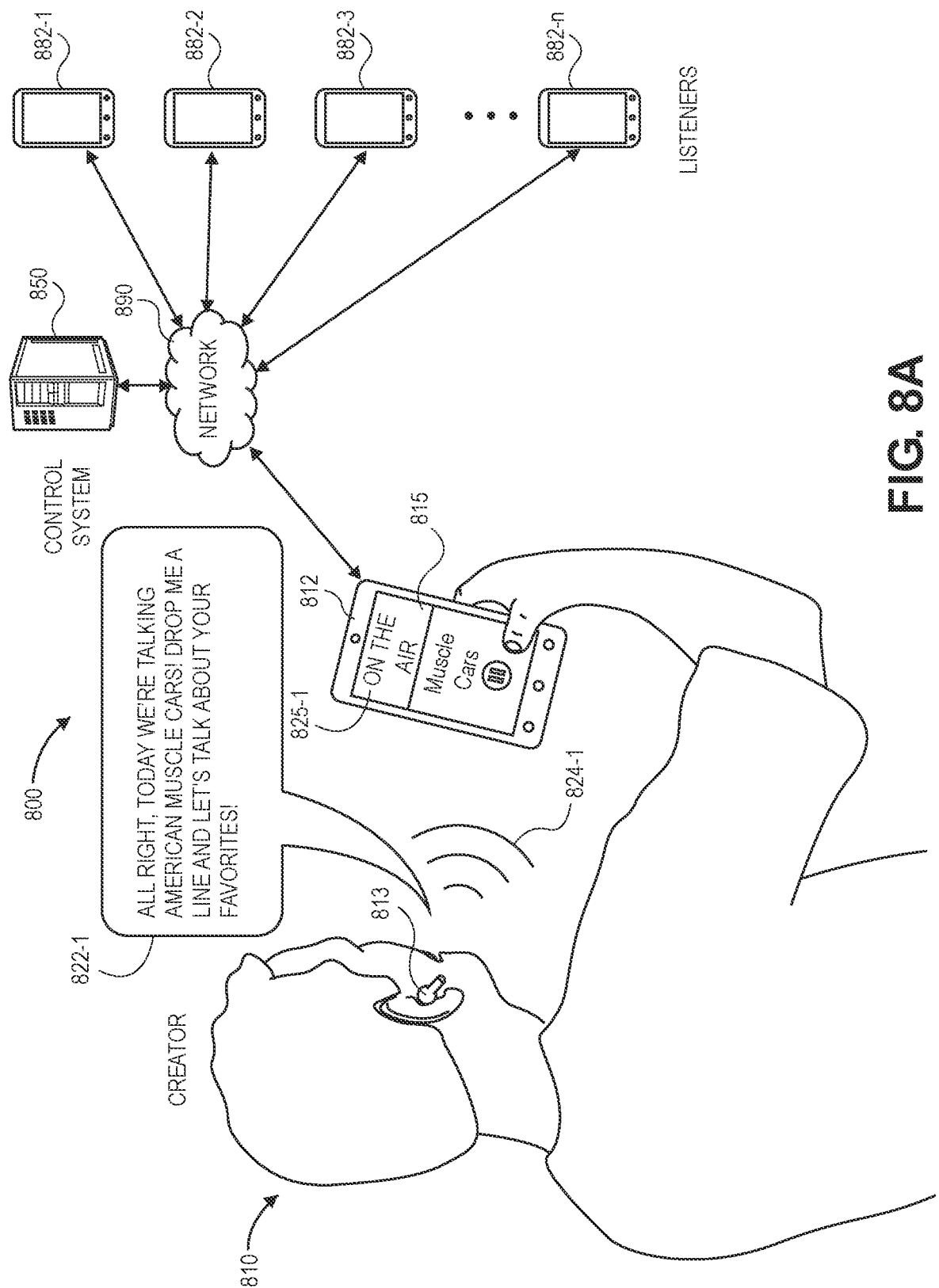

As is shown in FIG. 8A, a creator 810 of a media program provides an initial utterance 822-1 to a mobile device 812 (e.g., a tablet computer, a smartphone, or any other computer device or system) having one or more user interfaces 825-1 rendered on a display 815. Data 824-1 captured by the mobile device 812 may be transmitted to a control system 850 or to one or more devices 882-1, 882-2, 882-3 . . . 882-n of any number of listeners over one or more networks 890. As is shown in FIG. 8A, the utterance 822-1 welcomes the listeners to the media program, and describes a broadcast plan or a theme of at least a portion of the media program, viz., "All right, today were talking American muscle cars! Drop me a line and let's talk about your favorites." Upon receiving the data 824-1, the devices 882-1, 882-2, 882-3 . . . 882-n may cause one or more words of the utterance 822-1 to be played, e.g., to listeners within a vicinity of the devices 882-1, 882-2, 882-3 . . . 882-n.

Figure 8B:
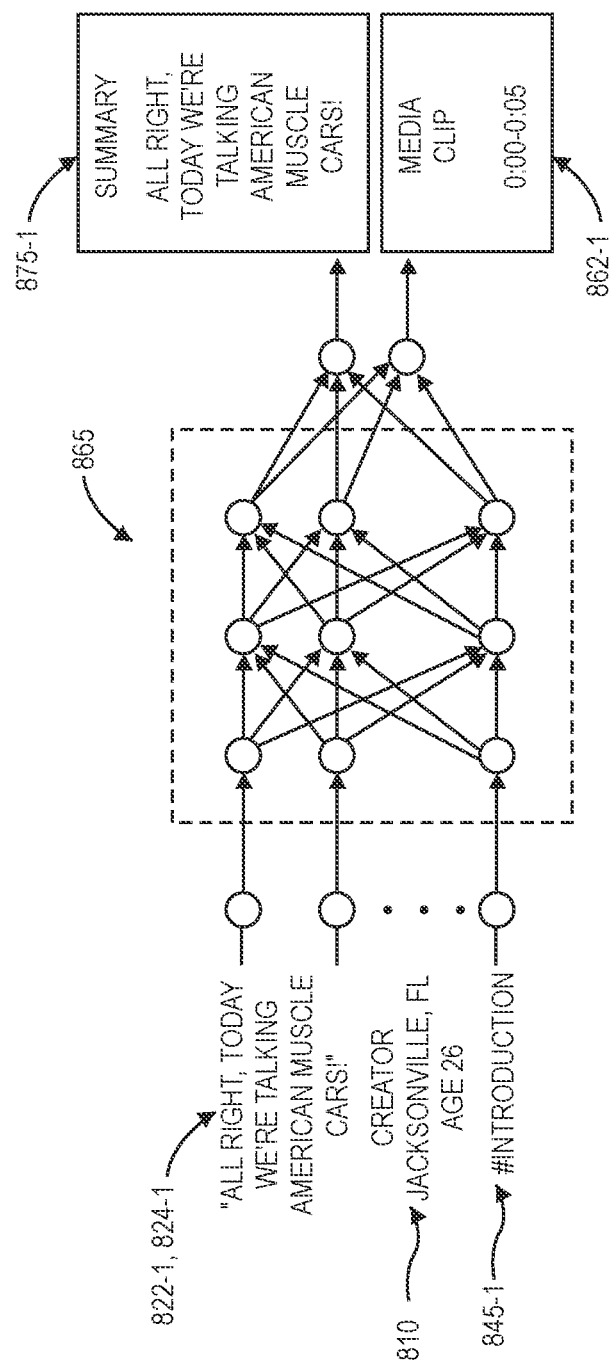

As is shown in FIG. 8B, a set of inputs including a set of words identified in the utterance 822-1, or some or all of the data 824-1, is provided to a model 865 along with information regarding the creator 810, and a topic 845-1 of a portion of the media program (e.g., the utterance 822-1), or "#introduction." The set of words may be identified by processing the utterance 822-1 according to one or more machine learning algorithms, systems or techniques, while the identity of the creator 810 may be determined automatically based on a manual entry or selection of the creator 810, or in any other manner. The information regarding the creator 810 may include a name of the creator 810, a location of the creator 810 and an age of the creator 810, or any other information. The topic 845-1 may be identified automatically by any topic modeling technique, e.g., by one or more topic modeling algorithms or methods such as one or more latent Dirichlet allocations, matrix factorizations, latent semantic analyses, pachinko allocation models, transformers (e.g., a bidirectional encoder representation from transformers) or others, based on the set of words identified in the utterance 822-1. Alternatively, in some implementations, the topic 845-1 may be designated by the creator 810, who may manually select or indicate the topic 845-1 by one or more gestures or other interactions with a user interface provided on the mobile device 812.

The model 865 may be any machine learning algorithm, system or technique that is configured to receive multi-modal inputs including media content, sets of words included or represented in media content (e.g., a transcript of the media content) or one or more contextual features, including but not limited to topics, identities of speakers of the media content, listener interactions with the media content, or any other contextual features. In some implementations, the model 865 may be an NLP and/or an NLU model, such as an artificial neural network, e.g., a recurrent neural network or a convolutional neural network, as well as a transformer, e.g., a bidirectional encoder representation from transformers, or any other machine learning algorithm, system or technique.

As is shown in FIG. 8B, the model 865 outputs an initial summary 875-1 of the media program, which includes at least the utterance 822-1, and an initial media clip (e.g., representative portion) 862-1 of the media program, which may be an initial portion of the media program representing the utterance 822-1. In some implementations, the initial summary 875-1 or the initial media clip 862-1 may be determined based on the set of words of the utterance 822-1 or the data 824-1 alone. For example, the initial summary 875-1 may include some or all of the set of words of the utterance 822-1, such as where the media program has just begun, where the set of words of the utterance 822-1 is identified with a high level of latency (e.g., delay), or where the set of words of the utterance 822-1 or any contextual features, such as topics, identities of speakers, or interactions by listeners, are identified with a high level of uncertainty. For example, as is shown in FIG. 8B, the initial summary 875-1 states, "All right, today we're talking American muscle cars!" and includes a portion of the set of words of the utterance 822-1, while the initial media clip 862-1 represents the first five seconds of the media program.

Once the initial summary 875-1 and the initial media clip 862-1 have been generated, the initial summary 875-1 or the initial media clip 862-1 may be presented to one or more prospective listeners or viewers, either visually or audibly, and such prospective listeners or viewers may evaluate the initial summary 875-1 or play the initial media clip 862-1 when determining whether to join the media program in progress.

As is shown in FIG. 8C, a listener 880-1 (e.g., a guest) of the media program provides an utterance 822-2 to the mobile device 882-1 of the listener 880-1. Data 824-2 captured by the mobile device 882-1 may be transmitted to the control system 850 or to the mobile device 812 of the creator 810 and any number of devices of listeners over one or more networks 890. As is shown in FIG. 8C, the utterance 822-2 includes an opinion of the listener 880-1 in the context of the media program, viz., "You're a real one if you've owned cars built by each of the Big Three." Upon receiving the data 824-2, any devices may cause audible signals representing one or more words of the utterance 822-2 to be played, e.g., to the creator 810 or to any listeners within a vicinity thereof.

Additionally, as is also shown in FIG. 8C, the device 812 includes a user interface 825-2 rendered on a display 815. The user interface 825-2 includes a section having one or more interactive or selectable features that enable the creator 810 to designate a speaker providing media content at a given time, e.g., himself or herself, or the listener 880-1, or another participant in the media program. In some implementations, the interactive or selectable features may include, but need not be limited to, one or more buttons, text boxes, checkboxes, drop-down menus, list boxes, toggles, pickers, search fields, tags, sliders, icons, carousels, or any other elements or features.

The user interface 825-2 also includes a section having one or more interactive or selectable features that enable the creator to designate one or more topics of the media content, such as by selecting one or more topics that may be automatically identified by the control system 850, by the device 812, or by any other system, or by manually designating a topic through one or more gestures or other interactions. The user interface 825-2 further includes a button 835 or another interactive or selectable feature that, when selected, enables the creator 810 to confirm his or her designations of a speaker or of one or more topics, and to transmit information or data regarding such designations to the control system 850 over the one or more networks 890.

Figure 8D:
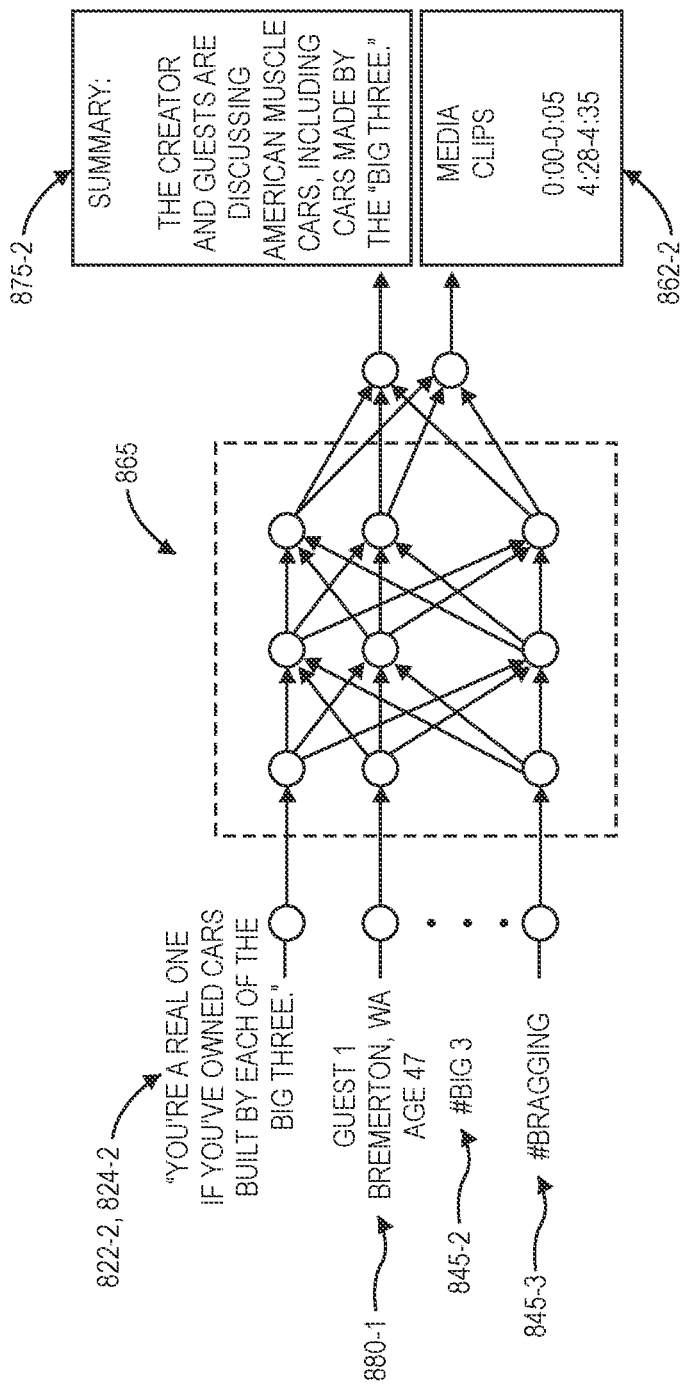

A summary of the media program may be continually updated based on outputs received from the model 865, in response to inputs including media content of the media program, as well as inputs identified from media content. As is shown in FIG. 8D, another set of inputs including a set of words identified in the utterance 822-2, or at least some of the data 824-2, as well as information regarding the listener 880-1 (e.g., a name, a location or an age of the listener 880-1), and topics 845-2, 845-3 of a portion of the media program (e.g., the utterance 822-2), or "#Big3" and "#bragging," is provided to the model 865. In response to the inputs, the model 865 outputs an updated summary 875-2 of the media content of the media program, including at least the utterance 822-1 by the creator 810 and the utterance 822-2 by the listener 880-1, and an updated set of media clips 862-2 (e.g., representative portions) from the media program. For example, as is shown in FIG. 8D, the updated summary 875-2 states, "the Creator and Guests are discussing American muscle cars, including cars made by the 'Big Three.'" The updated set of media clips 862-2 includes the first five seconds of the media program, as shown in FIG. 8B, as well as a more recent seven-second clip, which may include media content of the media program representing the utterance 822-2 by the listener 880-1.

Once the updated summary 875-2 and the updated set of media clips 862-2 have been generated, the updated summary 875-2 or the updated set of media clips 862-2 may be presented to one or more prospective listeners or viewers, either visually or audibly, and such prospective listeners or viewers may evaluate the updated summary 875-2 or listen to one or both of the updated set of media clips 862-2 when determining whether to join the media program in progress.

As is shown in FIG. 8E, the creator 810 provides another utterance 822-3 to the mobile device 812, and data 824-3 captured by the mobile device 812 may be transmitted to the control system 850 or to the one or more devices 882-1, 882-2, 882-3 . . . 882-*n* over the one or more networks 890. As is shown in FIG. 8E, the creator 810 refers to a media entity 872 (e.g., a song) in the context of the media program, viz., "When I think of American cars, I think of this tune by Bob Seger & the Silver Bullet Band," and initiates the playing of the 1986 song "Like a Rock" by one or more gestures or other interactions with the mobile device 812. Such interactions may cause the control system 850 to establish one or more communications channels with a music source 870, and cause data for playing the media entity 872 to be transmitted to the devices 882-1, 882-2, 882-3 . . . 882-*n* over the one or more networks 890. Upon receiving the data 824-3 and the data 874, the devices 882-1, 882-2, 882-3 . . . 882-*n* may cause one or more words of the utterance 822-3 to be played, along with the media entity 872, e.g., to listeners within a vicinity of the devices 882-1, 882-2, 882-3 . . . 882-*n*.

Figure 8F:
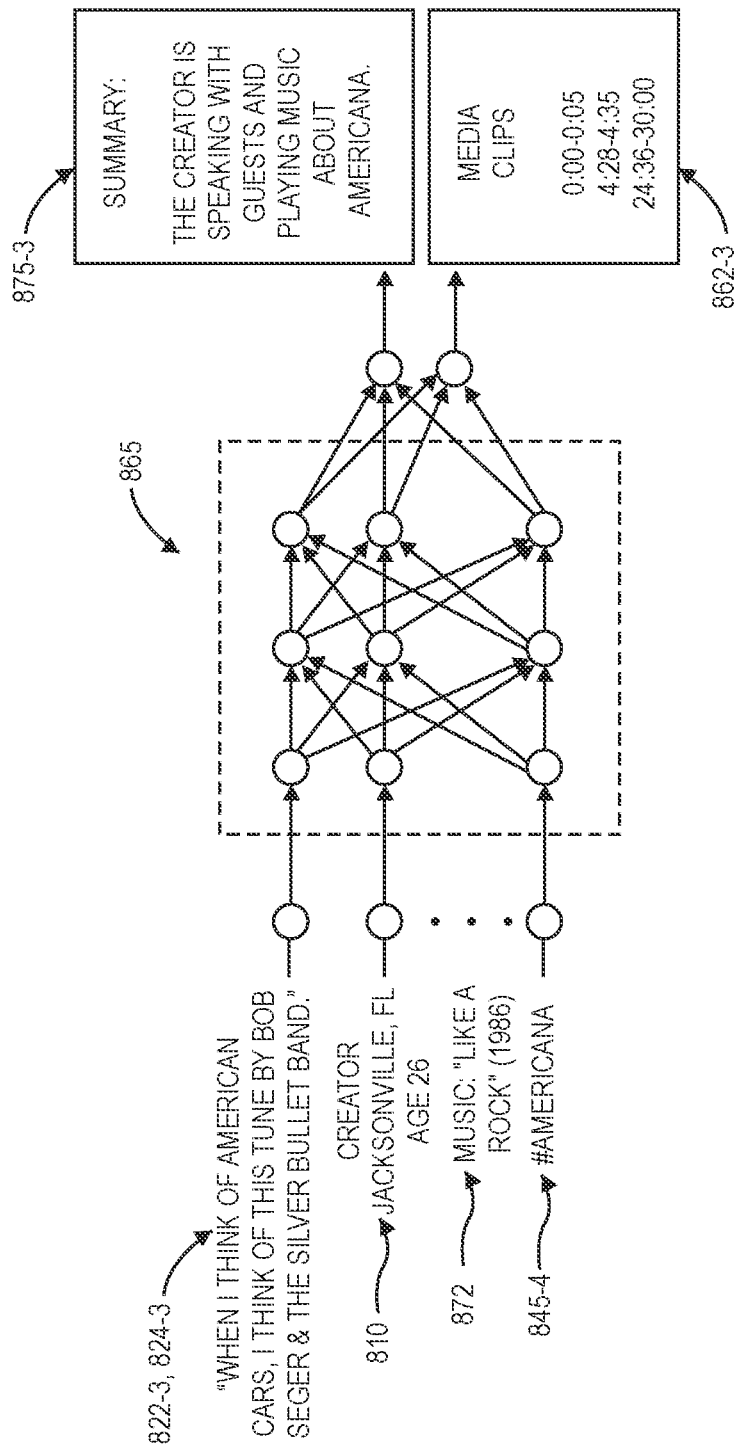

As is shown in FIG. 8F, another set of inputs including a set of words identified in the utterance 822-3, at least some of the data 824-3, the information regarding the creator 810, an identifier of the media entity 872, and topic 845-4 of a portion of the media program (e.g., the utterance 822-3 and the media entity 872), or "#Americana," is provided to the model 865. In response to the inputs, the model 865 outputs an updated summary 875-3 of the media content of the media program, as well as an updated set of media clips 862-3 (e.g., representative portions) from the media program. For example, as is shown in FIG. 8F, the updated summary 875-3 states, "the Creator is speaking with guests and playing music about Americana." The updated set of media clips 862-3 includes the first five seconds of the media program, as shown in FIG. 8A, as well as a more recent seven-second clip, which may include media content of the media program representing the utterance 822-2 by the listener 880-1 shown in FIG. 8C, and a final five minutes, twenty-four seconds of the media program, which may include media content of the media program representing the utterance 822-3 and the media entity 872.

Once the updated summary 875-3 and the updated set of media clips 862-3 have been generated, the updated summary 875-3 or the updated set of media clips 862-3 may be presented to one or more prospective listeners or viewers, either visually or audibly, and such prospective listeners or viewers may evaluate the updated summary 875-3 or listen to any of the updated set of media clips 862-3 when determining whether to join the media program in progress.

As is discussed above, text to be included in a summary of a media program, or a representative portion of the media program, may be identified based not only on outputs received from machine learning algorithms, systems or techniques but also on selections made by a creator or another individual or entity associated with the media program, and the summary or the representative portion may be shared, transmitted or otherwise provided to one or more prospective listeners in any manner. Referring to FIGS. 9A through 9H, views of aspects of one system for summarizing media content in accordance with embodiments of the present disclosure are shown. Except where otherwise noted, reference numerals preceded by the number "9" shown in FIGS. 9A through 9H indicate components or features that are similar to components or features having reference numerals preceded by the number "8" shown in FIGS. 8A through 8F, by the number "6" shown in FIGS. 6A through 6C, by the number "5" shown in FIGS. 5A through 5F, by the number "3" shown in FIG. 3, by the number "2" shown in FIG. 2A or 2B, or by the number "1" shown in FIGS. 1A through 1H.

Figure 9A:
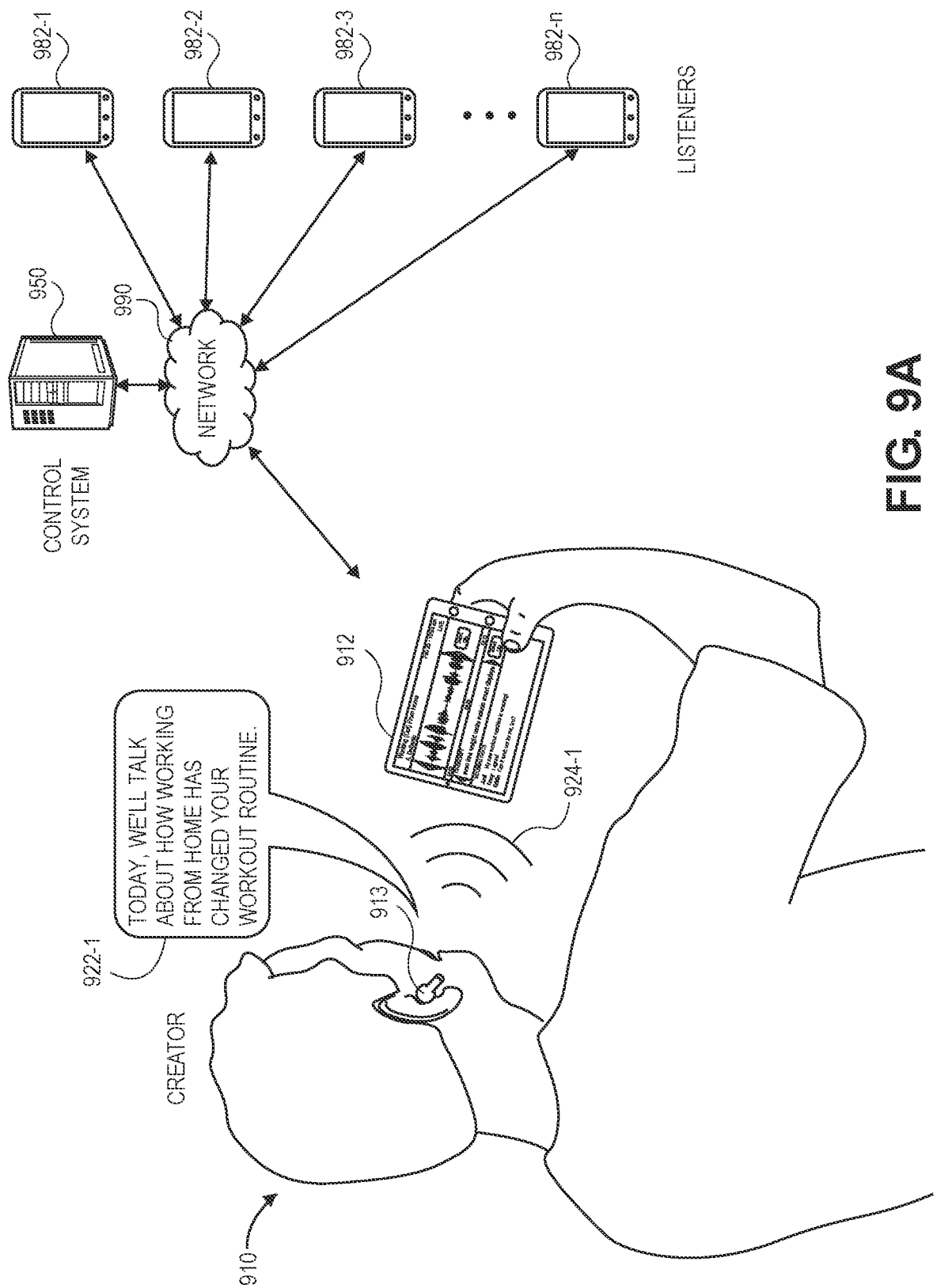
FIGS. 9A through 9H are views of aspects of one system for summarizing media content in accordance with embodiments of the present disclosure.

As is shown in FIG. 9A, a creator 910 of a media program provides an utterance 922-1 to a mobile device 912 (e.g., a tablet computer, a smartphone, or any other computer device or system) having a user interface 925-1 rendered on a display 915. The user interface 925-1 may be rendered by a dedicated application associated with the playing of the media program, or by a general application such as a browser, e.g., by interpreting code received from a control system 950 or from any other source. Acoustic data 924-1 captured by the mobile device 912 may be transmitted to the control system 950 or to one or more devices 982-1, 982-2, 982-3 . . . 982-*n* of any number n of listeners over one or more networks 990. For example, the utterance 922-1 states that at least a portion of the media program will discuss exercise routines, viz., "Today we'll talk about how working from home has changed your workout routines." Upon receiving the acoustic data 924-1, the devices 982-1, 982-2, 982-3 . . . 982-*n* may cause one or more words of the utterance 922-1 to be played to listeners within a vicinity of the devices 982-1, 982-2, 982-3 . . . 982-*n*. During the playing of the media program, any number of interactions of any type or form may be received from listeners associated with the devices 982-1, 982-2, 982-3 . . . 982-*n*.

Figure 9B:
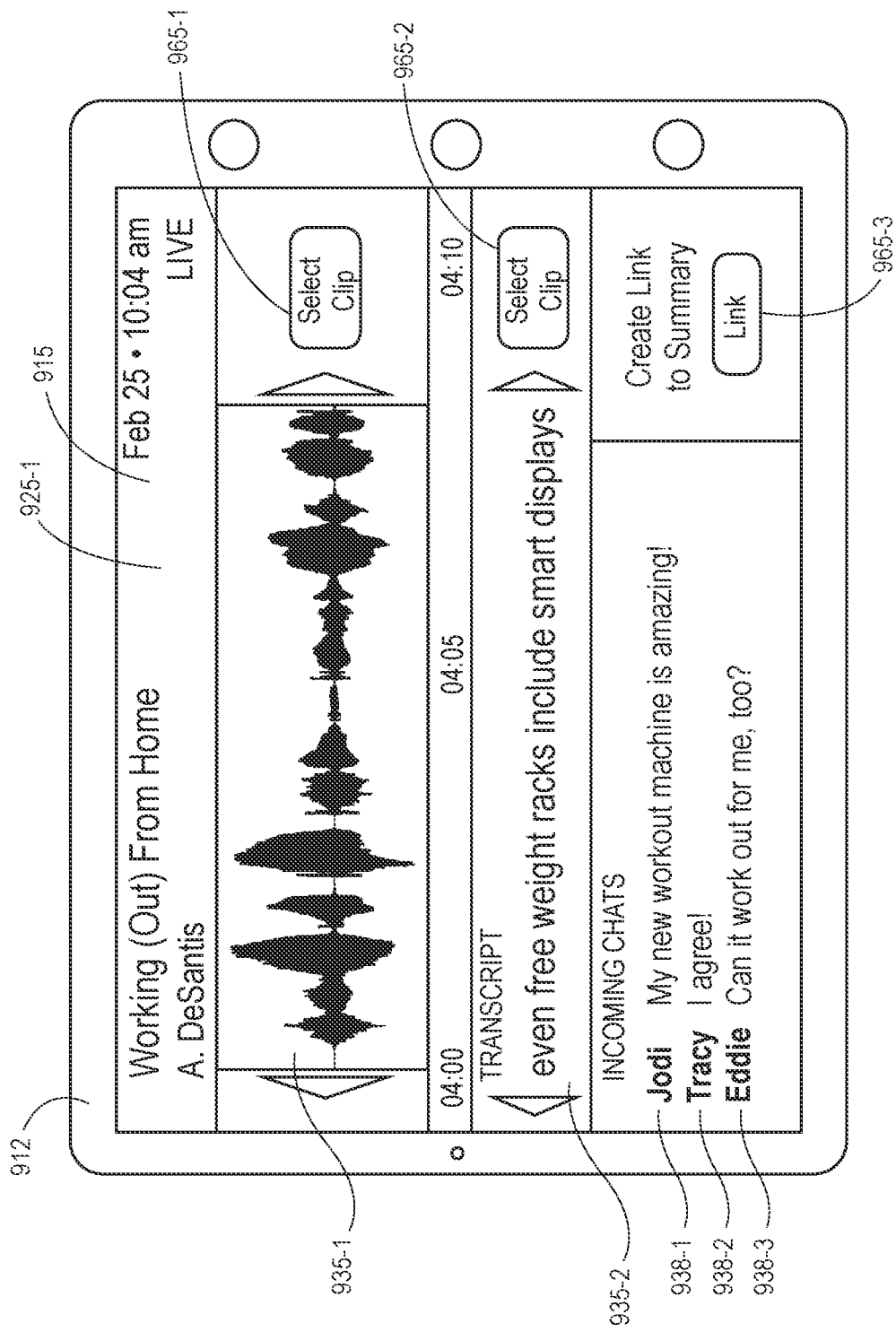

As is shown in FIG. 9B, the user interface 925-1 includes one or more identifiers or information regarding the media program, such as a title of the media program and a name of the creator of the media program, as well as a current date and a time, and an indicator that the media program is being aired live, provided at an upper edge or area of the display 915.

The user interface 925-1 further includes a section 935-1 depicting amplitudes (e.g., a waveform) of acoustic signals transmitted during a media program. The acoustic signals depicted in the section 935-1 may include or represent words that are spoken or sung by the creator 910 or any other participants in the media program, or any other sounds. The section 935-1 may represent the amplitudes in sound pressure levels or any other measures of intensity, and to any scale.

The section 935-1 may present a visual representation of amplitudes of the acoustic signals on a rolling basis, and synchronized to times (e.g., time stamps) at which the corresponding acoustic signals were transmitted to the devices 982-1, 982-2, 982-3 . . . 982-*n*.

The user interface 925-1 also includes a section 935-2 provided below the section 935-1. The section 935-2 depicts words that are transcribed from the acoustic signals, e.g., by one or more machine learning algorithms, systems or techniques. The section 935-2 presents the words identified within or otherwise transcribed from such acoustic signals on a rolling basis, and synchronized to times (e.g., time stamps) at which the corresponding acoustic signals were transmitted to the devices 982-1, 982-2, 982-3 . . . 982-*n*, or to any other devices (not shown). Additionally, the sections 935-1, 935-2 further include buttons 965-1, 965-2 or other features that a listener may select to identify acoustic signals or words that are representative of the media program.

The user interface 925-1 also includes a plurality of chat messages 938-1, 938-2, 938-3 that were received from listeners during the media program. Alternatively, or additionally, the user interface 925-1 may also include a text box or a like feature that enables the creator 910 or any other user of the device 912 to provide chat messages or other text-based interactions, e.g., by executing one or more gestures or other interactions with a virtual keyboard rendered on the display 915, or making one or more audible utterances that are captured, interpreted and converted into text by the device 915. Alternatively, or additionally, the user interface 925-1 may include any other elements or features representing interactions of any type or form that are received from devices associated with listeners to the media program, or from any other source.

The user interface 925-1 also includes a button 965-3 that the creator 910 may select in order to generate and/or transmit a link to a summary of the media program, e.g., to a page or other set of information or data including a summary of the media program or one or more representative portions of the media program.

Figure 9C:
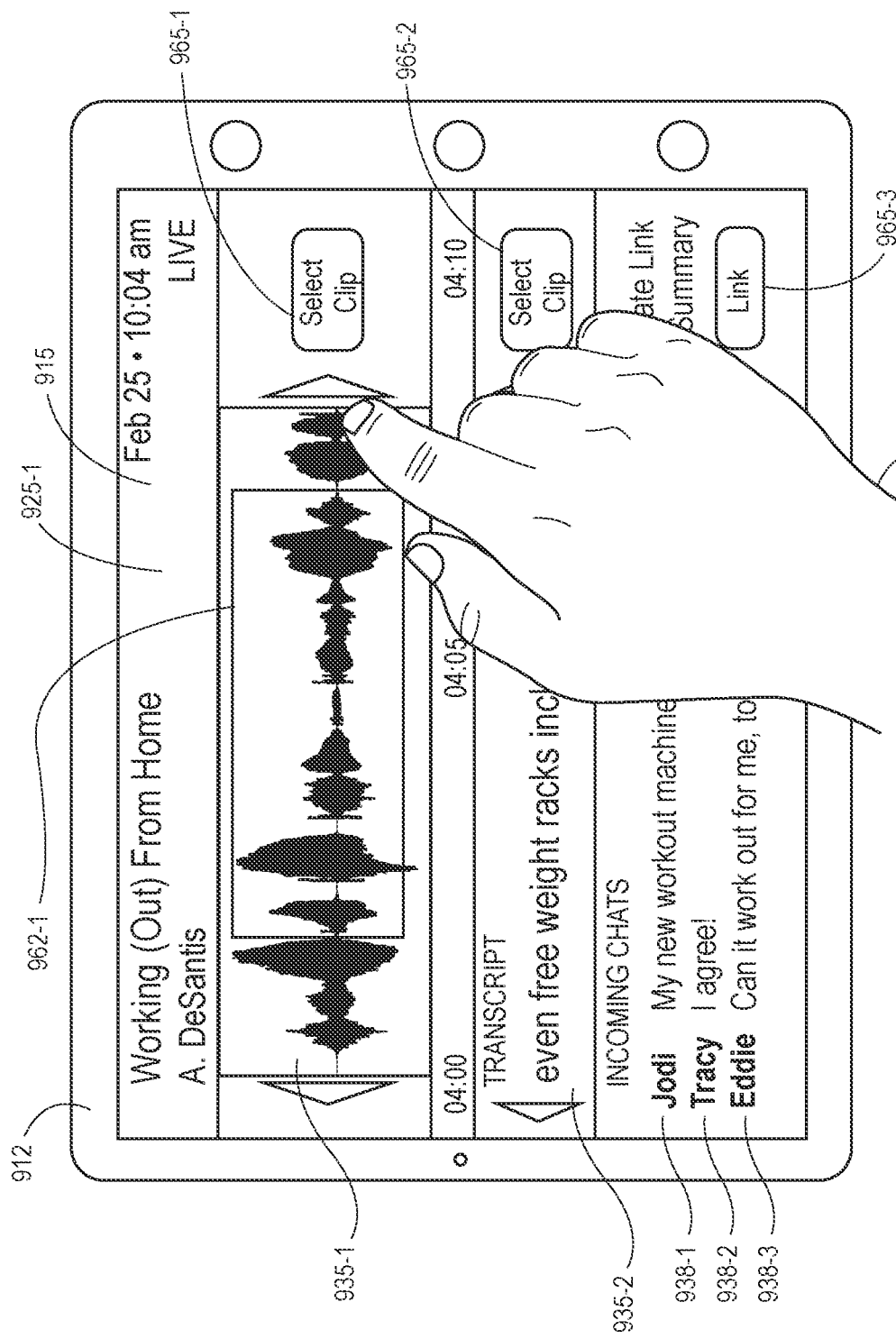

In accordance with implementations of the present disclosure, a creator or any other individual or entity may select text transcribed from media content of a media program, or portions of the media program, by one or more gestures or other interactions with a user interface, e.g., the user interface 925-1. As is shown in FIG. 9C, the creator 910 may select a portion 962-1 of the media program that is representative of the media program by clicking and/or dragging a finger, a stylus or another object across one or more of the amplitudes shown within section 935-1, or in any other manner. In some implementations, the creator 910 may adjust or modify the selection of the portion 962-1 by one or more other interactions with the user interface 925-1, such as to reduce a size or an amount of the media content from the portion 962-1, to expand the size or the amount of the media content within the portion 962-1. After the creator 910 has determined that the portion 962-1 is representative of the media program, the creator 910 may confirm a selection of the portion 962-1 by contacting the button 965-1 or another feature associated with the section 935-1. Alternatively, or additionally, the creator 910 may select the portion 962-1 in any other manner, such as by a mouse, a keyboard, a trackball, or a trackpad, or any other I/O device.

Figure 9D:
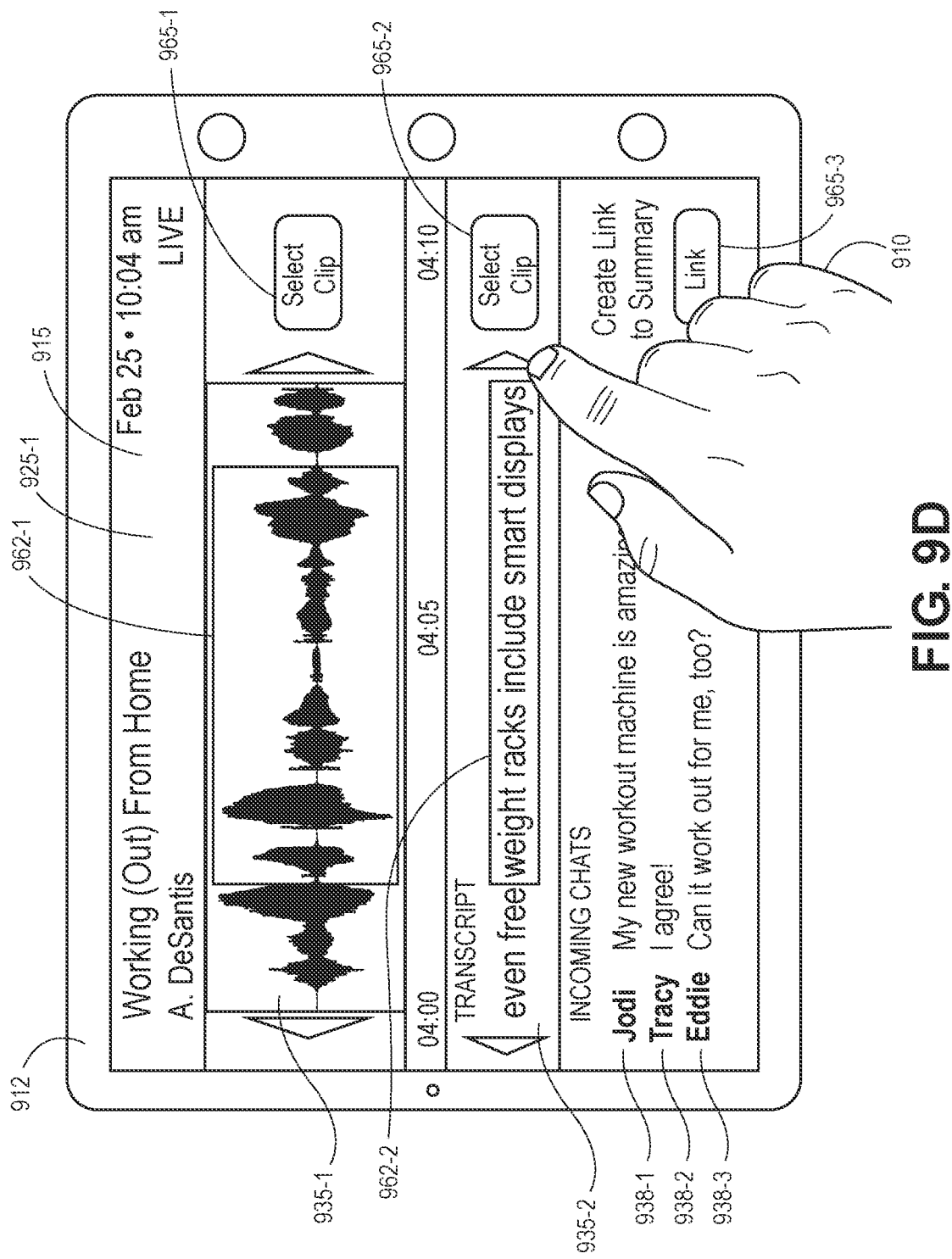

Similarly, as is shown in FIG. 9D, the creator 910 may select a portion 962-2 of the media program that is representative of the media program by clicking and/or dragging a finger, a stylus or another object across one or more of the words shown in the section 935-2, or in any other manner. After the creator 910 has determined that the portion 962-2 is representative of the media program, the creator 910 may confirm a selection of the portion 962-2 by contacting the button 965-2 or another feature associated with the section 935-2. Alternatively, or additionally, the creator may select the portion 962-2 in any other manner, such as by a mouse, a keyboard, a trackball, or a trackpad, or any other I/O device.

Once the portions 962-1, 962-2 of the media program have been selected, as is shown in FIGS. 9C and 9D, the portions 962-1, 962-2 may be utilized for any purpose. For example, the portions 962-1, 962-2 may be identified as representative of the media program, and designated as such for presentation or display to prospective listeners or viewers, e.g., on or via one or more pages that may be accessed via a general-purpose application such as a browser, or a special-purpose application dedicated to the identification, selection or playing of media programs. Likewise, one or more of the words expressed in the portion 962-2 may be included in a summary of the media program, or designated as a theme of the media program, based on the selection of the words by the creator 910. The manner by which a creator or any other individual or entity may select portions of media programs is not limited by any of the implementations shown in FIGS. 9A through 9D or described anywhere herein.

Figure 9E:
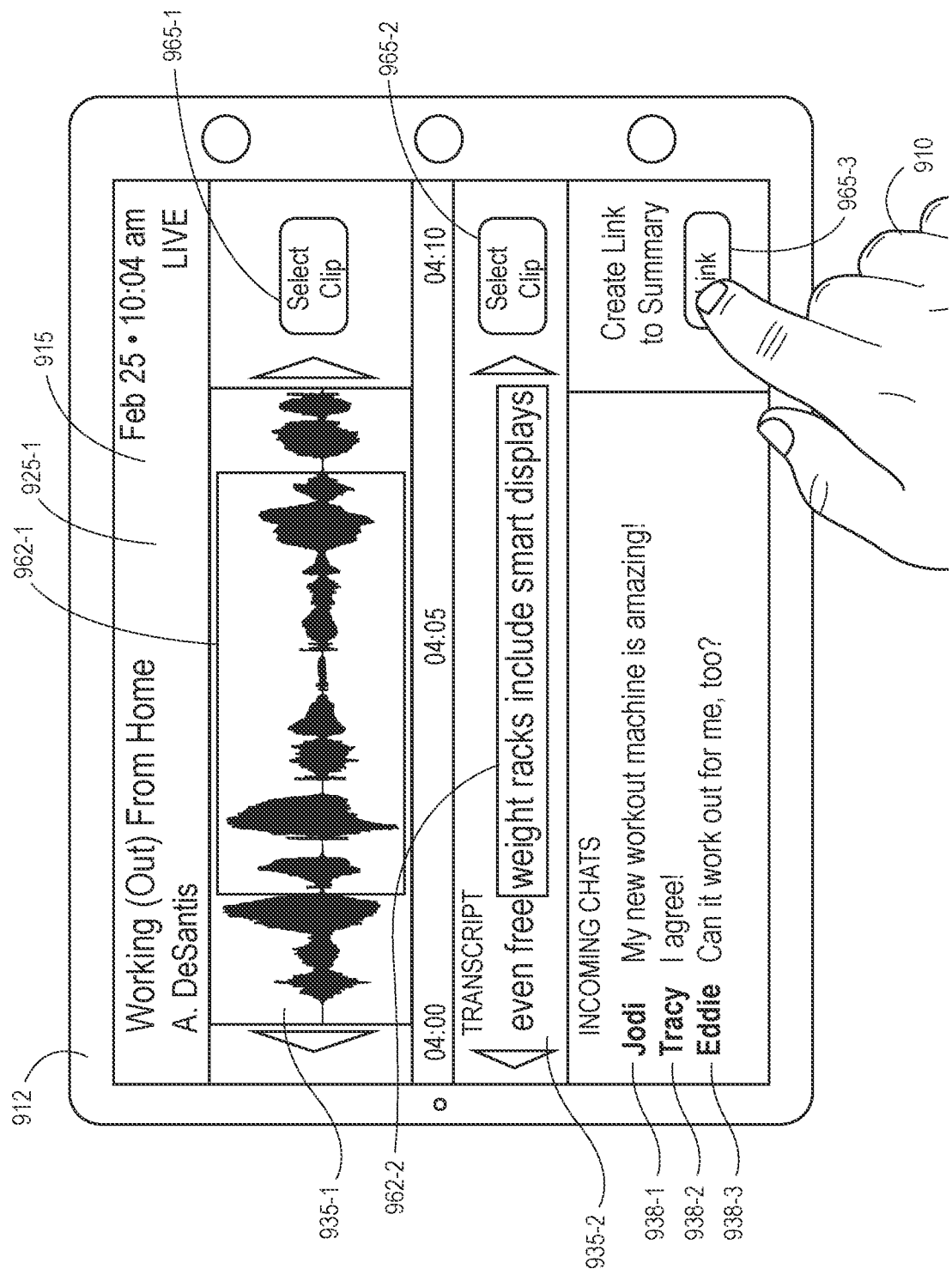
Figure 9F:
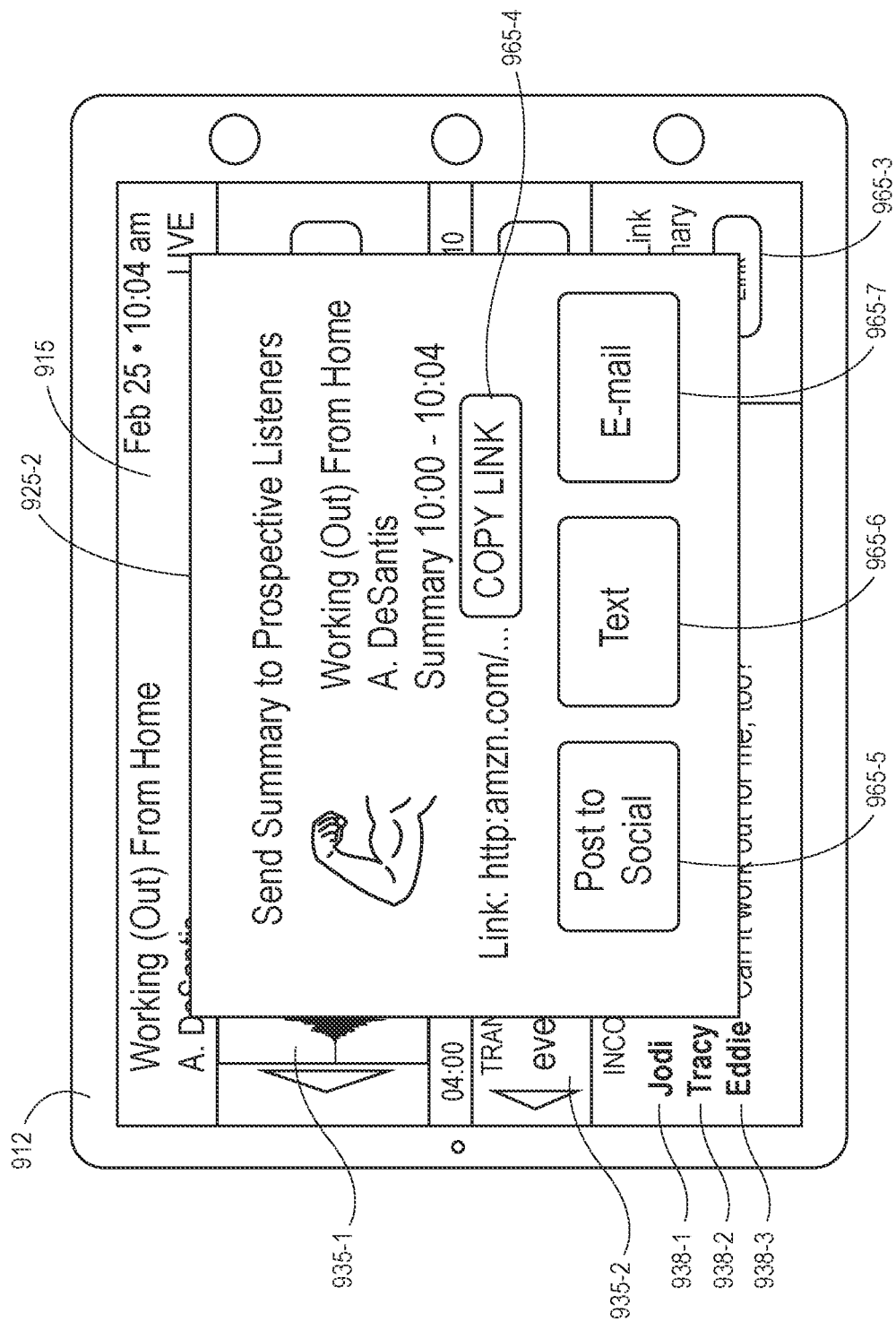

As is shown in FIG. 9E, once the creator 910 has selected the portions 962-1, 962-2 of the media program, the creator 910 may select the button 965-3 to generate a link to one or more pages or other sets of data including a summary of the media program. As is shown in FIG. 9F, upon selecting the button 965-3 shown in FIG. 9E, a window 925-2 (or another user interface) is rendered on the display 915 by the mobile device 912. The window 925-2 includes information regarding the media program, as well as buttons 965-4, 965-5, 965-6, 965-7 which may be selected in order to enable prospective listeners to access the pages or other sets of data including the summary of the media program. The window 925-2 and the buttons or other information thereon may be rendered by the mobile device 912 in any manner, such as by executing code programmed in HTML or any other language, e.g., Java or JavaScript, by a widget, an API, or any other application or feature of the mobile device 912.

For example, upon receiving a selection of the button 965-4, the mobile device 912 copies the link to one or more pages or other sets of data including the summary of the media program is copied to a clipboard, a cache or a buffer for temporary storage or transfer to another application, such as an E-mail client or a messaging application, operating on the mobile device 912. Upon receiving a selection of the button 965-5, the mobile device 912 may post the link to a social media platform or network, or open an application for accessing the social media platform or network, and enable the link to be posted there by or on behalf of the creator 910.

Upon receiving a selection of the button 965-6, the mobile device 912 may open an application for transmitting and/or receiving text messages (e.g., SMS or MMS messages), or any other type or form of messages, and enable the link to be shared with one or more prospective listeners by way of one or more of such messages. Similarly, upon receiving a selection of the button 965-7, the mobile device 912 may open an E-mail client or another application for transmitting and/or receiving E-mail, or any other type or form of messages, and enable the link to be shared with one or more prospective listeners by way of one or more of such messages. Alternatively, the window 925-2, or any other window or interface, may include any number of other buttons or other interactive features for copying or sharing one or more links to pages or other sets of data for enabling prospective listeners to access the pages or other sets of data including the summary of the media program.

Figure 9G:
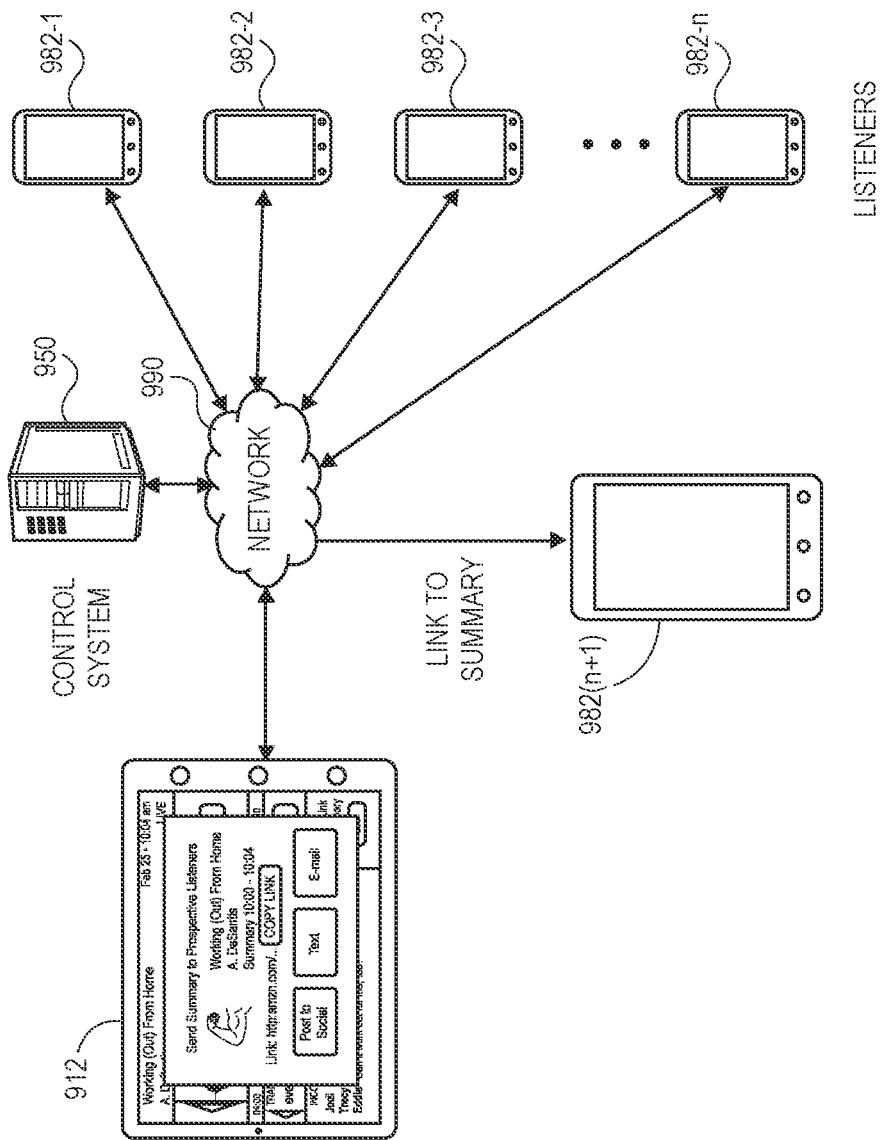

As is shown in FIG. 9G, after one or more of the buttons 965-4, 965-5, 965-6, 965-7 is selected, a link one or more pages or other sets of data including the summary of the media program may be transmitted to a device 982-(n+1) of a prospective listener, e.g., over the one or more networks 990. The link may be transmitted to the device 982-(n+1) in any manner or according to any protocol in accordance with implementations of the present disclosure. As is shown in FIG. 9H, upon receiving the link, and following an activation or selection of the link by a prospective listener, the device 982-(n+1) causes a user interface 930 to be rendered on a display of the device 982-(n+1).

The user interface 930 includes a section 934 provided at an upper edge or area of the display of the device 982-(n+1). The section 934 includes one or more identifiers or information regarding the media program that is in progress, such as a title of the media program, and a name of the creator of the media program, as well as a date and time, and times at which the media program began and is scheduled to end. The section 934 further includes a text-based summary 975 of the media program, which may have been derived based on the portions 962-1, 962-2 selected by the creator 910 as shown in FIGS. 9C and 9D, or on any other portions of the media program, which may have been selected by any entity and on any basis. Alternatively, or additionally, the section 934 may include any other information or data regarding the media program.

Figure 9H:
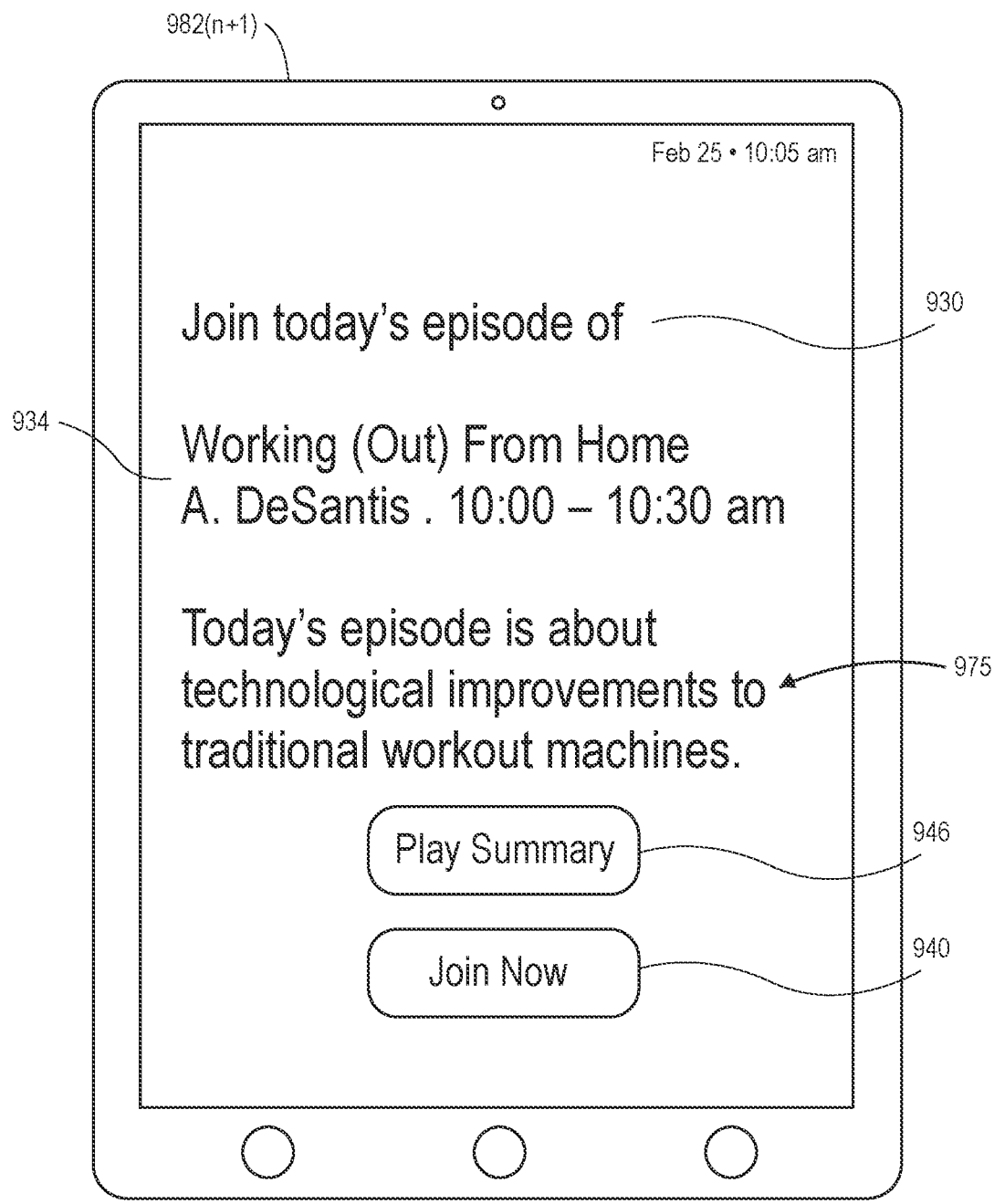

As is further shown in FIG. 9H, the user interface 930 includes a button 946 that, when selected by a prospective listener, causes a representative portion of the media program to be transmitted to the device 982-(n+1) and played thereby. The representative portion of the media program may include or be derived based on the portions 962-1, 962-2 selected by the creator 910 as shown in FIGS. 9C and 9D, or may include or be derived based on any other portions of the media program. The user interface 930 also includes a button 940 that, when selected by the prospective listener, causes a communications channel to be established between the control system 950 and the device 982-(n+1), and causes media content to be transmitted to the mobile device 982-(n+1) in accordance with the media program by the control system 950 or from any other source.

Figure 10:
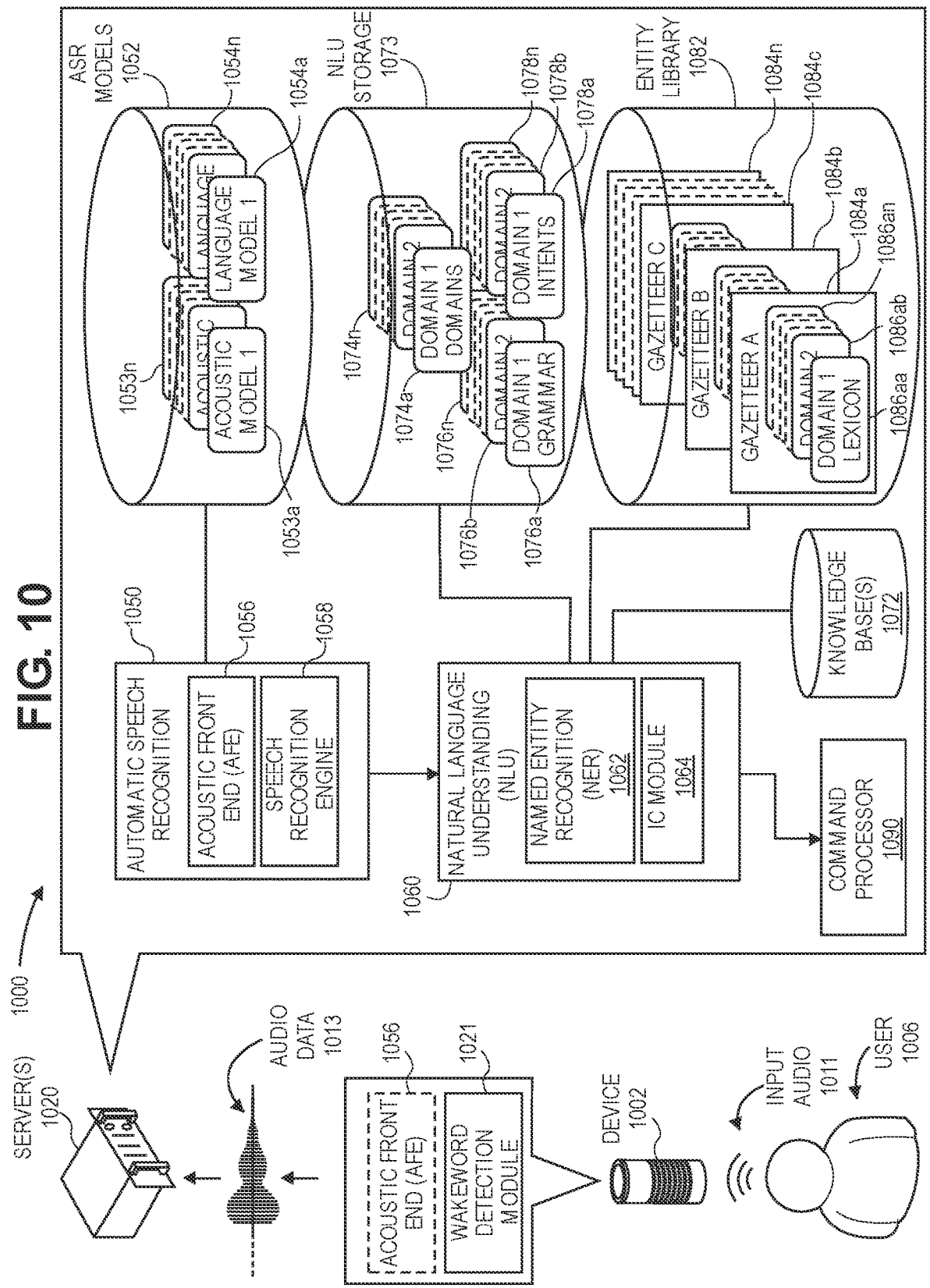
FIG. 10 is a conceptual diagram of one system in accordance with embodiments of the present disclosure.

FIG. 10 is a conceptual diagram of one system for processing an utterance spoken by a user, in order to allow a system to capture and execute commands, e.g., voice commands or utterances that may follow a wake word, in accordance with embodiments of the present disclosure. The various components shown in FIG. 10 may be located on the same physical device, or on different physical devices. Communication between various components illustrated in FIG. 10 may occur directly or across a network. An audio capture component, such as a microphone of device 1002, captures audio 1011 corresponding to a spoken utterance from a user 1006. The device 1002, using a wake word detection module 1021, may then process the audio, or audio data corresponding to the audio, to determine if a keyword (such as a wake word) is detected in the audio. Following detection of a wake word, the device sends audio data 1013 corresponding to the utterance to a server 1020 that includes an ASR module 1050. The audio data 1013 may be output from an acoustic front end ("AFE") 1056 located on the device 1002 prior to transmission. Or the audio data 1013 may be in a different form for processing by a remote AFE 1056, such as the AFE 1056 located with the ASR module 1050.

The wake word detection module 1021 works in conjunction with other components of the device, for example, a microphone to detect keywords in the input audio 1011. For example, the device 1002 may convert input audio 1011 into audio data 1013, and process the audio data 1013 with the wake word detection module 1021 to determine whether speech is detected, and, if so, if the audio data 1013 comprising speech matches an audio signature and/or model corresponding to a particular keyword.

The device 1002 may use various techniques to determine whether audio data includes speech. Some implementations may apply voice activity detection (or "VAD") techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other implementations, the device 1002 may implement a limited classifier configured to distinguish speech from background noise. The classifier may be implemented by techniques such as linear classifiers, support vector machines, and decision trees. In still other implementations, HMM or Gaussian Mixture Model (or "GMM") techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the input audio 1011 received by the device 1002 (or separately from speech detection), the device 1002 may use the wake word detection module 1021 to perform wake word detection to determine when a user intends to speak a command to the device 1002. This process may also be referred to as keyword detection, with the wake word being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wake word detection module 1021 may compare audio data to stored models or data to detect a wake word. One approach for wake word detection applies general large vocabulary continuous speech recognition (or "LVCSR") systems to decode the audio signals, with wake word searching conducted in the resulting lattices or confusion networks. LVCSR decoding may require relatively high computational resources. Another approach for wake word spotting builds HMMs for each key wake word and non-wake word speech signals, respectively. The non-wake word speech includes other spoken words, background noise, etc. There can be one or more HMMs built to model the non-wake word speech characteristics, which are named filler models. Viterbi decoding is used to search the best path in the decoding graph, and the decoding output is further processed to make the decision on keyword presence. This approach can be extended to include discriminative information by incorporating hybrid deep neural network (or "DNN")-HMM decoding framework. In another implementation, the wake word spotting system may be built on DNN or recursive neural network (or "RNN") structures directly, without HMM involved. Such a system may estimate the posteriors of wake words with context information, either by stacking frames within a context window for DNN, or using RNN. Following-on, posterior threshold tuning or smoothing is applied for decision making. Other techniques for wake word detection, such as those known in the art, may also be used.

Once the wake word is detected, the local device 1002 may "wake" and begin transmitting audio data 1013 corresponding to input audio 1011 to the server(s) 1020 for speech processing. Audio data 1013 corresponding to the input audio 1011 may be sent to a server 1020 for routing to a recipient device or may be sent to the server for speech processing for interpretation of the included speech (e.g., for purposes of executing a command in the speech, or for other purposes). The audio data 1013 may include data corresponding to the wake word, or the portion of the audio data corresponding to the wake word may be removed by the local device 1002 prior to sending. Further, a local device 1002 may "wake" upon detection of speech or spoken audio above a threshold. Upon receipt by the server(s) 1020, an automatic speech recognition (or "ASR") module 1050 may convert the audio data 1013 into text. The ASR module 1050 transcribes audio data into text data representing the words of the speech contained in the audio data. The text data may then be used by other components for various purposes, such as executing system commands, inputting data, etc. A spoken utterance in the audio data is input to a processor configured to perform ASR, which then interprets the utterance based on the similarity between the utterance and pre-established language models 1054*a*-1054*n* stored in an ASR model knowledge base (ASR Models Storage 1052). For example, an ASR process may compare the input audio data with models for sounds (e.g., sub-word units or phonemes) and sequences of sounds to identify words that match the sequence of sounds spoken in the utterance of the audio data.

The different ways in which a spoken utterance may be interpreted (e.g., different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 1053*a*-1053*n* stored in an ASR Models Storage 1052), and the likelihood that a particular word which matches the sounds would be included in the sentence at the specific location (e.g., using a language or grammar model). Thus, each potential textual interpretation of the spoken utterance (hypothesis) is associated with a confidence score. Based on the considered factors and the assigned confidence score, the ASR module 1050 outputs the most likely text recognized in the audio data. The ASR module 1050 may also output multiple hypotheses in the form of a lattice or an N-best list with each hypothesis corresponding to a confidence score or other score (such as probability scores, etc.).

The device or devices performing ASR processing may include an AFE 1056 and a speech recognition engine 1058. The AFE 1056 transforms the audio data from the microphone into data for processing by the speech recognition engine. The speech recognition engine 1058 compares the speech recognition data with acoustic models 1053, language models 1054, and other data models and information for recognizing the speech conveyed in the audio data. The AFE 1056 may reduce noise in the audio data and divide the digitized audio data into frames representing time intervals for which the AFE 1056 determines a number of values, called features, representing the qualities of the audio data, along with a set of those values, called a feature vector, representing the features or qualities of the audio data within the frame. Many different features may be determined, as known in the art, and each feature represents some quality of the audio that may be useful for ASR processing. A number of approaches may be used by the AFE 1056 to process the audio data, such as MFCC or PLP techniques, neural network feature vector techniques, linear discriminant analysis, semi-tied covariance matrices, or other approaches known to those of skill in the art.

The speech recognition engine 1058 may process the output from the AFE 1056 with reference to information stored in speech or model storage (1052). Alternatively, post front-end processed data (such as feature vectors) may be received by the device executing ASR processing from another source besides the internal AFE. For example, the device 1002 may process audio data into feature vectors (for example using an on-device AFE 1056) and transmit that information to a server across a network for ASR processing. Feature vectors may arrive at the server encoded, in which case they may be decoded prior to processing by the processor executing the speech recognition engine 1058.

The speech recognition engine 1058 attempts to match received feature vectors to language phonemes and words as known in the stored acoustic models 1053 and language models 1054. The speech recognition engine 1058 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that an ASR process will output speech results that make sense grammatically. The specific models used may be general models or may be models corresponding to a particular domain, such as music, banking, etc.

The speech recognition engine 1058 may use a number of techniques to match feature vectors to phonemes, for example using HMMs to determine probabilities that feature vectors may match phonemes. Sounds received may be represented as paths between states of an HMI and multiple paths may represent multiple possible text matches for the same sound.

Following ASR processing, the ASR results may be sent by the speech recognition engine 1058 to other processing components, which may be local to the device performing ASR and/or distributed across the network(s). For example, ASR results in the form of a single textual representation of the speech, an N-best list including multiple hypotheses and respective scores, lattice, etc., may be sent to a server, such as server 1020, for NLU processing, such as conversion of the text into commands for execution, either by the device 1002, by the server 1020, or by another device (such as a server running a specific application like a search engine, etc.).

A device performing NLU processing 1060 (e.g., server 1020) may include various components, including potentially dedicated processor(s), memory, storage, etc. As shown in FIG. 10, an NLU component may include a named entity recognition (or "NER") module 1062 which is used to identify portions of query text that correspond to a named entity that may be recognizable by the system. A downstream process called named entity resolution actually links a text portion to an actual specific entity known to the system. To perform named entity resolution, the system may utilize gazetteer information (1084a, 1084b, 1084c . . . 1084n) stored in entity library storage 1082. The gazetteer information may be used for entity resolution, for example matching ASR results with different entities (such as song titles, user names, etc.). Gazetteers may be linked to users (for example, a particular gazetteer may be associated with a specific user's list or collection of other user contacts), may be linked to certain domains (such as communication), or may be organized in a variety of other ways.

Generally, a NLU process takes textual input (such as processed from ASR 1050 based on the utterance input audio 1011) and attempts to make a semantic interpretation of the text. That is, a NLU process determines the meaning behind the text based on the individual words and then implements that meaning. NLU processing 1060 interprets a text string to derive an intent or a desired action from the user as well as the pertinent pieces of information in the text that allow a device (e.g., device 1002) or other service, such as a music service, to complete that action. For example, if a spoken utterance is processed using ASR 1050 and outputs the text "Let me hear a song from Foo Fighters," the NLU process may determine that the user intended to initiate a music session using the device 1002 and to hear music matching the entity "Foo Fighters" (which may involve a downstream command processor 1090 linked with a communication session application).

A NLU may process several textual inputs related to the same utterance. For example, if the ASR 1050 outputs N text segments (as part of an N-best list), the NLU may process all N outputs to obtain NLU results.

A NLU process may be configured to parse and tag or otherwise annotate text as part of NLU processing. For example, for the text "Play some Macklemore," "play" may be tagged as a command (to begin the presentation of music or other media) and "Macklemore" may be tagged as a specific entity and target of the command (and an identifier of an entity corresponding to "Macklemore" may be included in the annotated result). For the text "Call Mom," "call" may be tagged as a command (e.g., to execute a phone call), and "Mom" may be tagged as a specific entity and target of the command (and an identifier of an entity corresponding to "Mom" may be included in the annotated result). Further, the NLU process may be used to provide answer data in response to queries, for example, using the knowledge base 1072.

To correctly perform NLU processing of speech input, an NLU process 1060 may be configured to determine a "domain" of the utterance so as to determine and narrow down which services offered by the endpoint device (e.g., server 1020 or device 1002) may be relevant. For example, an endpoint device may offer services relating to interactions with a communication service, a contact list service, a calendar/scheduling service, a music player service, etc. Words in a single text query may implicate more than one service, and some services may be functionally linked (e.g., both a communication service and a calendar service may utilize data from the contact list).

The name entity recognition (or "NER") module 1062 receives a query in the form of ASR results and attempts to identify relevant grammars and lexical information that may be used to construe meaning. To do so, the NER module 1062 may begin by identifying potential domains that may relate to the received query. The NLU storage 1073 includes a database of devices (1074a-1074n) identifying domains associated with specific devices. For example, the device 1002 may be associated with domains for music, communication sessions, calendaring, contact lists, and device-specific communications, but not video. In addition, the entity library may include database entries about specific services on a specific device, either indexed by Device ID, User ID, or Household ID, or some other indicator.

In NLU processing, a domain may represent a discrete set of activities having a common theme, such as "music," "communication session," "shopping," "calendaring," etc. As such, each domain may be associated with a particular language model and/or grammar database (1076a, 1076b . . . 1076n), a particular set of intents/actions (1078a, 1078b . . . 1078n), and a particular personalized lexicon (1086). Each gazetteer (1084a-1084n) may include domain-indexed lexical information associated with a particular user and/or device. For example, the Gazetteer A (1084a) includes domain-index lexical information 1086aa, 1086ab-1086an. A user's music-domain lexical information might include album titles, artist names, and song names, for example, whereas a user's contact-list lexical information might include the names of contacts, identifiers for devices associated with those contacts, device characteristics, etc. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored, with the overall highest ranked result from all applied domains ordinarily selected to be the correct result.

An intent classification (or "IC") module 1064 parses the query to determine an intent or intents for each identified domain, wherein the intent corresponds to the action to be performed that is responsive to the query. Each domain is associated with a particular set of intents/actions (1078a-1078n) of words linked to intents. For example, a music intent may link words and phrases such as "quiet," "volume off," and "mute" to a "mute" intent. The IC module 1064 identifies potential intents for each identified domain by comparing words in the query to the words and phrases in the set of intents actions 1078 for that domain. Traditionally, the determination of an intent by the IC module is performed using a set of rules or templates that are processed against the incoming text to identify a matching intent.

In order to generate a particular interpreted response, the NER 1062 applies the grammar models and lexical information associated with the respective domain to actually recognize and mention one or more entities in the text of the query. In this manner, the NER 1062 identifies "slots" (i.e., particular words in query text) that may be needed for later command processing. Depending on the complexity of the NER 1062, it may also label each slot with a type of varying levels of specificity (such as noun, place, city, artist name, song name, or the like). Each grammar model 1076 includes the names of entities (i.e., nouns) commonly found in speech about the particular domain (i.e., generic terms), whereas the lexical information 1086 from the gazetteer 1084 is personalized to the user(s) and/or the device. For instance, a grammar model associated with a music domain, a communication session domain or a shopping domain may include a database of words commonly used when people discuss music, communication sessions or shopping, respectively, and/or constraints to include with music, communication sessions or shopping, respectively.

The intents identified by the IC module 1064 are linked to domain-specific grammar frameworks (included in 1076) with "slots" or "fields" to be filled. Each slot or field corresponds to a portion of the query text that the system believes corresponds to an entity. For example, if "Play music" is an identified intent, a grammar framework or frameworks 1076 may correspond to sentence structures such as "Play {Artist Name}," "Play {Album Name}," "Play {Song Name}," "Play {Song Name} by {Artist Name}," etc. However, to make resolution more flexible, these frameworks would ordinarily not be structured as sentences, but rather based on associating slots with grammatical tags.

For example, the NER module 1062 may parse the query to identify words as subject, object, verb, preposition, etc., based on grammar rules and/or models, prior to recognizing named entities. The identified verb may be used by the IC module 1064 to identify intent, which is then used by the NER module 1062 to identify frameworks. A framework for an intent of "play" may specify a list of slots or fields applicable to play the identified "object" and any object modifier (e.g., a prepositional phrase), such as {Artist Name}, {Album Name}, {Song name}, etc. The NER module 1062 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type or semantic meaning. Parsing may be performed using heuristic grammar rules, or an NER model may be constructed using techniques such as HMM, maximum entropy models, log linear models, conditional random fields (CRF), and the like.

For instance, a query of "play Man in the Box by Alice in Chains" might be parsed and tagged as {Verb}: "Play," {Object}: "Man in the Box," {Object Preposition}: "by," and {Object Modifier}: "Alice in Chains." At this point in the process, "Play" may be identified as a verb based on a word database associated with the music domain, which the IC module 1064 will determine corresponds to the "play music" intent. Even if no determination has been made as to the meaning of "Man in the Box" and "Alice in Chains," but, based on grammar rules and models, it may be determined that the text of these phrases relates to the grammatical objects (i.e., entity) of the query.

The frameworks linked to the intent are then used to determine what database fields should be searched to determine the meaning of these phrases, such as searching a user's gazetteer for similarity with the framework slots. A framework for "play music intent" might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the slot or field using gazetteer information, the NER module 1062 may search the database of generic words associated with the domain (in the storage 1073). For example, if a query was "play songs by Heart," after failing to determine an album name or song name called "songs" by "Heart," the NER module 1062 may search the domain vocabulary for the word "songs." In the alternative, generic words may be checked before the gazetteer information, or both may be tried, potentially producing two different results.

The comparison process used by the NER module 1062 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER module 1062 may also use contextual operational rules to fill slots. For example, if a user had previously requested to pause a particular song and thereafter requested that the voice-controlled device to "please un-pause my music," the NER module 1062 may apply an inference-based rule to fill a slot associated with the name of the song that the user currently wishes to play, namely, a song that was playing at the time that the user requested to pause the music.

The results of NLU processing may be tagged to attribute meaning to the query. So, for instance, "play Long Road by Pearl Jam" might produce a result of: {domain} Music, {intent} Play Music, {artist name} "Pearl Jam," {media type} song, and {song title} "Long Road." As another example, "play songs by Pearl Jam" might produce:

{domain} Music, {intent} Play Music, {artist name} "Pearl Jam," and {media type} song.

The output from the NLU processing (which may include tagged text, commands, etc.) may then be sent to a command processor 1090, which may be located on a same or separate server 1020 as part of system 1000. The destination command processor 1090 may be determined based on the NLU output. For example, if the NLU output includes a command to play music, or to establish a communication session, the destination command processor 1090 may be a music application or a communication application, such as one located on device 1002 or in another device associated with the user.

Figure 11:
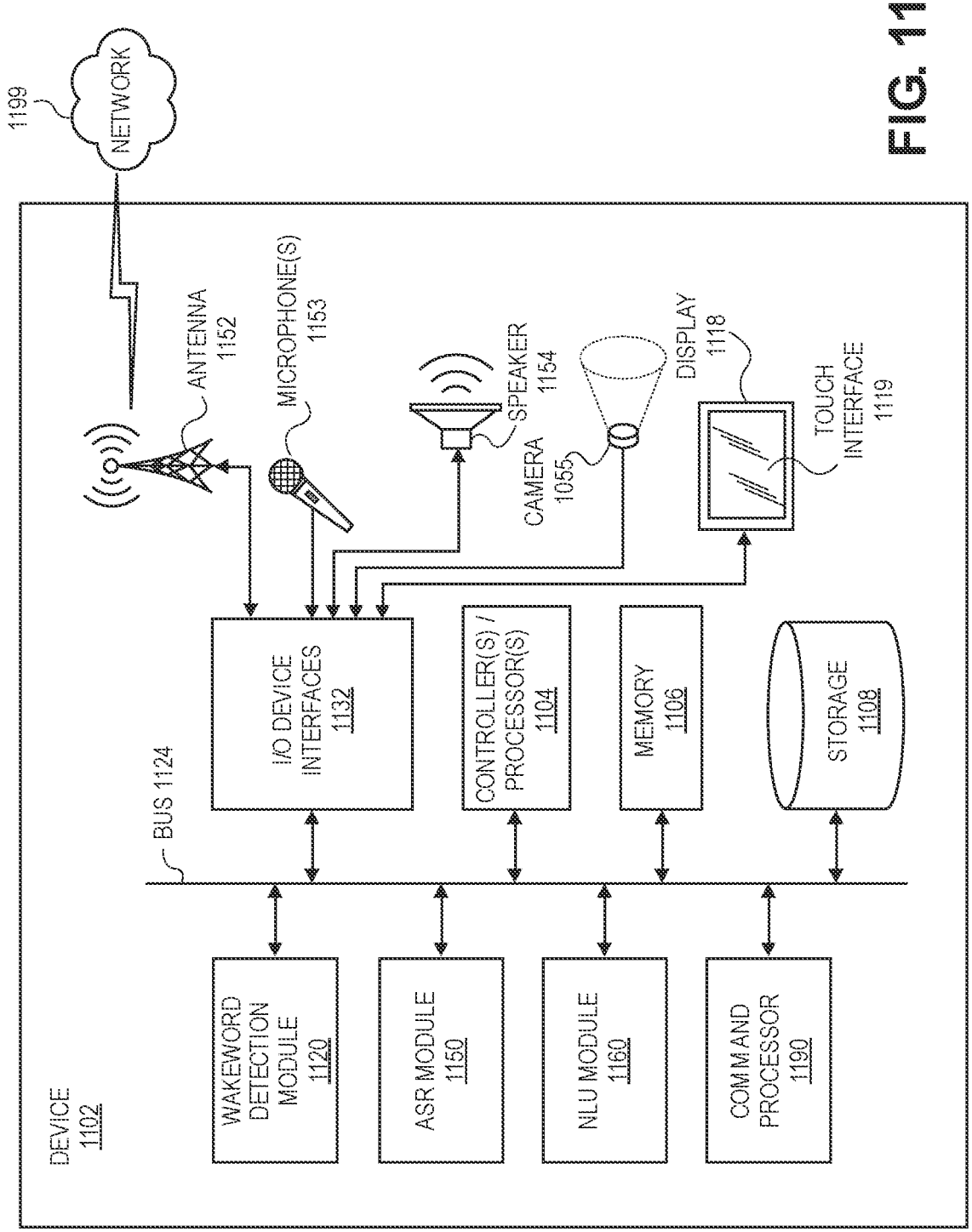
FIG. 11 is a block diagram of one system in accordance with embodiments of the present disclosure.
Figure 12:
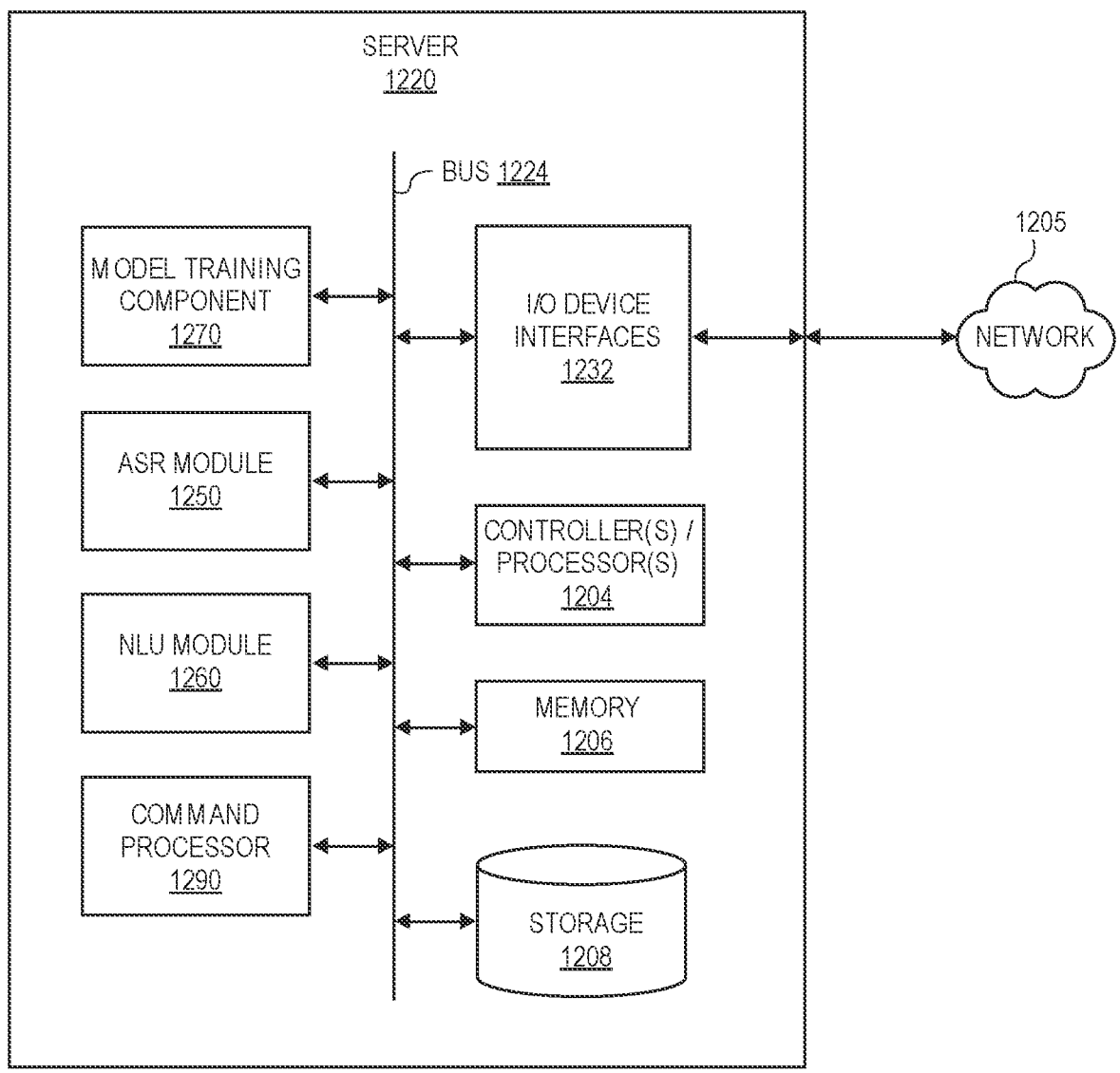
FIG. 12 is a block diagram of one system in accordance with embodiments of the present disclosure.

FIG. 11 is a block diagram conceptually illustrating one device 1102 that may be used in accordance with one or more of the embodiments disclosed herein. FIG. 12 is a block diagram conceptually illustrating example components of one device, such as a remote server 1220 that may assist with ASR, NLU processing, or command processing, in accordance with one or more of the embodiments disclosed herein. Multiple such servers 1220 may be included in the system, such as one server(s) 1220 for training ASR models, one server(s) for performing ASR, one server(s) 1220 for performing NLU, etc. In operation, each of these devices (or groups of devices) may include computer-readable and computer-executable instructions that reside on the respective device 1102/1220), as will be discussed further below.

Each of these devices 1102/1220 may include one or more controllers/processors 1104/1204, that may each include a central processing unit (or "CPU") for processing data and computer-readable instructions, and a memory 1106/1206 for storing data and instructions of the respective device. The memories 1106/1206 may individually include volatile random access memory (RAM), non-volatile read only memory (ROM), non-volatile magnetoresistive (MRAM) and/or other types of memory. Each device may also include a data storage component 1108/1208, for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces 1132/1232.

Computer instructions for operating each device 1102/1220 and its various components may be executed by the respective device's controller(s)/processor(s) 1104/1204, using the memory 1106/1206 as temporary "working" storage at runtime. A device's computer instructions may be stored in a non-transitory manner in non-volatile memory 1106/1206, storage 1108/1208, or an external device(s). Alternatively, some or all of the executable instructions may be embedded in hardware or firmware on the respective device in addition to or instead of software.

Each device 1102/1220 includes input/output device interfaces 1132/1232. A variety of components may be connected through the input/output device interfaces, as will be discussed further below. Additionally, each device 1102/1220 may include an address/data bus 1124/1224 for conveying data among components of the respective device. Each component within a device 1102/1220 may also be directly connected to other components in addition to (or instead of) being connected to other components across the bus 1124/1224.

Referring to the device 1102 of FIG. 11, the device 1102 may include a display 1118, which may comprise a touch interface 1119. Alternatively, the device 1102 may be "headless" and may primarily rely on spoken commands for input. As a way of indicating to a user that a connection between another device has been opened, relay constraint notification, etc., the device 1102 may be configured with a visual indicator, such as an LED or similar illumination element, that may change color, flash, or otherwise provide visual indications by the device 1102. The device 1102 may also include input/output device interfaces 1132 that connect to a variety of components such as an audio output component such as a speaker 1154, an imaging device such as a camera 1155, a wired headset or a wireless headset, and/or other components capable of outputting audio. The device 1102 may also include an audio capture component. The audio capture component may be, for example, a microphone 1153 or array of microphones, a wired headset or a wireless headset, etc. The microphone 1153 may be configured to capture audio, such as phrases or utterances from a user. If an array of microphones is included, approximate distance to a sound's point of origin may be determined using, for example, acoustic localization based on time and amplitude differences between sounds captured by different microphones of the array. The device 1102 (using microphone 1153, wake word detection module 1120, ASR module 1150, etc.) may be configured to determine audio data corresponding to detected audio data. The device 1102 (using input/output device interfaces 1132, antenna 1152, etc.) may also be configured to transmit the audio data to server 1220 for further processing or to process the data using internal components such as a wake word detection module 1120.

For example, via the antenna(s), the input/output device interfaces 1132 may connect to one or more networks 1199/1205 via a wireless local area network (WLAN) (such as Wi-Fi) radio, Bluetooth, and/or wireless network radio, such as a radio capable of communication with a wireless communication network such as a Long-Term Evolution (LTE) network, WiMAX network, 3G network, 5G network, etc. A wired connection such as Ethernet may also be supported. Through the network(s) 1199/1205, the speech processing system may be distributed across a networked environment.

The device 1102 and/or server 1220 may include an ASR module 1150/1250. The ASR module 1150 in device 1102 may be of limited or extended capabilities or may not be included in the device 1102. The ASR module(s) may include the language models stored in the ASR model storage component, and perform the automatic speech recognition process. If limited speech recognition is included on the device 1102, the ASR module 1150 may be configured to identify a limited number of words, such as keywords detected by the device, whereas extended speech recognition may be configured to recognize a much larger range of words.

The device 1102 and/or server 1220 may include a limited or extended NLU module 1160/1260. The NLU module in device 1102 may be of limited or extended capabilities, or may not be included on the device 1102. The NLU module(s) may comprise the name entity recognition module, the intent classification module and/or other components, as discussed above. The NLU module(s) may also include a stored knowledge base and/or entity library, or those storages may be separately located.

The device 1102 and/or server 1220 may also include a command processor 1190/1290 that is configured to execute commands/functions associated with a spoken command as described above.

The device 1102 may include a wake word detection module 1120, which may be a separate component or may be included in an ASR module 1150. The wake word detection module 1120 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some implementations, the device 1102 may be configured collectively to identify a set of the directional audio signals in which the wake expression is detected or in which the wake expression is likely to have occurred.

The wake word detection module 1120 receives captured audio and processes the audio to determine whether the audio corresponds to particular keywords recognizable by the device 1102 and/or system. The storage 1108 may store data relating to keywords and functions to enable the wake word detection module 1120 to perform the algorithms and methods described above. The locally stored speech models may be pre-configured based on known information, prior to the device 1102 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 1102 prior to the user device 1102 being delivered to the user or configured to access the network by the user. The wake word detection module 1120 may access the storage 1108 and compare the captured audio to the stored models and audio sequences using audio comparison, pattern recognition, keyword spotting, audio signature, and/or other audio processing techniques.

The server may include a model training component 1270. The model training component may be used to train the classifiers or models discussed above.

As noted above, multiple devices may be employed in a single speech processing system. In such a multi-device system, each of the devices may include different components for performing different aspects of the speech processing. The multiple devices may include overlapping components. The components of the devices 1102 and server 1220, as illustrated in FIGS. 11 and 12, are exemplary, and may be located as a stand-alone device or may be included, in whole or in part, as a component of a larger device or system. Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

Likewise, although some of the embodiments described herein or shown in the accompanying figures refer to media programs including audio files, the systems and methods disclosed herein are not so limited, and the media programs described herein may include any type or form of media content, including not only audio but also video, which may be transmitted to and played on any number of devices of any type or form.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 4, 7A and 7B, orders in which such methods or processes are presented are not intended to be construed as any limitation on the claimed inventions, and any number of the method or process steps or boxes described herein can be combined in any order and/or in parallel to implement the methods or processes described herein.

Additionally, it should be appreciated that the detailed description is set forth with reference to the accompanying drawings, which are not drawn to scale. In the drawings, the use of the same or similar reference numbers in different figures indicates the same or similar items or features. Except where otherwise noted, one or more left-most digit(s) of a reference number identify a figure or figures in which the reference number first appears, while two right-most digits of a reference number in a figure indicate a component or a feature that is similar to components or features having reference numbers with the same two right-most digits in other figures.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A first computer system comprising at least a first data store and at least a first computer processor, wherein the first computer system is connected to one or more networks, and
    wherein the first data store has one or more sets of instructions stored thereon that, when executed by at least the first computer processor, cause the first computer system to perform a method comprising:
        receiving a first set of data over the one or more networks, wherein the first set of data is received from a second computer system associated with at least one participant in a media program, and wherein the first set of data represents at least a first set of words spoken by the at least one participant;
        transmitting at least the first set of data to at least one of a plurality of computer systems over the one or more networks, wherein each of the plurality of computer systems is associated with at least one of a plurality of listeners to the media program;
        determining that the first set of data represents at least the first set of words;
        providing, by the first computer system, a first set of inputs to a first machine learning algorithm, wherein the first set of inputs comprises at least some of the first set of words;
        identifying, by the first computer system, a first topic associated with the media program based at least in part on a first output received from the first machine learning algorithm;
        identifying at least a first interaction received from at least one of the plurality of listeners;
        identifying the at least one participant based at least in part on at least one of the first set of data or at least some of the first set of words;
        providing a second set of inputs to a second machine learning algorithm executed by the first computer system, wherein the second set of inputs comprises the first topic, at least some of the first set of words, an identity of the at least one participant and information regarding the first interaction;
        receiving a second output from the second machine learning algorithm in response to the second set of inputs;
        generating a summary of the media program based at least in part on the second output;
        transmitting a second set of data to a third computer device over the one or more networks, wherein the second set of data comprises at least a portion of the summary, and wherein the third computer device is associated with a prospective listener to the media program;
        receiving a request to join the media program from the third computer device; and
        in response to the request,
            transmitting a third set of data to at least the third computer device, wherein the third set of data is received by the first computer system from the second computer system, and wherein the third set of data represents at least a second set of words spoken by the at least one participant.

2. The first computer system of claim 1, wherein the method further comprises:
    determining at least one attribute of at least one of the third computer system or the prospective listener; and
    selecting the portion of the summary based at least in part on the at least one attribute.

3. A computer-implemented method comprising:
    transmitting, by a first computer system to a plurality of computer systems, first data representing at least first media content of a first media program, wherein each of the plurality of computer systems is associated with one of a plurality of listeners to the first media program;
    determining, by the first computer system, that the first media content comprises a first set of words, wherein that the first media content comprises the first set of words is determined during a playing of at least the first media content of the first media program by at least one of the plurality of computer systems;
    receiving, by the first computer system, information regarding a first interaction with a second computer system, wherein the second computer system is one of the plurality of computer systems, and wherein the information regarding first interaction is received from the second computer system during the playing of at least the first media content of the first media program by the second computer system;
    providing, by the first computer system, a first set of inputs to a first machine learning algorithm, wherein the first set of inputs comprises at least some of the first set of words;
    identifying, by the first computer system, a first topic associated with the first media content based at least in part on a first output received from the first machine learning algorithm;
    providing, by the first computer system, a second set of inputs to a second machine learning algorithm, wherein the second set of inputs comprises at least a portion of the first set of words, the first topic and at least some of the information regarding the first interaction, and wherein the second machine learning algorithm is trained to identify at least a portion of a media program based at least in part on at least one word represented in media content of the media program, a topic of the media program and information regarding an interaction received during a playing of the media content of the media program;

determining, by the first computer system, a summary of at least the first media content based at least in part on a second output received from the second machine learning algorithm in response to the second set of inputs, wherein the summary comprises a second set of words;

transmitting, by the first computer system, at least a portion of the summary to a third computer system, wherein the portion of the summary comprises at least some of the second set of words and wherein the third computer system is not one of the plurality of computer systems; and presenting, by the third computer system, at least the portion of the summary to at least one user of the third computer system.

4. The computer-implemented method of claim 3, further comprising:

after presenting the at least some of the second set of words to the at least one user of the third computer system, receiving, by the first computer system from the third computer system, a request for media content associated with the media program; and after receiving the request for the media content associated with the media program, transmitting, by the first computer system to the third computer system and the plurality of computer systems, second data representing at least second media content of the first media program.

5. The computer-implemented method of claim 3, further comprising:

prior to receiving the information regarding the first interaction, causing, by the first computer system, a display of at least one user interface on a display of the second computer system, a user interface comprising at least one of:

a first interactive feature for causing a playing, a pausing or a stopping of at least the first media content;

a second interactive feature associated with one of a plurality of emotions or opinions; or a third interactive feature comprising a text box, wherein the information regarding the first interaction is received via the user interface.

6. The computer-implemented method of claim 3, further comprising:

determining, by the first computer system, at least a portion of the first media content based at least in part on the first output, wherein presenting at least the portion of the summary to the at least one user of the third computer system comprises:

transmitting, by the first computer system, at least the portion of the first media content to the third computer system; and causing at least the portion of the first media content to be played by the third computer system.

7. The computer-implemented method of claim 3, wherein the second output identifies at least a first time associated with the first media content and a second time associated with the first media content, and wherein the second set of words is determined based at least in part on a portion of the first media content played by the at least one of the plurality of computer systems between the first time and the second time.

8. The computer-implemented method of claim 3, wherein presenting at least the portion of the summary to the at least one user of the third computer system comprises:

generating, by the first computer system, a page representing the at least some of the second set of words and a link to at least a portion of the first media content; and receiving, by the first computer system from a fourth computer system associated with a creator of the first media program, an identifier of one of the third computer system or the at least one user of the third computer system, wherein data representing the page is transmitted to the third computer system in response to receiving the identifier.

9. The computer-implemented method of claim 3, further comprising:

receiving, by the first computer system from a fourth computer system associated with a creator of the first media program, a selection of at least a portion of the first media content, wherein at least the second set of words is determined based at least in part on the portion of the first media content.

10. The computer-implemented method of claim 3, further comprising:

providing at least a portion of the first media content as an input to a topic modeling algorithm, wherein the topic modeling algorithm is one of a latent Dirichlet allocation, a matrix factorization, a latent semantic analysis, a pachinko allocation model or a transformer; and identifying, by the first computer system, the first topic associated with the first media content based at least in part on an output received from the topic modeling algorithm.

11. The computer-implemented method of claim 3, further comprising:

identifying, by the first computer system, a plurality of portions of the first set of words;

identifying, by the first computer system, participants in the first media program associated with each of the plurality of portions of the first set of words;

determining, by the first computer system, that at least a first portion of the plurality of portions was uttered by a first participant in the first media program; and determining, by the first computer system, an identity of the first participant, wherein the first set of inputs further comprises the identity of the first participant.

12. The computer-implemented method of claim 3, further comprising:

transmitting, by the first computer system to at least some of the plurality of computer systems, second data representing at least second media content of the first media program;

determining, by the first computer system, that the second media content comprises a third set of words, wherein that the second media content comprises the third set of words is determined during a playing of at least the second media content of the first media program by the at least one of the plurality of computer systems; and identifying, by the first computer system, a second topic associated with the second media content based at least in part on the third set of words, wherein the second set of inputs further comprises at least a portion of the third set of words.

13. The computer-implemented method of claim 3, further comprising:

transmitting, by the first computer system to at least some of the plurality of computer systems, second data representing at least second media content of the first media program;

determining, by the first computer system, that the second media content comprises a third set of words, wherein that the second media content comprises the third set of words is determined during a playing of at least the second media content of the first media program by the at least one of the plurality of computer systems;

providing, by the first computer system, a third set of inputs to the second machine learning algorithm, wherein the third set of inputs comprises at least a portion of the third set of words;

receiving, by the first computer system, at least a third output in response to the third set of inputs;

determining, by the first computer system, at least a fourth set of words associated with the second media content based at least in part on the third output;

transmitting, by the first computer system, at least some of the fourth set of words to one of the third computer system or a fourth computer system, wherein the fourth computer system is not one of the plurality of computer systems; and presenting, by the one of the third computer system or the fourth computer system, the at least some of the fourth set of words to the at least one user of the third computer system or at least one user of the fourth computer system.

14. The computer-implemented method of claim 3, wherein the second machine learning algorithm is one of a recurrent neural network, a convolutional neural network or a bidirectional encoder representation from transformers.

15. The computer-implemented method of claim 3, wherein presenting at least the portion of the summary to the at least one user of the third computer system comprises:

causing, by one of the first computer system or the third computer system, a display of a user interface on a display of the third computer system, wherein the user interface comprises:

the at least some of the second set of words; and a first selectable feature for joining the first media program, wherein the first selectable feature is displayed in association with the at least some of the second set of words.

16. The computer-implemented method of claim 3, wherein presenting at least the portion of the summary to the at least one user of the third computer system comprises:

causing, by one of the first computer system or the third computer system, audible signals representing the at least some of the second set of words to be emitted by at least one speaker of the third computer system.

17. The computer-implemented method of claim 3, wherein the third computer system is at least a portion of one of:

an automobile;
a desktop computer;
a laptop computer;
a media player;
a smartphone;
a smart speaker;
a tablet computer; or
a wristwatch.

18. A first computer system having at least a first data store and at least a first computer processor, wherein the first computer system is connected to one or more networks, and wherein the first data store has one or more sets of instructions stored thereon that, when executed by at least the first computer processor, cause the first computer system to perform a method comprising:

transmitting a first set of data to at least some of a plurality of computer systems over the one or more networks, wherein the first set of data represents first media content of a first media program;

identifying a first set of words, wherein each of the first set of words is represented in the first set of data;

providing, by the first computer system, a first set of inputs to a first machine learning algorithm wherein the first set of inputs comprises at least some of the first set of words;

identifying, by the first computer system, a first topic for the first media program based at least in part on a first output received from the first machine learning algorithm;

providing a second set of inputs to a second machine learning algorithm trained to identify a summary of media content, wherein the second set of inputs comprises:

at least a portion of the first media content;
at least a portion of the first set of words; and
the first topic;

receiving a second output from the second machine learning algorithm;

transmitting a second set of data to at least some of the plurality of computer systems over the one or more networks, wherein the second set of data represents second media content of a second media program;

identifying a second set of words, wherein each of the second set of words is represented in the second set of data;

selecting a second topic for the second media program based at least in part on the second set of words;

providing a third set of inputs to the second machine learning algorithm, wherein the third set of inputs comprises:

at least a portion of the second media content;
at least a portion of the second set of words; and
the second topic;

receiving a third output from the second machine learning algorithm;

transmitting a third set of data to a second computer system, wherein the second computer system is not one of the plurality of computer systems, and wherein the third set of data, when executed by the second computer system, causes the second computer to display a user interface comprising:

at least a portion of a first summary of the first media program, wherein the first summary is determined based at least in part on the second output;

a first selectable feature displayed in association with the portion of the first summary of the first media program, wherein the first selectable feature, when selected, causes third media content of the first media program to be transmitted to the second computer system;

at least a portion of a second summary of the second media program, wherein the second summary is determined based at least in part on the third output; and a second selectable feature displayed in association with the portion of the second summary of the second media program, wherein the first selectable feature, when selected, causes fourth media content of the second media program to be transmitted to the second computer system;

receiving, from the second computer system, information regarding a selection of the first selectable feature; and in response to receiving the information regarding the selection of the first selectable feature, causing at least the third media content of the first media program to be transmitted to at least the second computer system over the one or more networks.

19. The first computer system of claim 18, wherein the user interface further comprises:

a third selectable feature displayed in association with the portion of the first summary of the first media program and the first selectable feature, wherein the third selectable feature, when selected, causes at least a portion of the first media content of the first media program to be transmitted to the second computer system; and a fourth selectable feature displayed in association with the portion of the second summary of the second media program and the second selectable feature, wherein the fourth selectable feature, when selected causes at least a portion of the second media content of the second media program to be transmitted to the second computer system.

20. The first computer system of claim 18, wherein the second computer system is at least a portion of one of:

an automobile;
a desktop computer;
a laptop computer;
a media player;
a smartphone;
a smart speaker;
a tablet computer; or
a wristwatch.

\* \* \* \* \*